(12) United States Patent
Paoletti

(10) Patent No.: US 12,546,513 B2
(45) Date of Patent: Feb. 10, 2026

(54) REVERSE LIQUID DEFROSTING SYSTEM AND METHOD

(71) Applicant: Cristiano Paoletti, Folignano (IT)

(72) Inventor: Cristiano Paoletti, Folignano (IT)

( * ) Notice: Subject to any disclaimer, the term of this patent is extended or adjusted under 35 U.S.C. 154(b) by 301 days.

(21) Appl. No.: 18/270,692

(22) PCT Filed: Dec. 30, 2021

(86) PCT No.: PCT/IT2021/050439
§ 371 (c)(1),
(2) Date: Jun. 30, 2023

(87) PCT Pub. No.: WO2022/144946
PCT Pub. Date: Jul. 7, 2022

(65) Prior Publication Data
US 2024/0302082 A1    Sep. 12, 2024

(30) Foreign Application Priority Data

Jan. 2, 2021   (IT) ........................ 202020000007202

(51) Int. Cl.
| | |
|---|---|
| F25B 13/00 | (2006.01) |
| F25B 9/00 | (2006.01) |
| F25B 41/20 | (2021.01) |
| F25B 47/02 | (2006.01) |

(52) U.S. Cl.
CPC .............. *F25B 13/00* (2013.01); *F25B 9/008* (2013.01); *F25B 41/20* (2021.01); *F25B 47/02* (2013.01); *F25B 2400/23* (2013.01)

(58) Field of Classification Search
CPC ........ F25B 13/00; F25B 41/20; F25B 9/0008; F25B 47/02; F25B 2400/23
See application file for complete search history.

(56) References Cited

U.S. PATENT DOCUMENTS

| | | | |
|---|---|---|---|
| 3,633,378 A * | 1/1972 | Toth ...................... | F25B 47/022 62/278 |
| 4,949,551 A * | 8/1990 | Gregory .................. | F25B 43/00 62/278 |
| 6,000,231 A | 12/1999 | Alsenz | |
| 2009/0173092 A1 | 7/2009 | Hu | |

FOREIGN PATENT DOCUMENTS

CN           107655124 A      2/2018

* cited by examiner

*Primary Examiner* — Larry L Furdge
(74) *Attorney, Agent, or Firm* — Makoui Law, PC; Ali Makoui

(57) ABSTRACT

Reverse liquid defrosting system and method of a selected evaporator of a plurality of evaporators of a closed loop vapor cycle refrigeration system having a unique expansion device feeding all the evaporators in normal flow are provided. During defrost, the liquid refrigerant—that releasing heat in the selected evaporator became subcooled—is circulated to the remaining not-selected evaporators by the unique expansion device or eventually also by an auxiliary expansion device in order to feed at least two distinct non-selected evaporators at different evaporating pressures obtaining that the higher evaporating pressure becomes the compression suction pressure via the use of additional flow lines, check valves, an ejector, a vapor-liquid separator and isolation valves which can be automatic valves of the close on rise of inlet pressure type. Usable in vehicles as heat pump mobile system at various re-heating performance levels.

22 Claims, 30 Drawing Sheets

REVERSE LIQUID DEFROSTING SYSTEM AND METHOD

FIELD OF THE INVENTION

The present invention modifies and improves any type of closed loop vapor cycle multi-evaporator refrigeration system requiring defrosting cycles to remove the ice formed on the outside of the evaporator coils, automating its operation and increasing its efficiency. In detail, this invention relates to the reverse liquid defrosting of a selected evaporator of a plurality of evaporators of a closed loop vapor cycle refrigeration system having a unique expansion device feeding all the evaporators in normal flow whereby the selected evaporator is in turn each evaporator of the plurality of evaporators. More particularly, the present invention is directed to reverse liquid defrosting system and method of a selected evaporator—which is in turn each evaporator of a plurality of evaporators—of a closed loop vapor cycle multi-evaporator refrigeration system having a unique expansion device feeding all the evaporators in normal flow whereby defrosting is obtained by circulating liquid refrigerant through the selected evaporator in reverse direction to normal flow—by a dedicated liquid reverse flow line—to release heat to dissolve the ice that has accumulated on the coil of the selected evaporator so as the liquid refrigerant which flows through it becomes sub-cooled and then by circulating said sub-cooled liquid refrigerant into the unique expansion device feeding all the other non-selected evaporators by the use of a further dedicated liquid reverse flow line and check valves. Alternatively, during the defrosting of a selected evaporator—which is in turn each evaporator of a plurality of evaporators—of a closed loop vapor cycle multi-evaporator refrigeration system having a unique expansion device feeding all the evaporators in normal flow by circulating liquid refrigerant through the selected evaporator in reverse direction to normal flow to release heat to dissolve the ice that has accumulated on the coil of the selected evaporator, the liquid refrigerant—which in the passage through the selected evaporator becomes sub-cooled—is circulated through both the unique expansion device feeding all the evaporators in normal flow and an auxiliary expansion device so as to feed two distinct non-selected evaporators at two different evaporating pressures thus obtaining as a result that the suction pressure of the compressor is—without eventually pressure drops—the higher evaporating pressure of the two distinct non-selected evaporators by the use in addition of further flow lines, further check valves, an ejector, a vapor-liquid separator and isolation valves. Said isolation valves can be controlled valves (such as solenoid-valves) or automatic valves of the close on rise of inlet pressure type. A further improvement of the efficiency of the system according to the present invention is obtained with the use of a second compression stage connected to a second vapor-liquid separator and the use of a further auxiliary expansion device which alternatively can be replaced by an expander-compressor group.

The system according to the present invention is usable as heat pump mobile system for vehicle internal air conditioning at different re-heating performance levels.

BACKGROUND OF THE INVENTION

Multi evaporators refrigeration systems sometimes require defrosting cycles to remove the ice formed on the outside of the evaporator coils. During normal operation, in fact, the evaporators can operate at temperatures low enough to cause water vapor to crystallize or freeze on the outside of the evaporator coils, producing frost or ice which if allowed to build up restricts air flow and eventually results in loss of refrigeration. The rate at which the ice builds up on a particular fixture depends upon the type of the fixture, the load on the fixture, the temperatures of the fixture and refrigerant, and the humidity of the air within the fixture being cooled. As a result, the surfaces of the evaporator coils require periodic defrosting cycles. The frequency with which a particular evaporator requires defrosting depends upon the rate at which ice builds up, the cooling load on the evaporator, and the rate at which it can be defrosted.

In general, the length of the defrosting period is determined by the degree of ice accumulation on the evaporator coil and by the rate at which heat can be applied to melt off the ice. Ice and frost accumulation therefore varies with the type of installation, the conditions inside the fixture, and the frequency of defrosting. Although defrosting can be obtained, in general, by hot vapor refrigerant flow through the evaporators, Alsenz discovered in U.S. Pat. No. 6,000,231 system and method to defrost a selected evaporator of a plurality of evaporators of a closed loop vapor cycle multi-evaporator refrigeration system by introducing liquid refrigerant into the coil of the selected evaporator in reverse direction to normal flow—by a dedicated liquid reverse flow line—which in the passage through said coil becomes sub-cooled allowing so said sub-cooled liquid refrigerant leaving the selected evaporator to come back into liquid line so as to flow then through distinct expansion devices, each expansion device feeding a non-selected evaporator of the plurality of evaporators. In more detail, the invention of Alsenz consists in reverse liquid defrosting system and method of a selected evaporator of a closed loop vapor cycle multi-evaporator refrigeration system which includes one or more compressors for compressing a fluid refrigerant, a condenser to condense compressed hot gas refrigerant, a receiver to accumulate condensed refrigerant, a plurality of evaporators to evaporate the liquid refrigerant coming from receiver to a low pressure cold gas refrigerant, expansion devices each of which feeding an evaporator of the plurality of evaporators and a suction manifold to bring together the different flows of low pressure cold gas refrigerant leaving the evaporators into a single suction line connected to the compressor(s), a dedicated liquid reverse flow line connecting the outlet of the condenser or the receiver to the discharge or the outlet of the selected evaporator of the plurality of evaporators and control valves in flow lines to introduce the liquid refrigerant discharged from the receiver or the condenser into the coil of the selected evaporator in reverse direction to normal flow to defrost the selected evaporator by heat release. The liquid refrigerant becomes simultaneously sub-cooled in the passage through the selected evaporator, thus recovering the cooling effect stored in the accumulated frost and ice. The cooling effect is transferred to the non-selected evaporators by supplying the sub-cooled liquid refrigerant to distinct expansion devices, each expansion device feeding a non-selected evaporator of the plurality of evaporators as cooler liquid.

Technical Problem

Although Alsenz asserts that his invention works also in the case of a single expansion device in a multi-evaporator refrigeration system, his system and his method are not directly applicable in the case of a unique expansion device feeding all the evaporators of the plurality of evaporators in normal flow when the selected evaporator is in turn each evaporator of the plurality of evaporators. Furthermore, his drawings don't show the case of a unique expansion device feeding all the evaporators of the plurality of evaporators in normal flow. Finally, his system claims make no mention of any expansion device.

Without the introduction of additional liquid reverse flow lines and check valves not discovered by Alsenz, in the case of a unique expansion device feeding all the evaporators of the plurality of evaporators in normal flow the invention of Alsenz presents the technical problem that the selected evaporator can not be in turn each evaporator of the plurality of evaporators when the defrosting of the selected evaporator is obtained by introducing liquid refrigerant into the coil of the selected evaporator in reverse direction to normal flow which in the passage through the selected evaporator becomes sub-cooled allowing so said sub-cooled liquid refrigerant leaving the selected evaporator to be discharged back into the liquid line in order to flow then through the unique expansion device feeding all the other non-selected evaporators of the plurality of evaporators.

Another technical problem that Alsenz invention presents is that during defrosting operation of the selected evaporator the suction pressure of the compressor can not be—without eventually pressure drops—the higher evaporating pressure of two distinct non-selected evaporators that operate at different evaporation pressures, but it will inevitably be the lowest.

Solution of the Technical Problem

One of the purposes of the present invention is to solve the first technical problem of the Alsenz system and method in the case of a unique expansion device feeding all the evaporators of the plurality of evaporators in normal flow when the selected evaporator is in turn each evaporator of the plurality of evaporators by the use of additional liquid reverse flow lines and check valves. More particularly, one of the purposes of the present invention is to discover system and method which allow the defrosting of a selected evaporator—which is in turn each evaporator of a plurality of evaporators—of a closed loop vapor cycle multi-evaporator refrigeration system having a unique expansion device feeding all the evaporators of the plurality of evaporators in normal flow introducing in the selected evaporator in reverse direction to normal flow—by means of a dedicated liquid reverse flow line—liquid refrigerant which in the passage through the selected evaporator becomes sub-cooled and allowing said sub-cooled liquid refrigerant leaving the selected evaporator in reverse direction to normal flow to be discharged back into liquid line so as to flow then through the unique expansion device feeding all the other non-selected evaporators of the plurality of evaporators by means of an additional liquid reverse flow line and check valves. As mentioned, in contrast to Alsenz more general system where each evaporator is equipped with its own expansion device, the system according to the present invention presents the achieved improvement of having a unique expansion device feeding all the evaporators of the plurality of evaporators in normal flow, the outlet of the unique expansion device being connected to the inlet of each evaporator of the plurality of evaporators by a flashed refrigerant flow line, each flashed refrigerant flow line having a check valve therein. Having that, the outlet of the condenser or the receiver is connected to the inlet of the unique expansion device by a liquid forward flow line. In addition to the use of the already mentioned check valves of the flashed refrigerant flow lines, the solution of the first technical problem is obtained through the use, ulteriorly, of additional liquid reverse flow lines, each of which connecting a portion of a flashed refrigerant flow line—disposed downstream of the respective check valve—to a portion of the liquid forward flow line; each additional liquid reverse flow line having a check valve therein. Due to the presence of these check valves, the refrigerant doesn't flow in said additional liquid reverse flow lines during normal operation, but it flows in said additional liquid reverse flow lines only during defrosting operation of the selected evaporator and in particular the refrigerant flows only into the additional liquid reverse flow line connecting a portion of the flashed refrigerant flow line of the selected evaporator to a portion of the liquid forward flow line, while the refrigerant still does not flow, in any case, into the others additional liquid reverse flow lines each of which connecting a portion of the flashed refrigerant flow line of the non-selected evaporators to a portion of the liquid forward flow line during defrosting operation of the selected evaporator. Another purpose of the present invention is to solve the second technical problem relating to Alsenz system and method mentioned above that is to say—always in the case of a unique expansion device feeding all the evaporators of the plurality of evaporators in normal flow—to obtain during reverse liquid defrosting of the selected evaporator—which is in turn each evaporator of the plurality of evaporators—that the suction pressure of the compressor is—without eventually pressure drops—the higher evaporating pressure of two distinct non-selected evaporators that operate at different evaporation pressures. The solution to the second technical problem is achieved by the further addition of an ejector and a vapor-liquid separator arranged in the liquid forward flow line, further check valves, isolation valves and further flow lines including an auxiliary liquid flow line—branched off from the liquid forward flow line—extending to an auxiliary expansion device which feeds—during the reverse liquid defrosting of the selected evaporator—a second non-selected evaporator of the plurality of evaporators at an evaporating pressure somewhat higher in comparison to the evaporating pressure at which the first non-selected evaporator is fed by the unique expansion device feeding all the evaporators of the plurality of evaporators in normal flow.

A further purpose of the present invention in addition is to increase the efficiency of the discovered system by the use of a second compression stage connected to a second vapor-liquid separator and a further auxiliary expansion device which alternatively can be replaced by an expander-compressor group.

Final purpose of the present invention is to use the invention as heat pump mobile system for vehicles internal air conditioning at different re-heating performance levels.

Important features of the present invention have been broadly summarized in order that the following detailed description thereof may be better understood, and in order that the contribution to the art may be better appreciated.

Additional features of the present invention will be described in detail hereinafter and which will form the subject of the claims appended hereto.

BRIEF DESCRIPTION OF THE DRAWINGS

The following list of drawings presents a brief description regarding the figures that make up the drawings of the present invention wherein like elements have been identified by like numerals.

DESCRIPTION OF THE EMBODIMENTS END RELATIVE OPERATIONS

By way of suitable comparison it is now described in detail an embodiment relative to the state of the art for a closed loop vapor cycle refrigeration system with a plurality of evaporators having reverse liquid defrosting of a selected evaporator of the plurality of evaporators.

Figure 1:
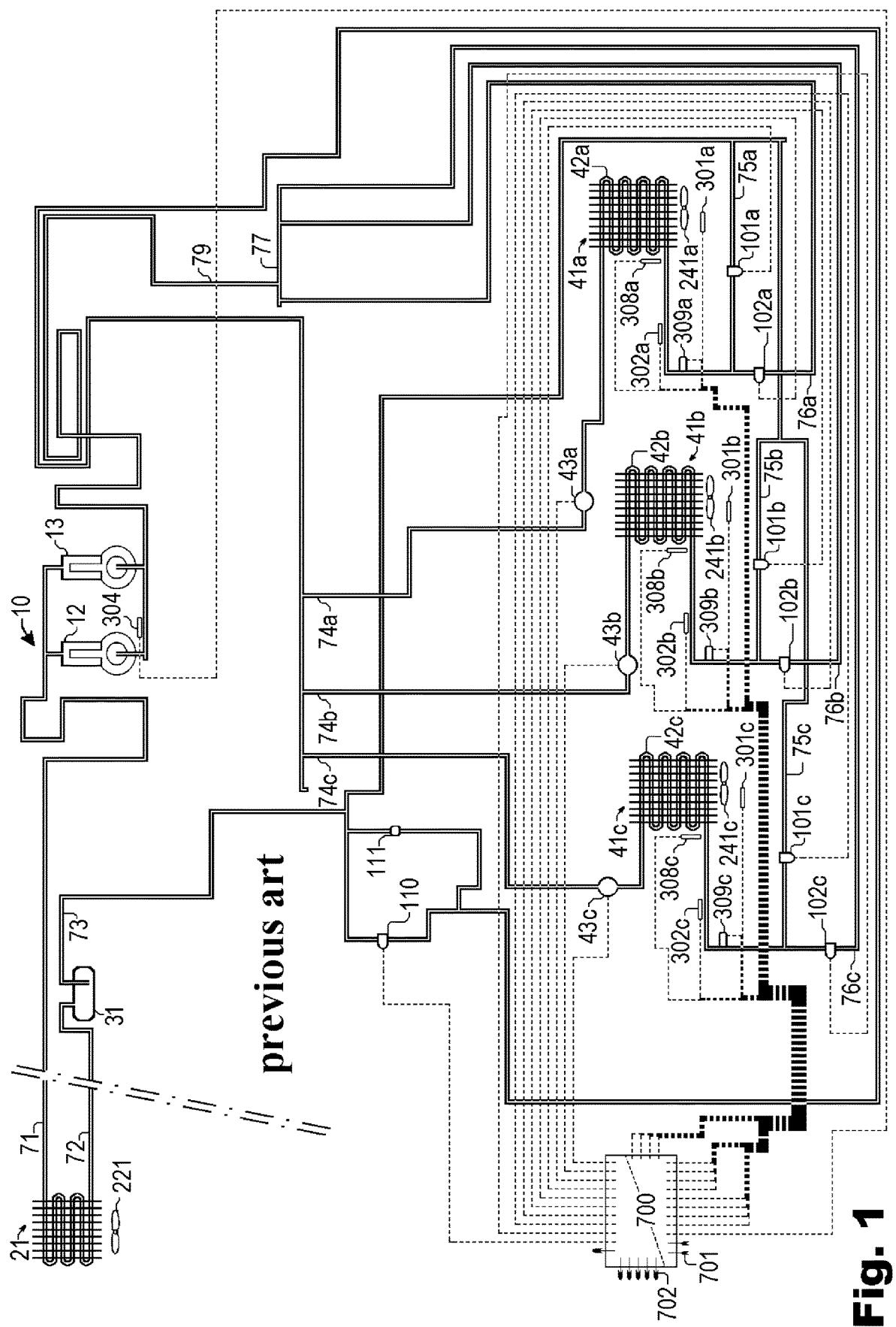
FIG. 1 is an embodiment of a closed loop vapor cycle refrigeration system having reverse liquid defrosting of a coil of a selected evaporator of a plurality of evaporators by the use in particular of a dedicated liquid reverse flow line as known in the art (state of the art)

Referring to FIG. 1, it is shown an embodiment of a closed loop vapor cycle refrigeration system 10 as known in the art (state of the art) which includes one or more compressors such as compressors 12 and 13 for compressing a fluid refrigerant. Compressed hot gas refrigerant, then, flows or passes to a condenser 21 for cooling and condensing compressed hot gas refrigerant and to a reservoir or receiver 31 to accumulate the condensed refrigerant. Then said liquid refrigerant outgoing from the receiver 31 flows—circulating through three expansion devices 43a-c—to three evaporators 41a-c to evaporate the liquid refrigerant so as to cool a fixture or other refrigerated space surrounding each evaporator. The evaporated refrigerant leaves the evaporators 41a-c at cold gas state and flows in three respective cold gas flow lines 76a-c to a suction manifold 77 that unites the three flows of cold gas refrigerant of the three cold gas flow lines 76a-c into a single suction line 79 connected to the inlets of the compressors 12 and 13 to pass gas refrigerant from the evaporators 41a-c to the compressors 12 and 13. The condenser 21 generally includes a fan 221 for moving air through the condenser 21 to facilitate the condensing of the refrigerant. Moreover, a compressed hot gas flow line 71 connects the outlets of the compressors 12 and 13 to the inlet of the condenser 21 to pass compressed refrigerant hot gas to the condenser 21. A condensated refrigerant flow line 72 connects the outlet of the condenser 21 to the inlet of the receiver or reservoir 31 to accumulate the condensed refrigerant from condenser 21 to receiver 31. A liquid forward flow line 73 connects an outlet of the receiver 31 to the inlet of each evaporator of the plurality of the evaporators 41a-c by three terminal flow lines 74a-c of the liquid forward flow line 73. Each of the three terminal flow lines 74a-c of the liquid forward flow line 73 passes through the corresponding expansion device 43: for example, the terminal flow line 74a of the liquid forward flow line 73 passes through the expansion device 43a to supply liquid refrigerant to the evaporator 41a so as to evaporate the liquid refrigerant in a coil 42a of the evaporator 41a. Similarly it happens for the other evaporators. Moreover, a valve 110 is arranged in the liquid forward flow line 73 upstream of the terminal flow lines 74a-c and a bypass line of the liquid forward flow line 73 around the valve 110 includes a valve 111. During normal operation of the closed loop vapor cycle refrigeration system 10, the valve 110 is open while the valve 111 is closed; vice versa it happens during defrosting operation of a selected evaporator. The system 10 moreover comprises three reverse liquid flow lines 75a-c connecting the outlet of the receiver 31 or the outlet of the condenser 21 to the outlet of the evaporators 41a-c to supply liquid refrigerant in reverse direction to normal flow during defrosting operation. For example, the liquid reverse flow line 75a connects the outlet of the receiver 31 or the outlet of the condenser 21 to the outlet of the evaporator 41a to supply liquid refrigerant in reverse direction to normal flow to the evaporator 41a during defrosting operation of the evaporator 41a. Thus, the liquid reverse flow line 75a acts as defrosting liquid supplying line during defrosting operation of the evaporator 41a. Although in FIG. 1 the liquid reverse flow line 75a is shown as branched off from liquid forward flow line 73 upstream of the valve 110, it must be understood that it can start also from an outlet of the receiver 31 or an outlet of the condenser 21 in an equivalent way. Moreover, although in FIG. 1 the liquid reverse flow line 75a is shown as confluent in the cold gas flow line 76a, it must be understood that it can end also directly at the outlet of the evaporator 41a in an equivalent way. Similarly it happens for the reverse liquid flow lines 75b and 75c relative to the evaporators 41b and 41c.

Referring to FIG. 1, evaporator 41a will be described in detail. The description of the evaporator 41a applies equally to evaporators 41b and 41c. Evaporator 41a includes one or more coils such as coil 42a. Evaporator 41a includes also one or more temperature sensors 301a and 302a which are arranged in the inlet air stream entering into the coil 42a and in the cold gas flow line 76a at the end of coil 42a respectively. Temperature sensors 301a and 302a provide signals to a controller 700. Evaporator 41a includes also a frost detecting device 308a to provide a signal to the controller 700 indicative of whether a frost condition exists at the coil 42a of the evaporator 41a. Evaporator 41a includes also a fan 241a for moving air over coil 42a and for circulating the cooled air to the fixtures and the products being cooled. Moreover, a pressure sensor 309a is arranged in the cold gas flow line 76a at the end of coil 42a to provide a signal to the controller 700.

Referring again to FIG. 1, fluid control valves are arranged in the flow lines: in particular, defrosting liquid supplying valves 101a-c are arranged respectively in the reverse liquid flow lines 75a-c; cold gas valves 102a-c are arranged respectively in the cold gas flow lines 76a-c. All these valves are in electrical connection with, and under control of, the control circuit 700. A sensor 304 is arranged in the single suction line 79 to provide a signal to the controller 700 that liquid refrigerant is present therein. The controller 700 includes control circuits having inputs 701 for receiving signals from various sensors and having outputs 702 for sending control signals to various valves and other devices to control the operation of refrigeration system 10. The valve 111 of the bypass line is a pressure differential valve provided to create during defrosting operation of a selected evaporator a differential pressure of the liquid refrigerant around the coil of the selected evaporator to be defrosted which allows the liquid refrigerant leaving the selected evaporator in reverse direction to normal flow to be discharged back into the liquid forward flow line 73 downstream of the valve 110 to supply liquid refrigerant to the expansion devices feeding the other non-selected evaporators. In particular, if the selected evaporator to be defrosted is the evaporator 41a, during defrosting operation the differential pressure valve 111 creates a liquid refrigerant pressure differential around the coil 42a of the selected evaporator 41a to be defrosted which allows the liquid refrigerant leaving the evaporator 41a in reverse direction to normal flow to be discharged back into the liquid forward flow line 73 downstream of the valve 110 and to be circulated—via the terminal flow lines 74b and 74c of the liquid forward flow line 73—through the expansion devices 43b and 43c and then through the coils 42b and 42c of the evaporators 41b and 41c respectively to evaporate.

The plurality of evaporators of a closed loop vapor cycle refrigeration system having reverse liquid defrosting of a selected evaporator of the plurality of evaporators as known in the art (state of the art) is achieved with a parallel of at least two evaporators in normal flow. Although the description of the particular embodiment relative to the state of the art as shown in FIG. 1 is provided as if the plurality of evaporators consists of the parallel of three evaporators in normal flow, it is intended valid for whatever number of evaporators greater than one.

Reference is now made to the detailed description of the system according to the present invention relating to a closed loop vapor cycle refrigeration system with a plurality of evaporators having reverse liquid defrosting of a selected evaporator—which is in turn each evaporator of the plurality of evaporators—with a unique expansion device feeding all the evaporators in normal flow.

Figure 2:
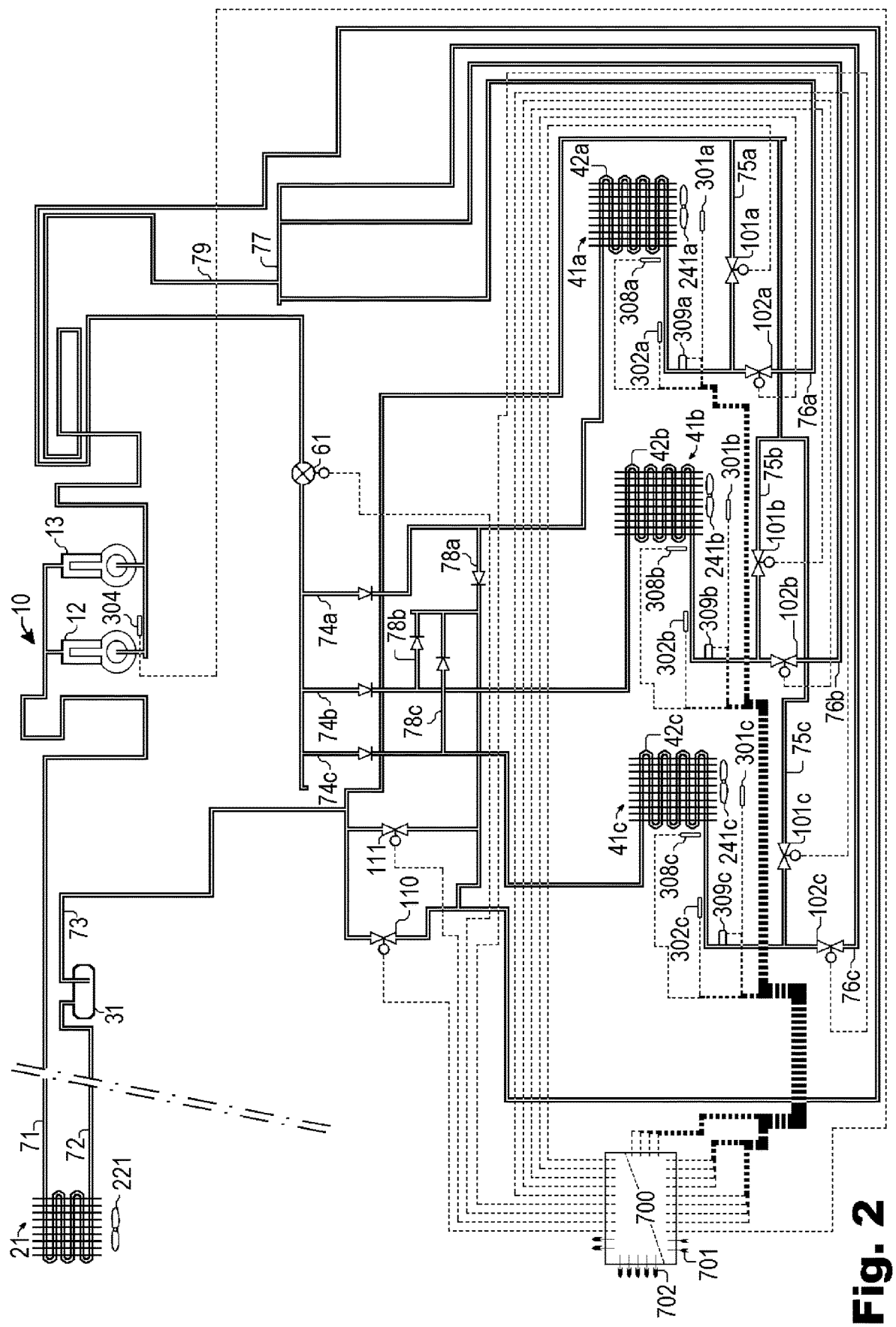
FIG. 2 is an embodiment of a closed loop vapor cycle refrigeration system having reverse liquid defrosting of a coil of a selected evaporator of a plurality of evaporators by the use, in addition to the dedicated liquid reverse flow line, of additional liquid reverse flow lines and check valves in the case of a unique expansion device feeding all the evaporators in normal flow according to the present invention.

Referring now to FIG. 2, it is shown the preferred embodiment of the system according to the present invention where a closed loop vapor cycle refrigeration system 10 includes one or more compressors as the compressors 12 and 13 for compressing a fluid refrigerant. Although the compressors 12 and 13 are shown in FIG. 2 as reciprocating compressors, it must be understood that they may also be centrifugal, rotary, scroll, venturi, jet enthalpy, or other types of compressors as are known in the art without departing from the scope of the invention. Compressed refrigerant hot gas flows or passes to a condenser 21 for cooling and condensing compressed hot gas refrigerant and to a reservoir or receiver 31 to accumulate the condensed refrigerant. In the case of trans-critical cycles the condenser 21 will be replaced by a gas-cooler without it implies a departing from the scope and the spirit of the invention. It settles down so to define from here on that the high pressure and high density refrigerant which leaves the gas-cooler 21 and ends in the reservoir or receiver 31 in the case of trans-critical cycles is liquid refrigerant for appropriate simplification. Well then, said liquid refrigerant leaving the receiver 31 passes then to a unique expansion device 61 feeding three evaporators 41a-c to evaporate the liquid refrigerant so as to cool a fixture or other refrigerated space surrounding each evaporator. The evaporated refrigerant leaves the evaporators 41a-c at cold gas state and flows into three respective cold gas flow lines 76a-c to a suction manifold 77 that brings together the three streams of cold gas refrigerant of the three cold gas flow lines 76a-c into a single suction line 79 which is connected to the inlets of the compressors 12 and 13. The condenser 21 generally includes a fan 221 for moving air through the condenser 21 to facilitate the condensing of the refrigerant. Moreover, a compressed hot gas flow line 71 connects the outlets of the compressors 12 and 13 to the inlet of the condenser 21 for passing compressed hot gas refrigerant to the condenser 21. A condensated refrigerant flow line 72 connects the outlet of the condenser 21 to the inlet of the receiver or reservoir 31 to accumulate the condensed refrigerant from condenser 21 to receiver 31. A liquid forward flow line 73 connects an outlet of the receiver 31 to the inlet of the unique expansion device 61. The liquid refrigerant leaving the receiver 31 flashes while it flows through the unique expansion device 61. Three flashed refrigerant flow lines 74a-c connect the outlet of the unique expansion device 61 to each evaporator of the plurality of the evaporators 41a-c in order to supply flashed refrigerant to the evaporators, as the flashed refrigerant flow line 74a to supply flashed refrigerant to the evaporator 41a. Moreover, a valve 110 is arranged in the liquid forward flow line 73 and a bypass line of the liquid forward flow line 73 around the valve 110 includes a valve 111. During normal operation, the valve 110 is open while the valve 111 is closed; viceversa it happens during defrosting operation of a selected evaporator. The system 10 moreover comprises three reverse liquid flow lines 75a-c connecting the outlet of the receiver 31 or the outlet of the condenser 21 to the outlet of the evaporators 41a-c to supply liquid refrigerant in reverse direction to normal flow during defrosting operation. For example, the liquid reverse flow line 75a connects the outlet of the receiver 31 or the outlet of the condenser 21 to the outlet of the evaporator 41a to supply liquid refrigerant in reverse direction to normal flow to the evaporator 41a during defrosting operation of the evaporator 41a. Thus, the liquid reverse flow line 75a acts as defrosting liquid supplying line during defrosting operation of the evaporator 41a. Although in FIG. 2 the liquid reverse flow line 75a is shown as branched off from liquid forward flow line 73 upstream of the valve 110, it must be understood that it can start also from an outlet of the receiver 31 or an outlet of the condenser 21 in an equivalent way. Moreover, although in FIG. 2 the liquid reverse flow line 75a is shown as confluent in the cold gas flow line 76a, it must be understood that it can end also directly at the outlet of the evaporator 41a in an equivalent way. Similarly it happens for the liquid reverse flow lines 75b and 75c relative to the evaporators 41b and 41c.

In contrast to the embodiment relative to the state of the art as described above and as shown in FIG. 1, the preferred embodiment of the system according to the present invention as it is shown in FIG. 2 doesn't include a plurality of expansion devices—each expansion device provided for an evaporator of the plurality of evaporators—but a unique expansion device common to all the evaporators. Moreover, flow lines 74a-c—which in the embodiment relative to the state of the art are terminal flow lines of the liquid forward flow line 73 and so traversed by not-expanded liquid refrigerant at least for the section up to the respective expansion devices 43—in this preferred embodiment of the system according to the present invention are expanded flashed refrigerant flow lines since their initial stretch and are moreover equipped with check valves therein.

Referring to FIG. 2, the evaporator 41a will be described in detail. The description of the evaporator 41a applies equally to the evaporators 41b and 41c. Equally to the embodiment of the state of the art as described above and as shown in FIG. 1, the evaporator 41a includes one or more coils such as coil 42a. The evaporator 41a includes also one or more temperature sensors 301a and 302a which are arranged in the inlet air stream entering into the coil 42a and in the cold gas flow line 76a at the end of coil 42a respectively. Temperature sensors 301a and 302a provide signals to a controller 700. The evaporator 41a includes also a frost detecting device 308a, as known in the art, to provide a signal to controller 700 indicative of whether a frost condition exists at coil 42a of the evaporator 41a. The evaporator 41a includes also a fan 241a for moving air over the coil 42a and for circulating the cooled air to the fixtures and the products being cooled. Moreover, a pressure sensor 309a is arranged at the end of coil 42a in the cold gas flow line 76a to provide a signal to controller 700.

Referring again to FIG. 2, fluid control valves are arranged in flow lines: in particular, defrosting liquid supplying valves 101a-c are arranged respectively in the liquid reverse flow lines 75a-c; cold gas valves 102a-c are arranged respectively in the cold gas flow lines 76a-c. All the valves are electrically moved valves (such as solenoid-valves) but one skilled in the art will recognize that other types of valves may be used without departing from the scope of the invention. All these valves are in electrical connection with, and under control of, the control circuit 700. A sensor 304 is arranged in the single suction line 79 to provide a signal to controller 700 that liquid refrigerant is present therein. The controller 700 includes control circuits having inputs 701 for receiving signals from various sensors and having outputs 702 for sending control signals to various valves and other devices to control the operation of refrigeration system 10. All possible temperature and pressure sensors are not shown to operate the refrigeration system. The controller 700 can be a programmable logic controller, a micro-controller, a microcomputer, or any microprocessor based control circuit as known in the art for controlling the operation of closed loop vapor cycle refrigeration system. All possible connections of the outputs 702 of the control system 700 are not shown neither in this figure nor in the following figures. More particularly, are shown only the connections 702 in outlet from the control system 700 to control devices of any type which allow to stop completely the flow of the refrigerant in the flow lines in which such devices are inserted. In contrast to the embodiment of the state of the art as described above and shown in FIG. 1, in the preferred embodiment of the system according to the present invention as it is shown in FIG. 2 the valve 111 of the bypass line is now a more generic electrically operated valve instead of a differential pressure valve. The valve 111 of the bypass line can be a throttle valve. Moreover, the system 10 includes three additional liquid reverse flow lines 78a-c, each additional liquid reverse flow line 78 connecting a portion of the corresponding flashed refrigerant flow line 74—disposed downstream of the respective check valve—to a low pressure side of the valve 110; each additional liquid reverse flow line 78 having a check valve therein which allows the flow of liquid refrigerant during defrosting operation of the corresponding evaporator. In fact, the refrigerant doesn't flow in said additional liquid reverse flow lines 78a-c in normal operation, but only during defrosting operation as will be described in detail below and will be the subject of the claims appended hereto. Moreover, in FIG. 2 valves 101a-c, 102a-c, 110 and 111 have a different graphic representation (less schematic) compared to FIG. 1.

Referring to FIG. 2, here is a normal operation of refrigeration system 10 according to the present invention that is to say an operation in which no evaporator is defrosting. Therefore, valves 110 and 102a-c are open, while valves 111 and 101a-c are closed. The low pressure gas refrigerant is compressed at an high pressure by the compressors 12 and 13. Compressed hot gas refrigerant is then discharged in the hot gas flow line 71 and flows through the condenser 21. The condenser 21 cools and condenses the gas refrigerant by heat transfer from refrigerant to the air which can be forced through the condenser 21 by the fan 221. The condensed refrigerant is discharged from the condenser 21 through the condensated refrigerant flow line 72 in the receiver 31. The liquid refrigerant from the receiver 31 flows in the liquid forward flow line 73—circulating through the open valve 110—to the unique expansion device 61. The liquid refrigerant expands to laminated cooled refrigerant while it flows through the expansion device 61. Then, the flashed cold refrigerant flows into the flashed refrigerant flow lines 74a-c-circulating through the respective check valves—to the evaporators 41a-c, specifically the flow line 74a delivers flashed cold refrigerant to the evaporator 41a. At the evaporators 41a-c the flashed cold refrigerant flows respectively through the coils 42a-c where it evaporates cooling in such way the air circulating to the fixtures or the refrigerated spaces being cooled. The heat transfer circulated from the fixtures or the refrigerated spaces to the refrigerant can be increased by the fans 241a-c. The refrigerant so passes from flashed cooled liquid state at the inlets of the evaporators 41a-c at evaporated cold gas state at the outlet of the evaporatores themselves. The evaporated cold gas refrigerant then flows into the cold gas flow lines 76a-c to the suction manifold 77 circulating through the corresponding open valves of the cold gas flow lines 102a-c. The suction manifold 77 brings together the three streams of evaporated cold gas refrigerant of the three cold gas flow lines 76a-c into a single suction line 79 which is connected to the inlets of the compressors 12 and 13 for passing evaporated cold gas refrigerant from the evaporators 41a-c to the compressors 12 and 13. The refrigeration cycle described above of refrigeration system 10 in normal flow takes place continuously with each evaporator of the plurality of the evaporators 41a-c in normal operation that is to say with no evaporator is defrosting.

Referring to FIG. 2, defrosting operation of a selected evaporator of the plurality of evaporators will be now described for the case where a frost condition is detected at coil 42a of the evaporator 41a of refrigeration system 10. Thus, the selected evaporator to be defrosted is the evaporator 41a while the non-selected evaporators are the evaporators 41b and 41c. When the evaporator 41a accumulates sufficient frost or ice on its coil 42a then its cooling performance will degrade and the temperature of the fixture or refrigerated space to be cooled will not be maintained at the desired temperature. Such frost condition is detected by the frost sensor 308a which then sends an electric signal indicative of a frost condition to controller 700. A defrost cycle is then initiated from control circuit 700 for the evaporator 41a. Alternatively, a defrost cycle may also be automatically initiated by another starting defrosting device or by a timer whenever a predetermined time period in normal operation has passed for a given evaporator. Always with reference to FIG. 2, during the defrosting cycle for the case just described the operation of refrigeration system 10 is controlled by the controller 700 and the cold gas flow line valve 102a is closed to isolate the evaporator 41a from the compressors 12 and 13. The defrosting liquid supplying valve 101a arranged in the liquid reverse flow line 75a is then either opened slowly or pulsed open to pressurize slowly the portion of cold gas flow line 76a disposed between the became closed cold gas flow line valve 102a and the evaporator 41a with defrosting liquid. The slow pressurization of the portion of the cold gas flow line 76a disposed between the became closed cold gas flow line valve 102a and the evaporator 41a prevents shocking effects both of the cold gas flow line 76a and the evaporator 41a itself. The valve 110 is then closed and the valve 111 of the bypass line is then open. The valve 111 of the bypass line can be throttled open. The evaporator 41a is now defrosted by the reverse flow of liquid refrigerant through the liquid reverse flow line 75a and through the coil 42a. Such liquid refrigerant has been previously circulated through the became open liquid reverse flow line valve 101a. The liquid refrigerant releases heat while it flows through the coil 42a in reverse direction to normal flow, melting off the ice accumulated on the coil 42a, defrosting thus the coil while the liquid refrigerant becomes sub-cooled. The flow of defrosting liquid during defrosting operation may be controlled by the liquid reverse flow line valve 101a which acts as defrosting liquid supplying valve. The sub-cooled liquid refrigerant exits the evaporator 41a in reverse direction to normal flow and flows in reverse direction to normal flow into the flashed refrigerant flow line 74a, then leaves the flashed refrigerant flow line 74a and flows in the additional liquid reverse flow line 78a—circulating through the relative check valve—and in this way flows through the low pressure side of the valve 110 where joins the liquid refrigerant leaving the receiver 31 and flowing through the became open valve 111 of the bypass line that can be throttled open. Then, such sub-cooled liquid refrigerant—sum of the sub-cooled liquid refrigerant coming from the selected evaporator and the liquid refrigerant leaving the receiver 31 and flowing through the became open valve 111 of the bypass line—flows into the liquid forward flow line 73 downstream of the valve 110 to the unique expansion device 61. The sub-cooled liquid refrigerant flashes in a mixture of liquid and vapor while it flows through the expansion device 61: namely, it flashes both the sub-cooled liquid refrigerant coming from selected evaporator and the liquid refrigerant leaving the receiver 31 and flowing through the became open valve 111 of the bypass line. Then, the flashed sub-cooled liquid refrigerant leaving the unique expansion device 61 flows into the two flashed refrigerant flow lines 74b and 74c—circulating through the respective check valves—to the two evaporators 41b and 41c where it evaporates. The refrigerant so passes from the flashed liquid state at the inlet of the two evaporators 41*b* and 41*c* to the evaporated cold gas state at the outlet of the evaporators themselves. The evaporated cold gas refrigerant leaving the two evaporators 41*b* and 41*c* then flows into the two cold gas flow lines 76*b* and 76*c*—circulating through the open valves of the cold gas flow lines 102*b* and 102*c*—to the suction manifold 77 and then flows to the inlet of the compressors 12 and 13 by the single suction line 79. Thus, the cooling effect stored in the accumulated frost and ice on coil 42*a* of the evaporator 41*a* is recovered by the sub-cooling of the liquid refrigerant and then it is transferred to the other two evaporators 41*b* and 41*c*. During the defrosting cycle, the fan 241*a* can be turned off and the signal from the frost detecting device 308*a* is monitored. When the coil 42*a* is completely defrosted, the flow of defrosting liquid is stopped by closing the defrosting liquid supplying valve 101*a*, the valve 110 is then open to begin the restoration of the normal refrigerant flow, the cold gas flow line valve 102*a* is open and the valve 111 of the bypass line is closed. The fan 241*a* is switched on again if it had been switched off during defrosting operation of the evaporator 41*a*. The cold gas flow line valve 102*a* can be either pulsed open or throttled open to slowly bleed down the cold gas flow line 76*a* from any liquid still present there, while the liquid sensor 304 is carefully monitored.

If liquid refrigerant is detected by the liquid sensor 304 during the pulse opening or the throttled opening of the cold gas flow line valve 102*a*, await period is imposed or the cold gas flow line valve 102*a* should be throttled back. The above description of the defrosting cycle for the selected evaporator 41*a* applies in analogy if the selected evaporator is the evaporator 41*b* or the evaporator 41*c*.

Although the description of the particular embodiment of the system according to the present invention as shown in FIG. 2 is provided as if the plurality of evaporators consists of the parallel of three evaporators in normal flow, it is intended to be valid for whatever number of evaporators greater than one.

Figure 3:
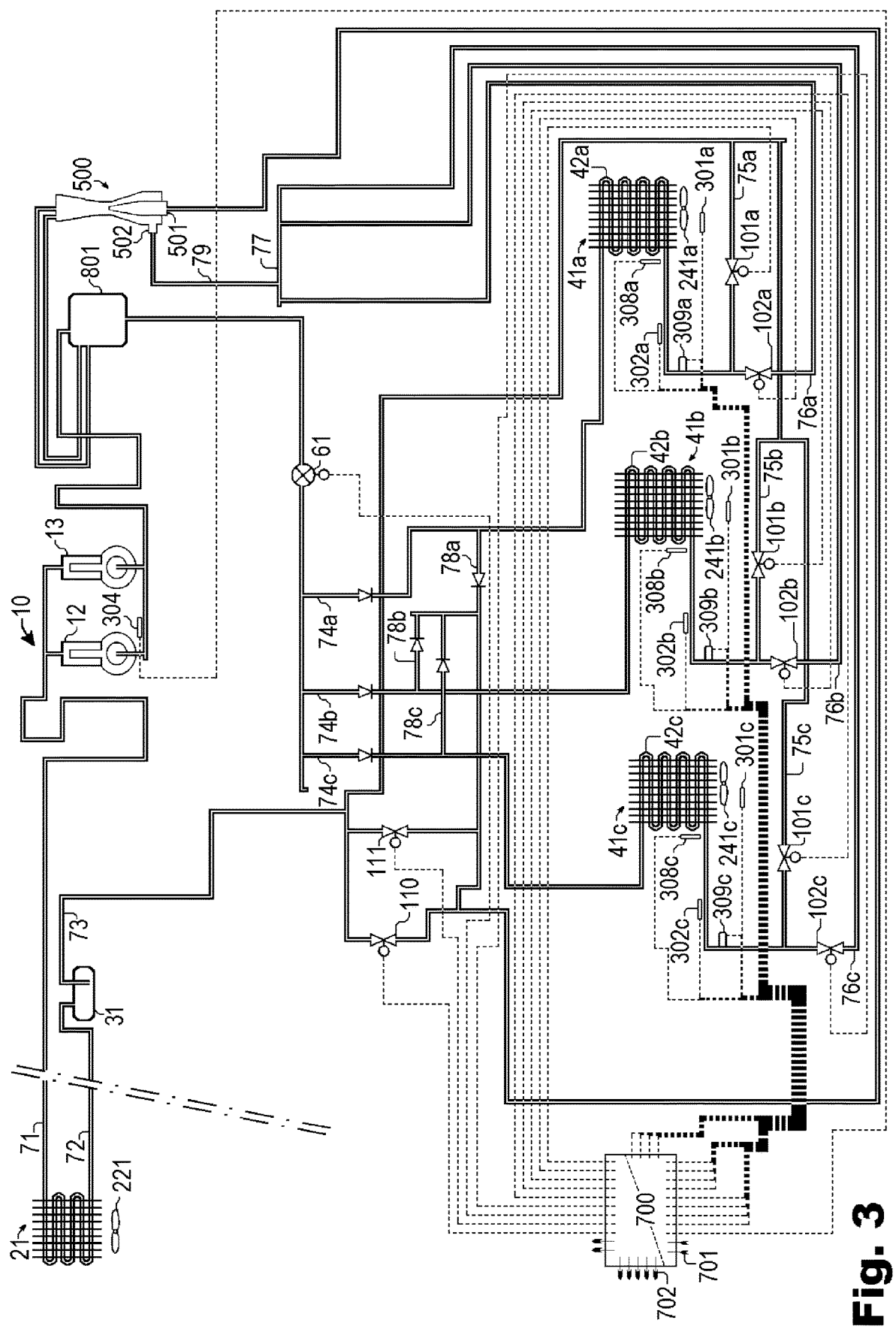
FIG. 3 is an embodiment of a closed loop vapor cycle refrigeration system having reverse liquid defrosting of a coil of a selected evaporator of a plurality of evaporators by the use, in addition to the dedicated liquid reverse flow line, of additional liquid reverse flow lines and check valves in the case of a unique expansion device feeding all the evaporators in normal flow further comprising an ejector and a vapor-liquid separator arranged in the liquid forward flow line according to the present invention.

Referring now to FIG. 3, it is shown another embodiment of the system according to the present invention which differs from the preferred embodiment previously described above and shown in FIG. 2 for having an ejector 500 and a vapor-liquid separator 801 arranged in the liquid forward flow line 73. Because an ejector (as the ejector 500) has two inlets (the motive port and the suction port) and one outlet (the discharge port) the description of the functionality of any ejector (and so also of the ejector 500) can be made as if ideally the ejector has two distinct outlets—that is to say two distinct discharge ports—and thus is traversed by two distinct ideal flows: the first ideal flow would be what enters the motive port and goes out through the first of the two ideal discharge ports while the second ideal flow would be what enters the suction port and goes out through the second of the two ideal discharge ports—the thermodynamic conditions obviously being the same in the ejector outlet of the two ideal flows. Moreover, it is ideally possible to describe the functionality of any vapor-liquid separator (and, so, in particular of the vapor-liquid separator 801) as if it has not an only inlet, but several distinct inlets. Making this statement, it is ideally possible to describe the functionality of the vapor-liquid separator 801 disposed downstream of the ejector 500 along the liquid forward flow line 73 as if it has two distinct ideal inlets for the two ideal flows previously described: through the first ideal inlet of the vapor-liquid separator 801 flows the first ideal flow which enter the ejector 500 by the motive port 501 and goes out through the first of the two ideal discharge ports of the ejector 500. On the contrary, through the second ideal inlet of the vapor-liquid separator 801 flows the second ideal flow which enters the ejector 500 by the suction port 502 and goes out through the second of the two ideal discharge ports of the ejector 500. In any case, it is technically feasible to use two pipes in parallel instead of a single pipe to connect the unique physic outlet of the ejector 500 to the unique physic inlet of the vapor-liquid separator 801. In the present case, the two ideal parallel flow lines that connect the unique physic outlet of the ejector 500 to the unique physic inlet of the vapor-liquid separator 801 are respectively to be understood the first one as the liquid forward flow line 73 and the second one as the single suction line 79. The remaining components of the circuit 10 are the same already described for the preferred embodiment shown in FIG. 2. In detail, the closed loop vapor cycle refrigeration system 10 as shown in FIG. 3 comprises the two compressors 12 and 13 to compress the gas refrigerant. Then, compressed hot gas refrigerant flows or passes to the condenser 21 by means of the hot gas flow line 71 for cooling and condensing the compressed gas refrigerant and to the receiver or reservoir 31 by means of the condensated refrigerant flow line 72 to accumulate the condensed refrigerant. Then, the liquid refrigerant flows into the liquid forward flow line 73 connecting an outlet of the receiver 31 to the inlet of the unique expansion device 61 circulating through the open liquid forward flow line valve 110 and then through the ejector 500 by means of its motive port 501 and then through the vapor-liquid separator 801. Thus, in normal operation the liquid refrigerant leaving the receiver 31—after being circulated through the open liquid forward flow line valve 110—flashes primarily in a mixture of liquid and vapor while it flows through the ejector 500. In the sequel, such mixture is simply indicated as primarily flashed refrigerant. So, the primarily flashed refrigerant leaving the ejector 500 flows into the vapor-liquid separator 801 where is divided into two phases: the liquid phase and the vapor phase. The liquid phase of the primarily flashed refrigerant continues to flow into the liquid forward flow line 73 to the unique expansion device 61 where it flashes; then, the liquid phase now flashed of the primarily flashed refrigerant flows into the flashed refrigerant flow lines 74*a-c*— circulating through the respective check valves—to the inlets of the evaporators 41*a-c*. Then, this liquid phase now flashed of the primarily flashed refrigerant evaporates into the evaporators 41*a-c* so as to cool a fixture or other refrigerated space surrounding each evaporator. The refrigerant so passes from flashed liquid state at the inlets of the evaporators 41*a-c* at evaporated cold gas state in the outlet from the same evaporators. Then, the evaporated cold gas refrigerant originated from the liquid phase of the primarily flashed refrigerant leaving the evaporators 41*a-c* and flowing into the cold gas flow lines 76*a-c* circulates through the open valves of the cold gas flow lines 102*a-c* to the suction manifold 77 which brings together the three flows of evaporated cold gas into the single suction line 79. Said single evaporated cold gas flow originated from the liquid phase of the primarily flashed refrigerant flowing into the single suction line 79 circulates through the ejector 500 by means of its suction port 502 where is increased in pressure. Then, the flow of evaporated cold gas refrigerant now increased in pressure originated from the liquid phase of the primarily flashed refrigerant flows into the vapor-liquid separator 801 where it reunites with the previously described vapor phase of the primarily flashed refrigerant and together they flow to the inlets of the compressors 12 and 13. Thus, the vapor-liquid separator 801 acts as an accumulator for the compressors 12 and 13.

Referring to FIG. 3, all the check valves not yet mentioned as the elements 42a-c, 75a-c, 78a-c, 101a-c, 111, 221, 241a-c, 301a-c, 302a-c, 304, 308a-c, 309a-c, 700, 701, 702 are arranged in the same positions in the system 10 as well as in the preferred embodiment previously described above and shown in FIG. 2 and have the same functions.

Although the description of this other embodiment of the system according to the present invention as shown in FIG. 3 is provided as if the plurality of evaporators consists of the parallel of three evaporators in normal flow, it is intended valid for whatever number of evaporators greater than one.

Figure 4:
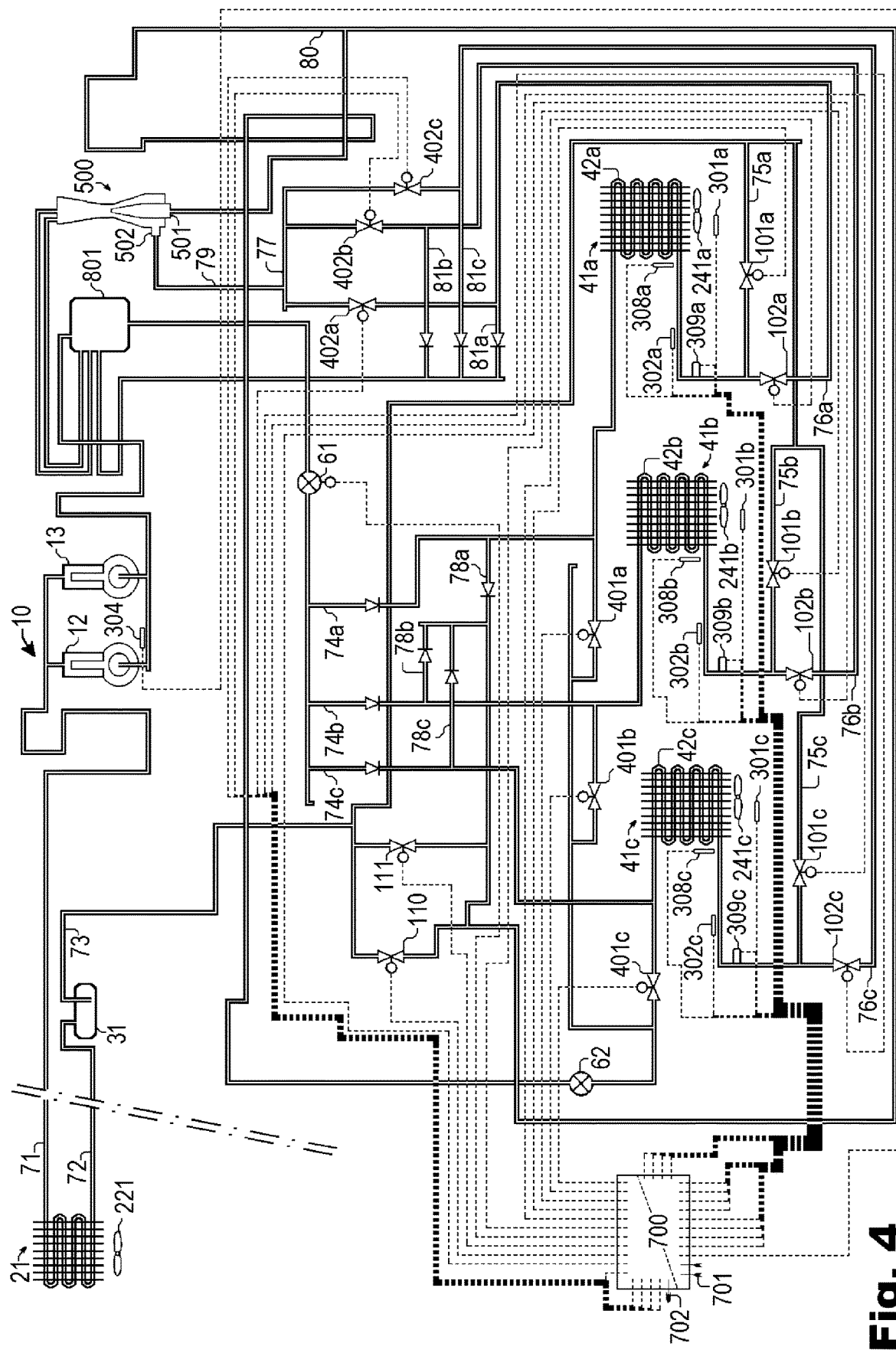
FIG. 4 is an embodiment of a closed loop vapor cycle refrigeration system as described above with reference to FIG. 3 comprising in addition an auxiliary liquid flow line branched off from the liquid forward flow line up to an auxiliary expansion device feeding during the defrosting of the selected evaporator a second non-selected evaporator of the plurality of evaporators at an evaporating pressure somewhat higher in comparison to the evaporating pressure at which a first non-selected evaporator is fed by the unique expansion device feeding all the evaporators in normal flow according to the present invention by the use of further flow lines, further check valves and isolation valves thus obtaining that the suction pressure of the compressor is—without eventually pressure drops—the higher evaporating pressure of the two distinct non-selected evaporators of the plurality of evaporators.

Referring to FIG. 3, it is now described the defrosting operation of the selected evaporator 41a of this other embodiment of the system according to the present invention. More particularly, during the defrosting operation of the selected evaporator 41a the circulation of the refrigerant—from its exit out of the compressors—proceeds exactly in the same way as already described previously for the defrosting operation of the selected evaporator 41a relative to the preferred embodiment shown in FIG. 2 until the sub-cooled liquid refrigerant—which comes from the selected evaporator 41a and runs through the low pressure side of the closed liquid forward flow line valve 110—joins together with the liquid refrigerant leaving the receiver 31 and flowing through the became open valve 111 of the bypass line. From this point on, in contrast to what already described previously relative to the preferred embodiment shown in FIG. 2, such sub-cooled liquid refrigerant—sum of the sub-cooled liquid refrigerant coming from selected evaporator 41a and of the liquid refrigerant leaving the receiver 31 and flowing through the became open valve 111 of the bypass line—leaving the low pressure side of the liquid forward flow line valve 110 enters the ejector 500 through its motive port 501 where it flashes in a mixture of liquid and vapor. In the sequel, such mixture is indicated in a similar manner to the normal operation previously described simply as primarily flashed refrigerant. Then, said primarily flashed refrigerant flows into the vapor-liquid separator 801 where it is divided into two phases: the liquid phase and the vapor phase. The liquid phase of the primarily flashed refrigerant continues to flow by means of the liquid forward flow line 73 to the unique expansion device 61. Then, the liquid phase of the primarily flashed refrigerant flashes while it flows through the expansion device 61. Then, the liquid phase now flashed of the primarily flashed refrigerant flows into the only flashed refrigerant flow lines 74b and 74c—circulating through the respective check valves—to supply the liquid phase now flashed of the primarily flashed refrigerant to the two non-selected evaporators 41b and 41c where it evaporates. The refrigerant so passes from flashed liquid state at the entry of the two evaporators 41b and 41c at evaporated cold gas state in outlet from the evaporators themselves. Then, the evaporated cold gas refrigerant originated from the liquid phase of the primarily flashed refrigerant leaves the two non-selected evaporators 41b and 41c and flows into the two cold gas flow lines 76b and 76c—circulating through the respective open cold gas flow lines valves 102b and 102c—to the suction manifold 77 and then—circulating in the single suction line 79—flows through the ejector 500 by means of its suction port 502 where it is increased in pressure. Then, the evaporated cold gas refrigerant now increased in pressure originated from the liquid phase of the primarily flashed refrigerant flows into the vapor-liquid separator 801 and from here together with the vapor phase of the primarily flashed refrigerant flows to the compressors 12 and 13. The description above reported of the defrost cycle for the selected evaporator 41a of this other embodiment according to the present invention as shown in FIG. 3 applies in analogy if the selected evaporator is the evaporator 41b or the evaporator 41c. Referring now to FIG. 4, it is shown another embodiment of the system according to the present invention whereby, in contrast to the embodiment previously described above and shown in FIG. 3, the system 10 in addition comprises an auxiliary expansion device 62 arranged at the end of an auxiliary liquid flow line 80. This auxiliary liquid flow line 80 is branched off from liquid forward flow line 73 and in particular it connects the low pressure side of the liquid forward flow line valve 110 to the inlet of said auxiliary expansion device 62. Three auxiliary flashed refrigerant flow lines, then, connect the outlet of said auxiliary expansion device 62 to a portion of the three flashed refrigerant flow lines 74a-c, each of these portions being disposed between the corresponding check valve and the corresponding evaporator 41. Each of these just described three auxiliary flashed refrigerant flow lines has an isolation valve 401 therein. For instance, the auxiliary flashed refrigerant flow line connecting the outlet of said auxiliary expansion device 62 to a portion of the flashed refrigerant flow line 74c—portion disposed between the corresponding check valve and the corresponding evaporator 41c—includes the isolation valve 401c therein. Similarly it happens for valves 401a and 401b relative to the evaporators 41a and 41b. The isolation valves 401a-c are generic control valves (as the solenoid-valves). Another difference is that the system 10 in addition comprises other three isolation valves 402a-c, each of which arranged in the respective cold gas flow line 76 and disposed between the corresponding cold gas flow line valve 102 and the suction manifold 77. For instance, the isolation valve 402c is arranged in the respective cold gas flow line 76c and disposed between the corresponding cold gas flow line valve 102c and the suction manifold 77. Similarly it happens for valves 402a and 402b. Another difference is that the system 10 comprises three auxiliary cold gas flow lines 81a-c, each of these three auxiliary cold gas flow lines 81a-c connecting a portion of the corresponding cold gas flow line 76—portion disposed between the corresponding cold gas flow line valve 102 and the corresponding isolation valve 402—directly to the vapor-liquid separator 801 through its ideal third inlet as will be better described below so as to allow the entrance of the evaporated cold gas refrigerant leaving the evaporators 41a-c into the vapor-liquid separator 801 bypassing both the suction manifold 77 and the ejector 500. Each of these three auxiliary cold gas flow lines 81a-c having a check valve therein.

Referring to FIG. 4, the other check valves not yet mentioned as the elements 12, 13, 21, 31, 42a-c, 61, 71, 72, 75a-c, 78a-c, 79, 101a-c, 111, 221, 241a-c, 301a-c, 302a-c, 304, 308a-c, 309a-c, 501, 502, 700, 701, 702 are arranged in the same positions in the system 10 as well as the embodiment previously described above and shown in FIG. 3 and have the same functions. In particular, as previously described above, the functionality of the ejector 500 can be made as if ideally the ejector 500 has two distinct outlets—that is to say two distinct discharge ports—and thus was traversed by two distinct ideal flows: the first ideal flow would be what enters the motive port 501 and goes out through the first of the two ideal discharge ports while the second ideal flow would be what enters by the suction port 502 and goes out through the second of the two ideal discharge ports—the thermodynamic conditions obviously being the same in the ejector outlet of the two ideal flows.

Moreover, as already anticipated and in analogy to the embodiment previously described above and shown in FIG.

3, for this embodiment as shown in FIG. 4 it is possible ideally to describe the functionality of the vapor-liquid separator 801 as if it had three distinct ideal inlets: through the first ideal inlet of the vapor-liquid separator 801 flows the first ideal flow entering the ejector 500 by the motive port 501 and going out through the first of the two ideal discharge ports of the ejector 500. On the contrary, through the second ideal inlet of the vapor-liquid separator 801 flows the second ideal flow entering the ejector 500 by the suction port 502 and going out through the second of the two ideal discharge ports of the ejector 500. Finally, the third ideal inlet of the vapor-liquid separator 801 as said is connected with the common termination—that is to say downstream of the respective check valves—of the three auxiliary cold gas flow lines 81a-c and is not traversed by any refrigerant flow during normal operation, but only during the defrosting of the selected evaporator as will be better described below.

Although the description of this other embodiment of the system according to the present invention shown in FIG. 4 is provided as if the plurality of evaporators consists of the parallel of three evaporators in normal flow, it is intended valid for whatever number of evaporators greater than two.

Referring to FIG. 4, during normal operation the three isolation valves 401a-c are closed: thus, the refrigerant doesn't flow into the auxiliary liquid flow line 80 and doesn't flow through the auxiliary expansion device 62 and doesn't flow into the three auxiliary flashed refrigerant flow lines starting from said auxiliary expansion device 62. Moreover, due to the presence of the check valves arranged in the three auxiliary cold gas flow lines 81a-c, the refrigerant during normal operation doesn't flow either in said three auxiliary cold gas flow lines 81a-c. On the contrary, during normal operation the refrigerant flows through the other three open isolation valves 402a-c before entering the suction manifold 77. Thus, except the circulation of evaporated cold gas refrigerant through the three open isolation valves 402a-c, the normal operation is exactly the same described above with reference to the embodiment shown in FIG. 3.

Referring to FIG. 4, it will now be described in detail the defrosting cycle for the selected evaporator 41a. In particular, it will now be described a defrost cycle for the exemplary case where a frost condition is detected at coil 42a of the evaporator 41a of refrigeration system 10 and where the coil 42c of the evaporator 41c is the last just defrosted coil while the coil 42b of the evaporator 41b is partially frosted but it does not need to be defrosted yet. Initially, during normal operation the valve 110 and the valves 102a-c and the already mentioned isolation valves 402a-c are open while the valve 111 and the valves 101a-c and the already mentioned isolation valves 401a-c are closed. When the frosting condition for the coil 42a is detected by the frost sensor 308a at the evaporator 41a, the defrosting cycle it then started by the control circuit 700 for the evaporator 41a. During the defrosting cycle of the exemplary case the compressed hot gas refrigerant leaving the compressors 12 and 13 flows or passes to the condenser 21 by the hot gas flow line 71 for cooling and condensing the compressed refrigerant and to the reservoir or receiver 31 by the condensated refrigerant flow line 72 to accumulate the condensed refrigerant; then the liquid refrigerant flows into the liquid forward flow line 73. The cold gas flow line valve 102a is then closed to isolate the evaporator 41a from the compressors 12 and 13. The defrosting liquid supplying valve 101a arranged in the liquid reverse flow line 75a is then or open slowly or pulse open to pressurize slowly the portion of the cold gas flow line 76a disposed between the became closed cold gas flow line valve 102a and the evaporator 41a by defrosting liquid. The slow pressurization of the portion of the cold gas flow line 76a disposed between the became closed cold gas flow line valve 102a and the evaporator 41a prevents shocking events of the cold gas flow line 76a and of the evaporator 41a. The valve 110 is then closed, the valve 111 of the bypass line is then open, the isolation valve 402c is then closed and the isolation valve 401c is then open. The valve 111 of the bypass line can be throttled open. The evaporator 41a is now defrosted by the reverse liquid refrigerant flow through the liquid reverse flow line 75a-circulating through the became open liquid defrosting supplying valve 101a—and then through the coil 42a. The liquid refrigerant releases heat while it flows through the coil 42a in reverse direction to normal flow, melting the ice accumulated on the coil 42a, defrosting thus the coil 42a. At the same time the liquid refrigerant becomes sub-cooled. The defrosting liquid flow during defrosting coil 42a may be controlled by the became open liquid defrosting supplying valve 101a. The sub-cooled liquid refrigerant leaves the evaporator 41a in reverse direction to normal flow and flows in reverse direction to normal flow into the flashed refrigerant flow line 74a, then flows into the additional liquid reverse flow line 78a—circulating through the respective check valve—and so flows through the low pressure side of the liquid forward flow line valve 110 where it joins together with the liquid refrigerant leaving the receiver 31 and flowing through the became open valve 111 of the bypass line. Then, such single flow of sub-cooled liquid refrigerant—sum of the sub-cooled liquid refrigerant coming from selected evaporator 41a and the liquid refrigerant leaving the receiver 31 and flowing through the became open valve 111 of the bypass line—leaving the low pressure side of the liquid forward flow line valve 110 is divided into a first part of sub-cooled liquid refrigerant and into a second part of sub-cooled liquid refrigerant. The first part of sub-cooled liquid refrigerant continues to flow into the liquid forward flow line 73 through the ejector 500 by means of the its motive port 501; on the contrary, the second part of sub-cooled liquid refrigerant flows into the auxiliary liquid flow line 80 to the auxiliary expansion device 62. Said second part of sub-cooled liquid refrigerant flashes while it flows through the auxiliary expansion device 62.

Then, the second part of sub-cooled liquid refrigerant now flashed leaving the auxiliary expansion device 62 flows into the auxiliary flashed refrigerant flow line connecting the outlet of said auxiliary expansion device 62 to a portion of the flashed refrigerant flow line 74c and—circulating through the became open isolation valve 401c—enters in order to evaporate into the coil 42c of the evaporator 41c by means of the final part of flashed refrigerant flow line 74c that is to say that part disposed downstream of the respective check valve. The refrigerant so passes from flashed sub-cooled liquid state in inlet to the evaporator 41c to evaporated cold gas state in outlet of evaporator itself. Then, the evaporated cold gas refrigerant originated from the second part of sub-cooled liquid refrigerant leaves the evaporator 41c and flows into the cold gas flow line 76c—circulating through the open cold gas flow line valve 102c—and then flows into the auxiliary cold gas flow line 81c—circulating through the respective check valve—until to reach directly the vapor-liquid separator 801 without passing through the suction manifold 77 and the ejector 500 because the valve 402c is became closed. On the contrary, the first part of sub-cooled liquid refrigerant flowing into the liquid forward flow line 73 enters the ejector 500 by means of the its motive port 501. This first part of sub-cooled liquid refrigerant flashes in a mixture of liquid and vapor while it flows through the ejector 500: in the sequel, such mixture which comes from the flashing of the only first part of sub-cooled liquid refrigerant is indicated as flashed first part of sub-cooled liquid refrigerant. This flashed first part of sub-cooled liquid refrigerant enters the vapor-liquid separator 801 where it divides in the liquid phase and the vapor phase. The liquid phase of the flashed first part of sub-cooled liquid refrigerant coming out of the vapor-liquid separator 801 flows through the expansion device 61. The liquid phase of the flashed first part of sub-cooled liquid refrigerant flashes while it flows through the expansion device 61 at a pressure somewhat lower of the pressure of the flashed second part of sub-cooled liquid refrigerant leaving the auxiliary expansion device 62. Then, the liquid phase now flashed of the flashed first part of sub-cooled liquid refrigerant leaves the expansion device 61 and flows into the flashed refrigerant flow line 74b—passing by the relative check valve—to the coil 42b of the evaporator 41b where it evaporates. The refrigerant so passes from flashed liquid state at the inlet of the evaporator 41b to evaporated cold gas state at the outlet of the same evaporator. Then, the evaporated cold gas refrigerant originated from the liquid phase of the flashed first part of sub-cooled liquid refrigerant leaves the evaporator 41b and flows into the cold gas flow line 76b—circulating through the open cold gas flow line valve 102b and through the open isolation valve 402b—and then flows through the suction manifold 77 and then flows into the single suction line 79—circulating through the suction port 502 of the ejector 500 to increase the pressure. Then, the evaporated cold gas refrigerant now increased in pressure originated from the liquid phase of the flashed first part of sub-cooled liquid refrigerant leaves the ejector 500 in the single suction line 79 and enters the vapor-liquid separator 801 where meets both the vapor phase of the flashed first part of sub-cooled liquid refrigerant and the evaporated cold gas refrigerant originated from second part of sub-cooled liquid refrigerant leaving the evaporator 41c and together with these other two refrigerant streams continues to flow into the suction line 79 to the inlets of the compressors 12 and 13. As a result, the inlet pressure of the compressors 12 and 13 is—without eventually pressure drops—the pressure of the evaporated cold gas refrigerant coming from the sub-cooled liquid refrigerant second part which leaves the evaporator 41c that is to say the evaporating pressure of the evaporator 41c. Said evaporating pressure is somewhat higher of the evaporating pressure of the evaporator 41b as described above. Thus, the suction pressure of the compressors 12 and 13—without eventually pressure drops—is the higher evaporating pressure of the two distinct non-selected evaporators 41b and 41c during the defrosting cycle of the exemplary case. It is explicitly observed as during defrosting operation of the exemplary case just described the open or closed condition of the isolation valve 402a is indifferent being the isolation valve at issue not feeded because the cold gas flow line valve 102a has become closed. Thus, compared to normal operation the valves 101b-c and 401a-b remain closed during defrosting operation of the exemplary case while the valves 101a, 111 and 401c become open. Conversely, compared to normal operation the valves 102b, 102c and 402b remain open during defrosting operation of the exemplary case while the valves 102a, 110 and 402c become closed. The valve 402a on the other hand, can remain open or can become closed indifferently.

Figure 5:
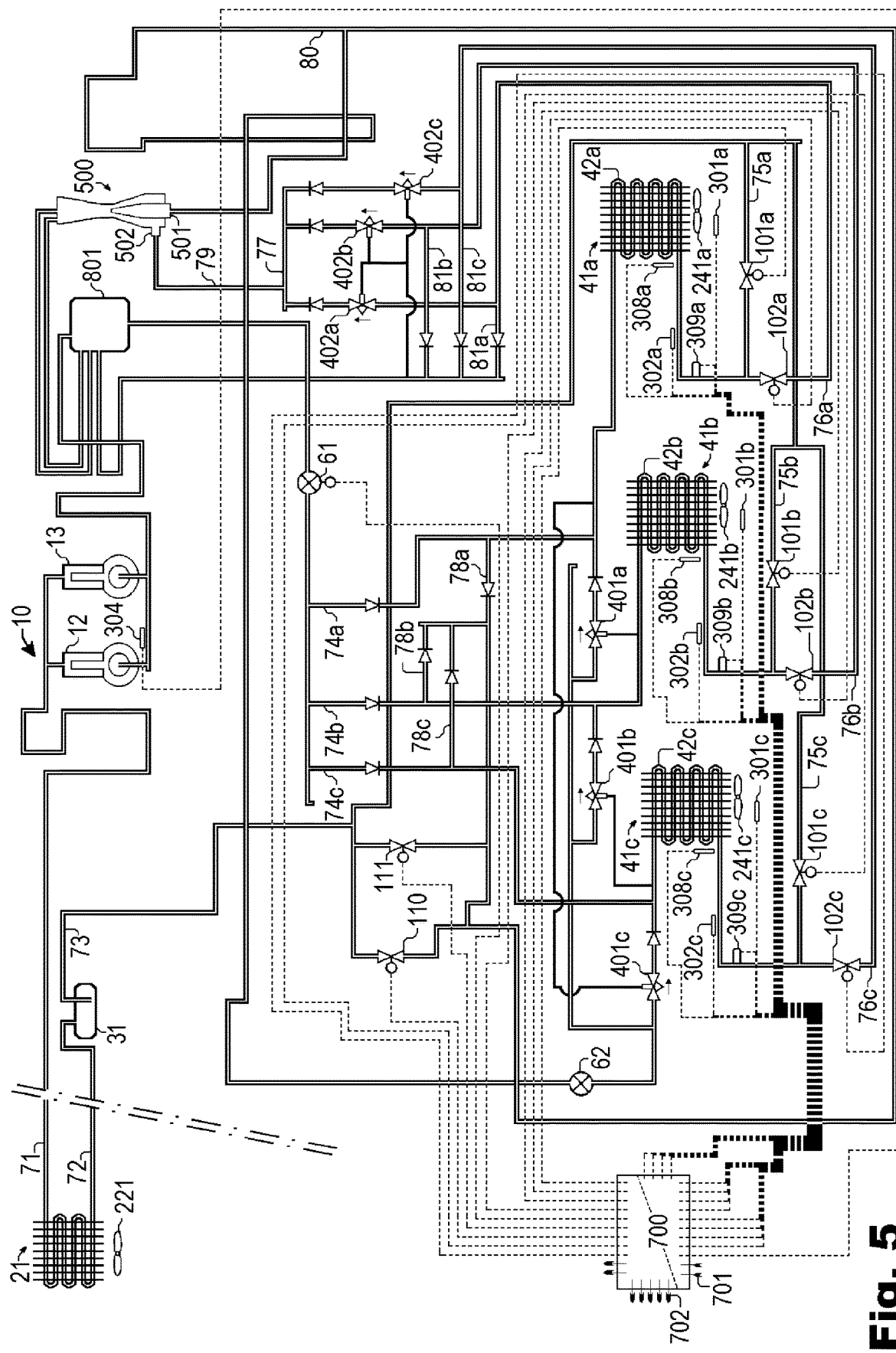
FIG. 5 is an embodiment of a closed loop vapor cycle refrigeration system as described above with reference to FIG. 4 whereby the more generic isolation controlled valves are replaced by automatic valves of the close on rise of inlet pressure type equipped with check valves in the outlet side, said automatic valves of the close on rise of inlet pressure type opens only when the inlet pressure is somewhat lower than a reference pressure, said reference pressure being the pressure of a convenient section of the closed loop vapor cycle refrigeration system transmitted to the automatic valve of the close on rise of inlet pressure type by a narrow tube according to the present invention.

Referring to FIG. 5, it is shown another embodiment of the system according to the present invention whereby, in contrast to the embodiment previously described above and shown in FIG. 4, in the refrigeration system 10 the isolation valves are automatic valves of the close on rise of inlet pressure type—equipped with check valves in the outlet sides—instead of generic control valves (as the solenoid-valves). Each automatic valve of the close on rise of inlet pressure type opens only when the inlet pressure is somewhat lower than a reference pressure; said reference pressure being the pressure of a convenient section of the closed loop vapor cycle refrigeration system 10 transmitted to the automatic valve of the close on rise of inlet pressure type by a narrow tube, as it will be described more particularly later on.

Referring to FIG. 5, the automatic valve of the close on rise of inlet pressure type 401c is initially closed during normal operation. In fact, the reference pressure of the automatic valve of the close on rise of inlet pressure type 401c is the inlet pressure of the evaporator 41a. During normal operation, the inlet pressure of the evaporator 41a is the low pressure of the flashed refrigerant leaving the expansion device 61. On the contrary, in order to allow the refrigerant flow through the automatic valve 401c in the direction that goes from the auxiliary expansion device 62 to the inlet of the evaporator 41c, the upstream pressure of the valve 401c can not be lower than the downstream pressure of the valve itself. Moreover, the downstream pressure of the automatic valve 401c is the low pressure in entrance to the evaporator 41c that is to say the pressure of the flashed refrigerant leaving the expansion device 61 that is to say the reference pressure. Thus, the inlet pressure of the automatic valve 401c during normal operation can not be lower than the reference pressure and so the automatic valve 401c is closed. The description of the closed condition during normal operation of the automatic valve of the close on rise of inlet pressure type 401c applies in the same way to the automatic valves 401a and 401b because the reference pressure of the automatic valve of the close on rise of inlet pressure type 401a is the pressure of the inlet of the evaporator 41b while the reference pressure of the automatic valve of the close on rise of inlet pressure type 401b is the pressure of the inlet of the evaporator 41c.

On the other hand, during the defrosting operation of the exemplary case the inlet pressure of the selected evaporator 41a is the pressure of the sub-cooled liquid refrigerant, so an high pressure. Always during defrosting operation of the exemplary case the inlet pressure of the automatic valve 401c is the low pressure of the flashed refrigerant leaving the auxiliary expansion device 62. Thus, the inlet pressure of the automatic valve 401c is surely somewhat lower than the reference pressure during defrosting operation of the exemplary case and thus the automatic valve 401c becomes open.

On the contrary, during defrosting operation of the exemplary case the inlet pressure of the automatic valve 401a is higher than the reference pressure: in fact, as described above, the inlet pressure of the automatic valve 401a is the evaporating pressure of the evaporator 41c that is somewhat higher than the evaporating pressure of the evaporator 41b as described above and, thus, the automatic valve 401a remains closed. Finally, during defrosting operation of the exemplary case the inlet pressure of the automatic valve 401b is equal to the inlet pressure of the automatic valve 401c while the reference pressure for the automatic valve 401b is equal to the outlet pressure of the automatic valve 401c. So, the inlet pressure of the automatic valve 401b is not lower than the reference pressure: thus, the automatic valve 401b remains closed.

Referring to FIG. 5, the three automatic valves of the close on rise of inlet pressure type 402a-c are initially open during normal operation. In fact, the reference pressure for all the three automatic valves 402a-c is the pressure of the common termination of the three auxiliary cold gas flow lines 81a-c—downstream of their respective check valves—that in the absence of further elements interposed before of the vapor-liquid separator 801—coincides with the pressure of the vapor-liquid separator 801 that is to say coincides with the high pressure at the inlet of the expansion device 61. On the contrary, the inlet pressure of the automatic valves 402a-c is the low pressure of the evaporated refrigerant. So, the inlet pressure of the automatic valves 402a-c will be surely lower than that of the reference pressure during normal operation and so the automatic valves 402a-c are open.

Referring to FIG. 5, the automatic valve of the close on rise of the inlet pressure type 402b remains open during defrosting operation of the exemplary case because in this case the pressure of the vapor-liquid separator 801—that is to say the reference pressure for the valve 402b—is—without eventually pressure drops—the evaporating pressure of the evaporator 41c which for what has been said is somewhat higher of the evaporating pressure of the evaporator 41b. So, the inlet pressure of the automatic valve 402b is somewhat lower of the reference pressure and so the automatic valve 402b continues to be open.

Always referring to FIG. 5, it is explicitly noted that during defrosting operation of the exemplary case the upstream pressure of the check valve of the auxiliary cold gas flow line 81c is the same or in any case surely not lower than the downstream pressure of the check valve itself. Thus, during defrosting operation of the exemplary case the automatic valve of the close on rise of inlet pressure type 402c becomes closed because the inlet pressure of the automatic valve 402c—which is the same to the upstream pressure of its own check valve—is surely not lower than the downstream pressure of its own check valve that is to say of the reference pressure.

As already mentioned for the embodiment of the system previously described above and shown in FIG. 4, also for this other embodiment of the system according to the present invention shown in FIG. 5 during defrosting operation of the exemplary case the open or closed condition of the isolation valve 402a —whether it is an automatic valve or not—is indifferent being the isolation valve 402a not feeded because the cold gas flow line valve 102a has become closed. Always compared to the previously described embodiment shown in FIG. 4 it is clear for this other embodiment of the system according to the present invention shown in FIG. 5 that there is a smaller number of busy outputs 702 of the controller 700.

Referring to FIG. 5, the other check valves not yet mentioned so as the elements 12, 13, 21, 31, 42a-c, 71, 72, 73, 74a-c, 75a-c, 76a-c, 77, 78a-c, 79, 80, 101a-c, 102b-c, 110, 111, 221, 241a-c, 301a-c, 302a-c, 304, 308a-c, 309a-c, 500, 501, 502, 700, 701, 702 are arranged in the same positions in the system 10 as well as in the embodiment previously described above and shown in FIG. 4 and have the same functions. More particularly, for this other embodiment according to the present invention and as shown in FIG. 5 both normal operation and defrosting operation for the exemplary case are the same of the embodiment previously described above and shown in FIG. 4.

Figure 6:
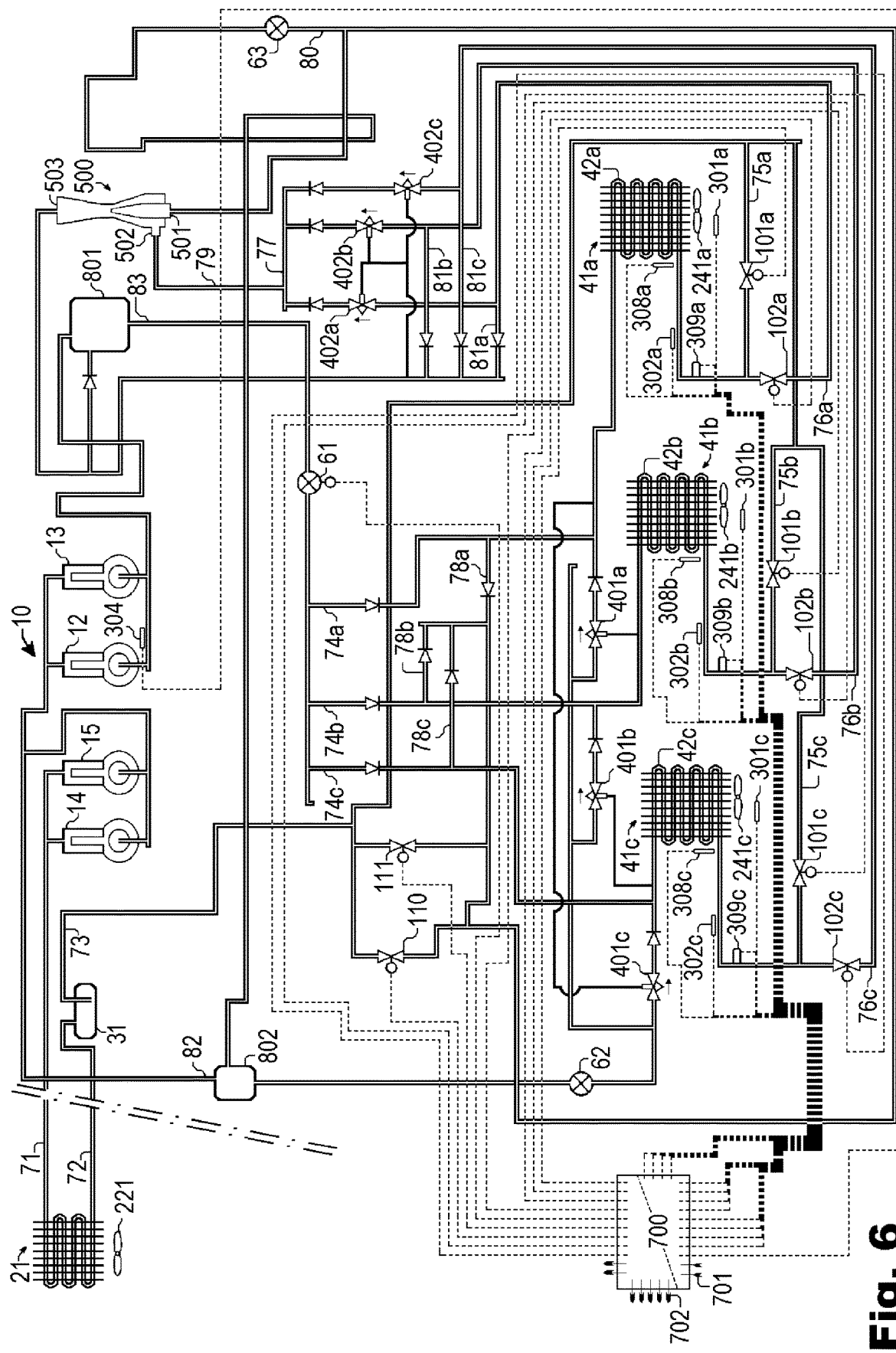
FIG. 6 is an embodiment of a closed loop vapor cycle refrigeration system as described above with reference to FIG. 5 comprising in addition a second compression stage connected to a second vapor-liquid separator and a further auxiliary expansion device according to the present invention.

Referring now to FIG. 6, it is shown another embodiment of the system according to the present invention whereby, in contrast to the embodiment previously described above and shown in FIG. 5, the system 10 further comprises a second auxiliary expansion device 63 and a second vapor-liquid separator 802 arranged in the auxiliary liquid flow line 80. Moreover, the system 10 further comprises the parallel of two others compressors 14 and 15, said parallel being disposed in series downstream of the parallel of the compressors 12 and 13 so as the vapor compression is a double stage compression. Moreover, the system 10 comprises a supplementary flow line 82 connects an outlet of the second vapor-liquid separator 802 to the inlet of the second compression stage that is to say to the outlet of the compression first stage. Moreover, the two distinct ideal flow lines coming out from the ejector 500 and entering the first vapor-liquid separator 801 are now combined into one flow line in which it also converges the common termination of the three auxiliary cold gas flow lines 81a-c that is to say downstream of the respective check valves. It assumes that this unique flow line coming out from the ejector 500—by its unique outlet physic port numbered from now on 503—and in inlet to the first vapor-liquid separator 801 by its unique physic inlet port—flow line in which converges also the common termination of the three auxiliary cold gas flow lines 81a-c downstream of the respective check valves—is the suction line 79 and that thus the liquid forward flow line 73 ends at the motive port 501 of the ejector 500. Moreover, the flow line connecting an outlet of the first vapor-liquid separator 801 to the unique expansion device feeding all the evaporators of the plurality of evaporators in normal flow 61—which was formerly an integral part of the liquid forward flow line 73—it is now numbered as a further stand-alone supplementary flow line 83. Finally, a further check valve is arranged in the suction line 79 and is disposed between the confluence of the common termination of the three auxiliary cold gas flow lines 81a-c and the inlet of the first vapor-liquid separator 801 in order to prevent the flooding of the ejector during the "shut-off". Referring to FIG. 6, the check valves not yet mentioned as the elements 21, 31, 41a-c, 42a-c, 62, 71, 72, 74a-c, 75a-c, 76a-c, 77, 78a-c, 101a-c, 102a-c, 110, 111, 221, 241a-c, 301a-c, 302a-c, 304, 308a-c, 309a-c, 401a-c, 402a-c, 502, 700, 701, 702 are arranged in the same positions in the system 10 as well as in the embodiment previously described above and shown in FIG. 5 and have the same functions. More particularly, for this other embodiment according to the present invention and as shown in FIG. 6 the normal operation is the same as that relating to the two embodiments previously described above and shown in FIG. 4 and FIG. 5. On the contrary, regarding the defrosting operation for the exemplary case it differs for this embodiment as shown in FIG. 6 from defrosting operations for the exemplary case just described above with regard to the embodiments shown in FIG. 4 and FIG. 5 just for the fact that the second part of sub-cooled liquid refrigerant flashes while it flows through the second auxiliary expansion device 63 and then it is divided into its two phases inside the second vapor-liquid separator 802: the liquid phase and the vapor phase. The vapor phase of the flashed second part of the sub-cooled liquid refrigerant flows into the supplementary flow line 82 to the inlet of the second compression stage. On the contrary, the liquid phase of the flashed second part of the sub-cooled liquid refrigerant entering the first auxiliary expansion device 62 behaves like the already described "not flashed" second part of sub-cooled liquid refrigerant entering the first auxiliary expansion device 62 during defrosting operation of the exemplary case relating to the two embodiments previously described above and shown in FIG. 4 and FIG. 5. Finally, the first part of sub-cooled liquid refrigerant flows in the same way already described for the defrosting operation of the exemplary case relating to two embodiments shown in FIG. 4 and FIG. 5.

Figure 7:
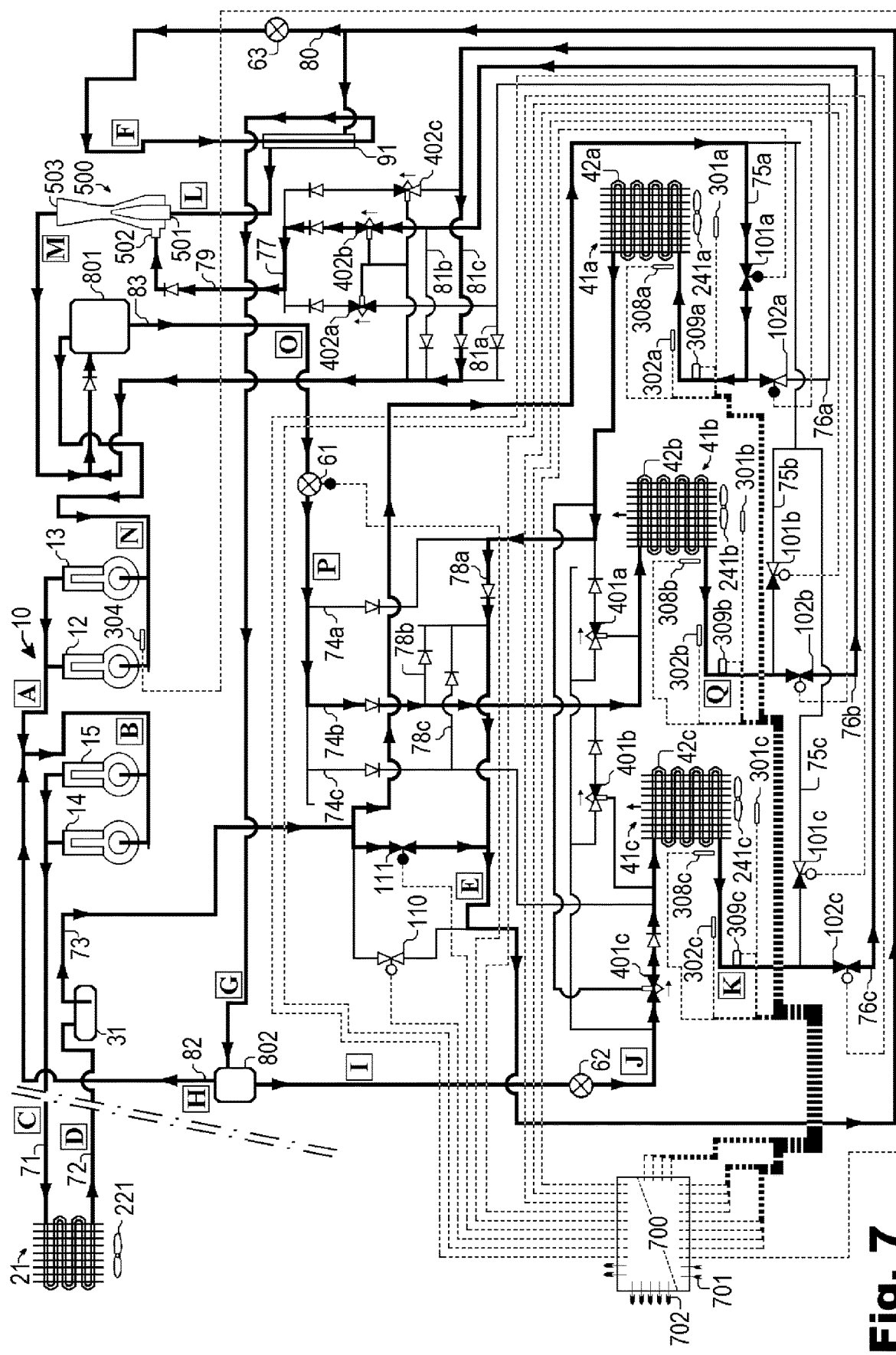
FIG. 7 is the flow diagram of the reverse liquid defrosting process of a selected evaporator relating to the embodiment of the system described above with reference to FIG. 6 where thick lines with arrows represent the refrigerant circuit and where the squared letters represent some relevant sections of the system according to the present invention.

More in detail, regarding the operation of the embodiment under exam as it is shown in FIG. 6 during defrosting operation of the exemplary case we can refer to FIG. 7 where it is in fact shown the flow diagram of the reverse liquid defrosting process for the exemplary case that is to say of the case in which—we repeat—a frost condition is detected at coil 42a of the evaporator 41a of refrigeration system 10 and where the coil 42c of the evaporator 41c is the last just defrosted coil while the coil 42b of the evaporator 41b is partially frosted but it does not yet need to be defrosted so as the evaporating pressure into the coil 42c—which is somewhat higher of the evaporating pressure into the coil 42b—coincides—without eventually pressure drops—with the suction pressure of the compressors 12 and 13. In the flow diagram of FIG. 7 bold lines with arrows represent the refrigerant circuit and the squared letters represent some relevant sections of the system 10.

To simplify, they are not shown the two analogous flow diagrams of the reverse liquid defrosting process respectively for the evaporators 41b and 41c concerning always the embodiment previously described above with reference to FIG. 6.

Figure 8:
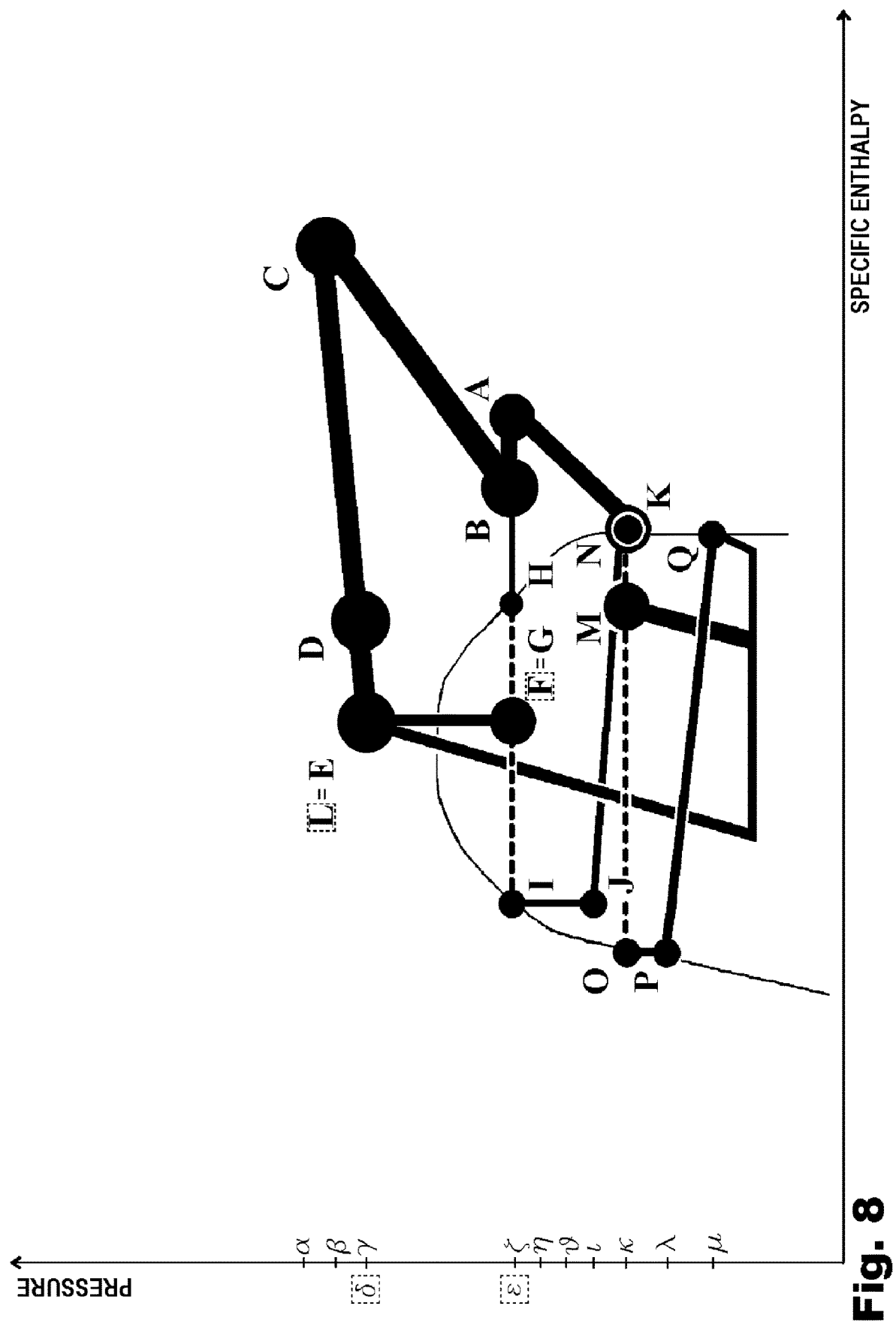
FIG. 8 is a Mollier diagram showing the thermodynamic state of a low-boiling refrigerant circulating in the system according to the present invention described above with reference to embodiment of FIG. 6 at the relevant sections of the system shown in the flow diagram of FIG. 7 during defrosting operation of a selected evaporator where the Greek letters represent the different pressure levels of the thermodynamic cycle.

Refer now to FIG. 8 where it is represented the Mollier diagramm showing the thermodynamic state of a low-boiling refrigerant as carbon dioxide circulating in the system described above with reference to the embodiment of FIG. 6 during defrosting operation of the exemplary case at the relevant sections of the system indicated in the flow diagram of FIG. 7 by squared letters. The greater the size of the points, the greater the mass flow rate of refrigerant in the corresponding sections. The Greek letters represent the different pressure levels of the thermodynamic cycle.

Figure 9:
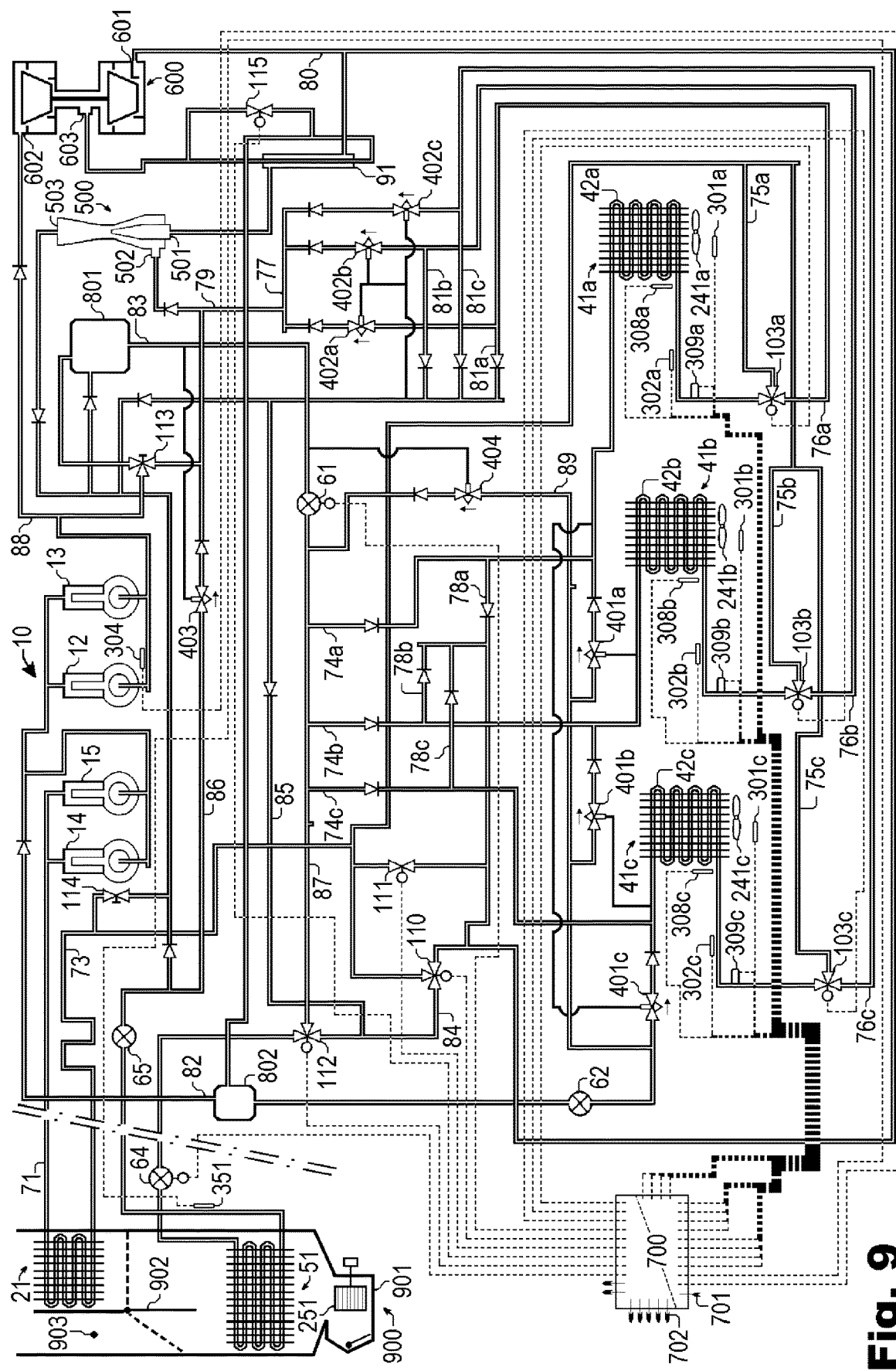
FIG. 9 is an embodiment of the system according to the present invention as described above with reference to FIG. 6 adapted to be used as heat pump mobile system for vehicle internal air conditioning by the use, in addition, among other devices of an external heat exchanger arranged—together with the condenser—in a treatment unit of vehicle internal air, an expander-compressor group in place of the further auxiliary expansion device, an internal heat exchanger, supplementary flow lines and supplementary valves.

Referring to FIG. 9, it is shown another embodiment of the system according to the present invention whereby, in contrast to the embodiment previously described above and shown in FIG. 6, the system 10 is adapted to be used as heat pump mobile system for vehicles internal air conditioning at different re-heating performance levels. More in detail, this last embodiment of the system according to the present invention differs from that previously described above and shown in FIG. 6 mainly due to the fact of having a another auxiliary expansion device 64 and an external heat exchanger 51 arranged in a further supplementary flow line 84 branched off from liquid forward flow line 73 and having the first termination at the low pressure side of the liquid forward flow line valve 110 and having the second termination in correspondence of a portion of the common termination of the three auxiliary cold gas flow lines 81a-c that is to say downstream of the respective check valves. The external heat exchanger 51 is arranged in a case 901 of an inside vehicle air-conditioning unit 900 further comprising internally the condenser 21, a blower 251 which replaces the fan 221, an air mix door 902 and a bypass passage 903 around the condenser 21. More particularly, the blower 251 is disposed on the entrance side of the external heat exchanger 51 and provides the ventilation of the air through the entire case 901. The air mix door 902 is disposed in the outlet side of the air flow of the external heat exchanger 51 and in the inlet side both of the ventilation air flow of the condenser 21 and the bypass passage 903. The air mix door 902 serves to fix the rate between the air volume passing through the condenser 21 and the air volume passing through the bypass passage 903, such air being the ventilation air already passed through the external heat exchanger 51. On the outlet side either of the ventilation air flow of the condenser 21 and of the bypass passage 903, a mixing space (not shown in FIG. 9) is provided to mix the ventilation air heated by the condenser 21 and the ventilation air passing through the bypass passage 903 which has not been heated by the condenser 21. Opening to blow the ventilation air (now conditioned)—mixed in the mixing space—into the vehicle interior (vehicle interior intended as space to be conditioned by air) are provided (not shown in FIG. 9) on the far downstream side of the ventilation air flow in the case 901. The external heat exchanger 51 includes one or more temperature sensors as the temperature sensor 351 arranged in the further supplementary flow line 84 at the end of the external heat exchanger 51. Moreover, in this other embodiment as shown in FIG. 9 the valve 110 is now a three way valve so as to intercept also the refrigerant flow in the further supplementary flow line 84. Moreover, the second auxiliary expansion device 63 arranged in the auxiliary liquid flow line 80 it is now replaced with an expander-compressor group 600 so as the portion of sub-cooled liquid refrigerant flow leaving the low pressure side of the liquid forward flow line valve 110 and running into the auxiliary liquid flow line 80 flows through the inlet port 601 of the expander of the expander-compressor group 600 and then flows through the outlet port 603 of the expander-compressor group 600 before entering the second vapor-liquid separator 802. Due to such replacement, the last added auxiliary expansion device 64 will henceforth be indicated as second auxiliary expansion device. The outlet of the expander-compressor group corresponds both to the outlet port of the expander and to the outlet port of the compressor of the expander-compressor group. Moreover, although in FIG. 9 the expander-compressor group is shown as having a unique shaft common both to the expander and to the compressor, it is intended that other forms of mechanical and/or electrical connection can be used between the two components of the expander-compressor group without departing from the scope of the invention.

Always referring to FIG. 9, a third auxiliary expansion device 65 and a check valve are arranged into the previously further described supplementary flow line 84 downstream of the external heat exchanger 51. This third auxiliary expansion device 65 can also be a EPR (evaporating pressure regulator). Moreover, in this other embodiment as shown in FIG. 9 the receiver or reservoir 31 is not present because the function of reservoir is now performed by the first vapor-liquid separator 801. The condensated refrigerant flow line 72 is incorporated into the liquid forward flow line 73 that thus now connects the outlet of the condenser 21 to the motive port 501 of the ejector 500. Moreover, each pair of valves 101 and 102 is now replaced by a suitable three-way valve 103, for example the pair of valves 101a and 102a is now replaced by the suitable three-way valve 103a. Similarly it happens for the three-way valve 103b and 103c. Moreover, the system 10 comprises a further supplementary flow line 85 having the first termination in correspondence of a common portion of the three auxiliary cold gas flow lines 81a-c disposed downstream of the respective check valves and upstream of the second termination of the previously further described supplementary flow line 84 and having the second termination in correspondence of a portion of the previously further described supplementary flow line 84 disposed between the three-way valve 110 and the second auxiliary expansion device 64. Said further flow line 85 having a check valve therein. Moreover, a further check valve is arranged in the common termination of the three auxiliary cold gas flow lines 81a-c and disposed between the first termination of the previously described further supplementary flow line 85 and the second termination of the previously described further supplementary flow line 84. Moreover, the system 10 comprises a further supplementary flow line 86 having the first termination in correspondence of a portion of the previously described further supplementary flow line 84 disposed between the third auxiliary expansion device 65 and the check valve and having the second termination in correspondence of a portion of the suction line 79 disposed between the suction manifold 77 and the suction port 502 of the ejector 500. Moreover, an isolation valve 403 is arranged in said further supplementary flow line 86: the isolation valve 403 can be an automatic valve of the close on rise of inlet pressure type—provided on the outlet side of a check valve—having for reference pressure the pressure of the first vapor-liquid separator 801. Moreover, the system 10 comprises a further supplementary flow line 87 having a first termination in correspondence of a common portion of the three flashed refrigerant flow lines 74a-c—that is to say upstream of the relative check valves— and having the other termination in correspondence of a three-way valve 112 arranged in the previously described further supplementary flow line 84 and disposed between the second termination of the previously described further supplementary flow line 85 and the inlet of the second auxiliary expansion device 64. Moreover, the system 10 comprises a further supplementary flow line 88 branched off from suction line 79 and having the first termination in correspondence of a portion of the suction line 79 disposed between the first vapor-liquid separator 801 and the inlet of the compressors 12 and 13 and having the second termination at the inlet port 602 of the compressor of the expander-compressor group 600. Moreover, the system 10 comprises an internal heat exchanger 91 disposed between the liquid forward flow line 73 and the auxiliary liquid flow line 80: more particularly, said internal heat exchanger 91 allows the heat exchange between the liquid refrigerant leaving the low pressure side of the liquid forward flow line valve 110 and flowing into the liquid forward flow line 73 towards the motive port 501 of the ejector 500 and the refrigerant which comes from the outlet port 603 of the expander-compressor group 600 and flowing into the auxiliary liquid flow line 80 towards the second vapor-liquid separator 802. The auxiliary liquid flow line 80 comprises a by-pass line around said internal heat exchanger 91: said by-pass line having a valve 115 therein. The valve 115 can be a throttle valve. Moreover, the system 10 comprises a further supplementary flow line 89 having the first termination in correspondence of a common portion of the three auxiliary flashed refrigerant flow lines leaving the first auxiliary expansion device 62 and having the second termination in correspondence of a common portion of the three flashed refrigerant flow lines 74a-c: said further flow line 89 having an isolation valve 404 arranged therein; such isolation valve 404 can be an automatic valve of the close on rise of inlet pressure type— provided on the outlet side of a check valve—having for reference pressure the pressure of the first vapor-liquid separator 801. Finally, the system 10 comprises further four new check valves—not present in the embodiment shown in FIG. 6 and not yet described in particular but in any case displayed in FIG. 9—together with a manual three-way valve 113 and a manual two-way valve 114 and the related interconnection flow lines with the remaining part of the circuit 10 acting only during the "pump-down" operation. Referring to FIG. 9, the check valves not yet mentioned as the elements 14, 15, 41a-c, 42a-c, 61, 71, 75a-c, 76a-c, 78a-c, 82, 83, 111, 241a-c, 301a-c, 302a-c, 304, 308a-c, 309a-c, 401a-c, 402a-c, 503, 700, 701, 702 are arranged in the same positions in the system 10 as well as with reference of the embodiment previously described above and shown in FIG. 6 and have the same functions.

Always with reference to embodiment shown in FIG. 9, it is observed that the normal operation—that is to say the operation in which no evaporator is defrosting—comprises not a single case but three distinct cases depending on of the different corresponding reheating performance level. These three distinct cases are shown separately by the respective flow diagrams in three distinct figures below described.

Figure 10:
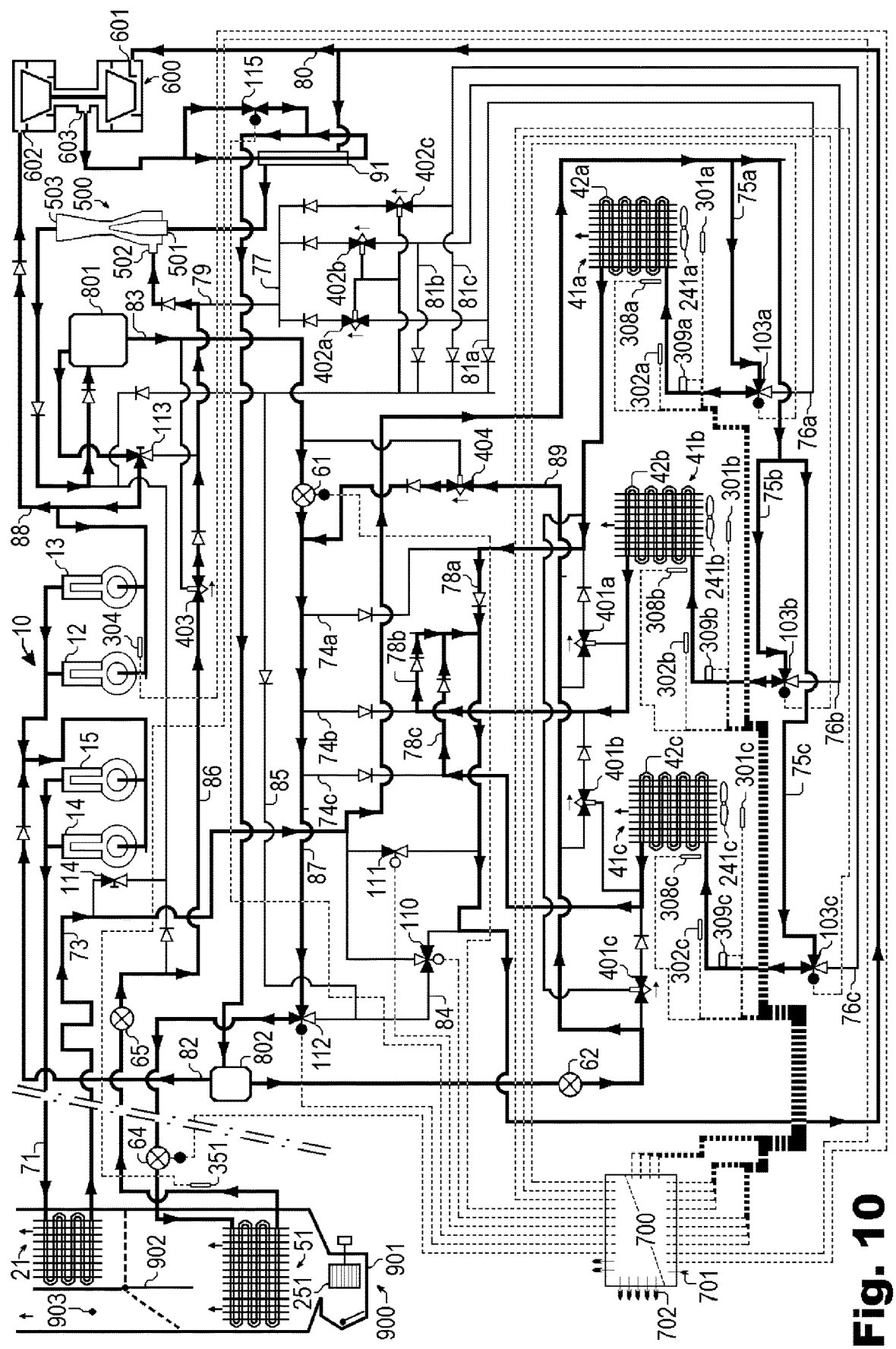
FIG. 10 is the normal flow diagram relating to the embodiment of the system according to the present invention described above with reference to FIG. 9 during the operation in series flow configuration with low reheating performance corresponding to the function of "cooling" of vehicles internal air where thick lines with arrows represent the refrigerant circuit.

Refer now to FIG. 10. It is shown the normal flow diagram relating to the embodiment of the system described above with reference to FIG. 9 during the operation in series flow configuration with low reheating performance corresponding to the function of "cooling" of the vehicles internal air where thick lines with arrows represent the refrigerant circuit.

Figure 11:
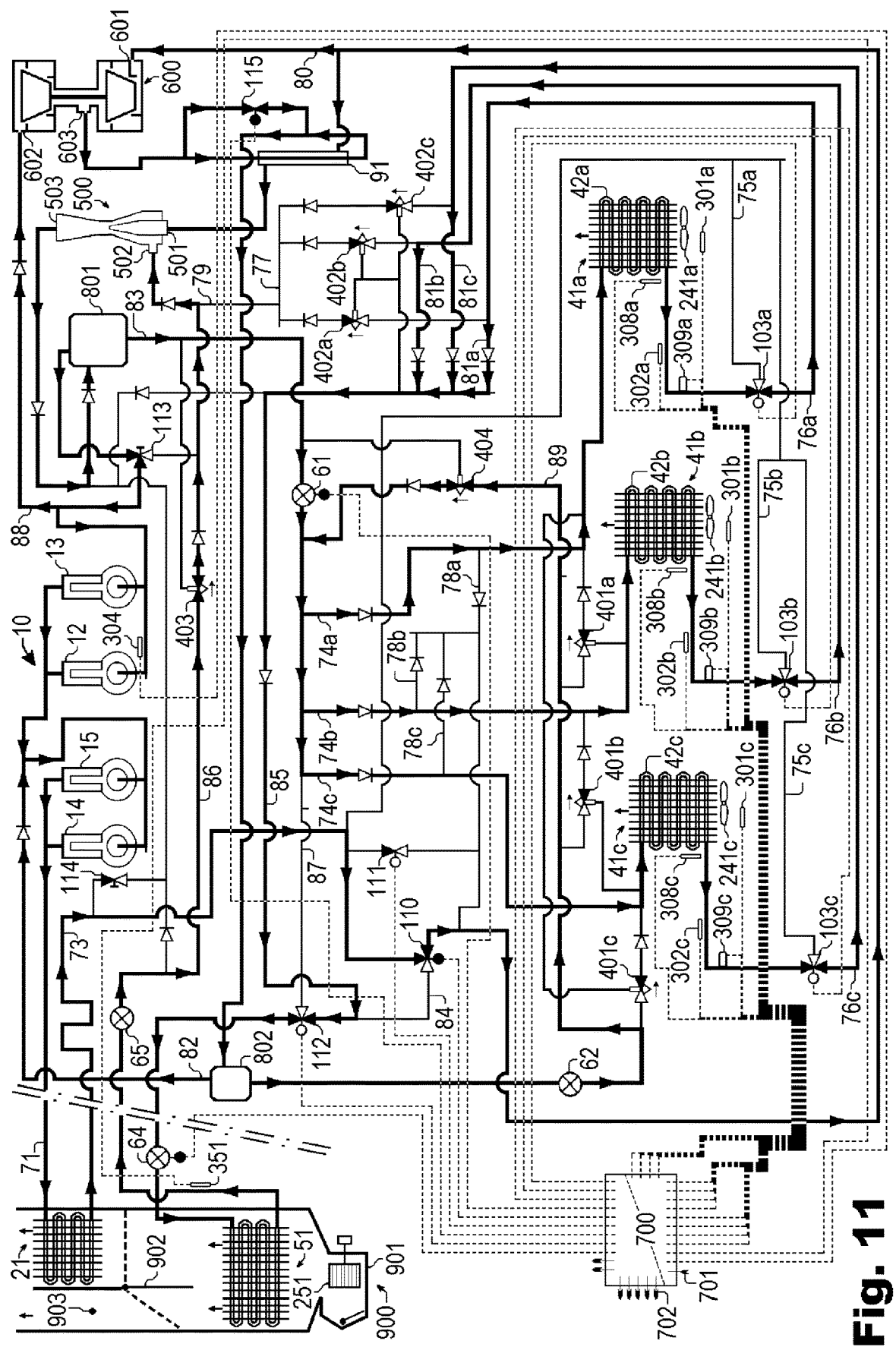
FIG. 11 is the normal flow diagram relating to the embodiment of the system according to the present invention described above with reference to FIG. 9 during the operation in series flow configuration with middle reheating performance corresponding to the function of "in line dehumidification heating" of vehicles internal air where thick lines with arrows represent the refrigerant circuit.

Refer now to FIG. 11. It is shown the normal flow diagram relating to the embodiment of the system described above with reference to FIG. 9 during the operation in series flow configuration with middle reheating performance corresponding to the function of "in line dehumidification heating" of vehicles internal air where thick lines with arrows represent the refrigerant circuit.

Figure 12:
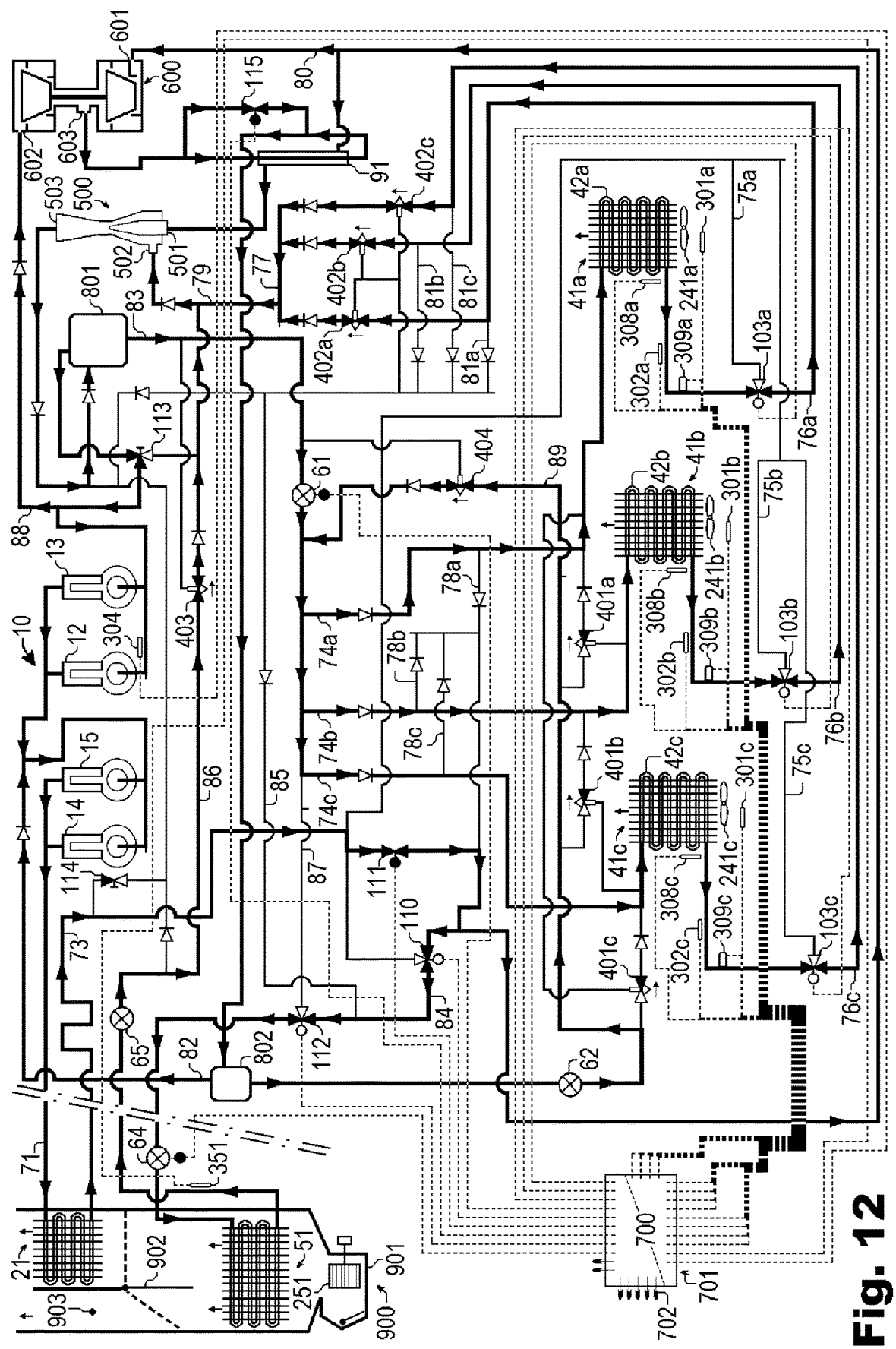
FIG. 12 is the normal flow diagram relating to the embodiment of the system according to the present invention described above with reference to FIG. 9 during the operation in parallel flow configuration with high reheating performance corresponding to the function of "in parallel dehumidification heating" of vehicles internal air where thick lines with arrows represent the refrigerant circuit.

Refer now to FIG. 12. It is shown the normal flow diagram relating to the embodiment of the system described above with reference to FIG. 9 during the operation in parallel flow configuration with high reheating performance corresponding to the function of "in parallel dehumidification heating" of vehicles internal air where thick lines with arrows represent the refrigerant circuit.

Always with reference to embodiment shown in FIG. 9, it is observed that the defrosting process according to the method according to the present invention comprises two distinct cases. These two distinct cases are shown separately by the respective flow diagrams in two distinct figures below described.

Figure 13:
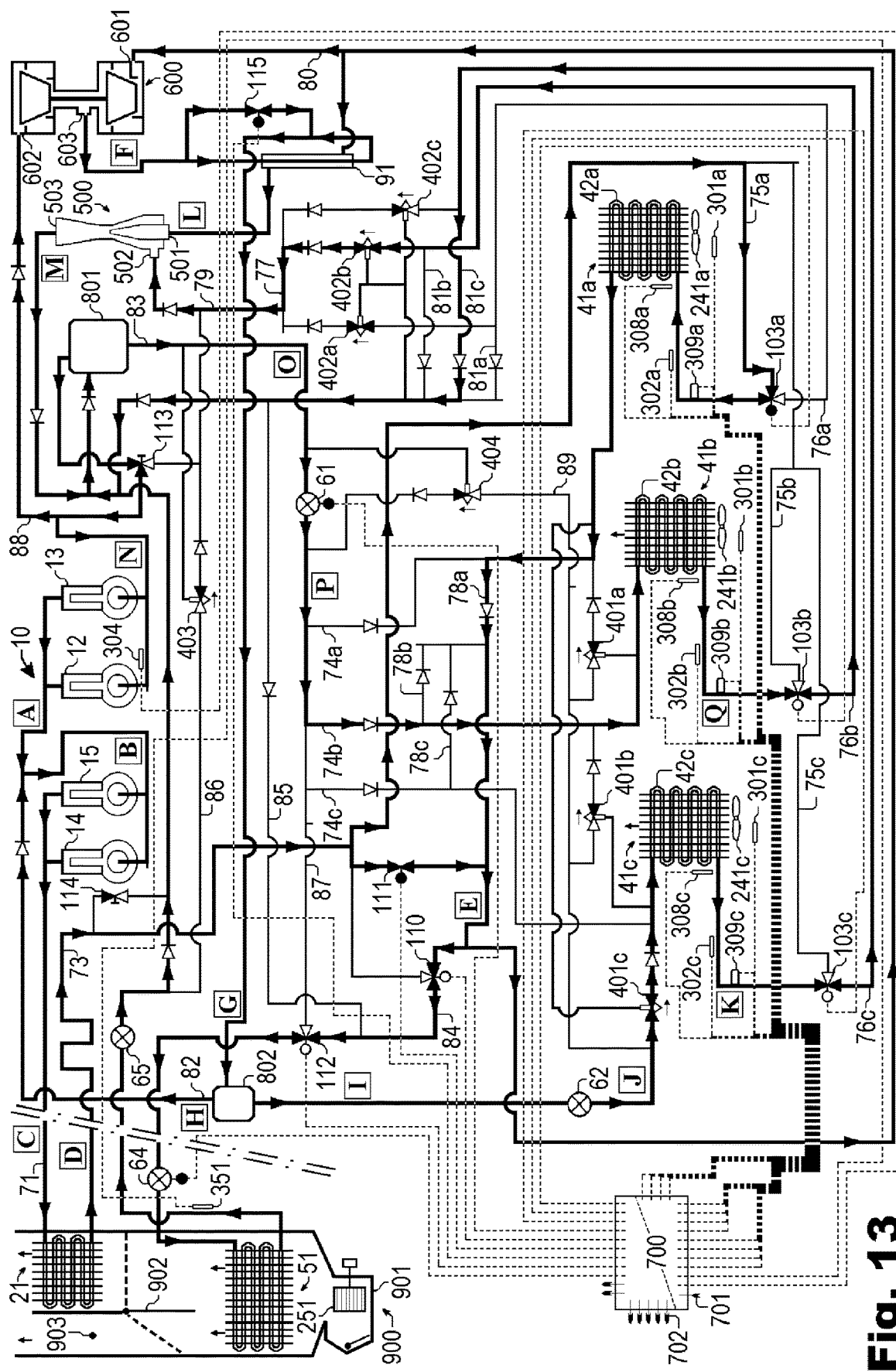
FIG. 13 is the flow diagram of the reverse liquid defrosting process of a coil of a selected evaporator relating to the embodiment of the system described above with reference to FIG. 9 during the operation in parallel flow configuration with high reheating performance corresponding to the function of "in parallel dehumidification heating" of the vehicles internal air according to the present invention where thick lines with arrows represent the refrigerant circuit and where the squared letters represent the same relevant sections present in the flow diagram of the reverse liquid defrosting process of FIG. 7.

Refer now to FIG. 13. It is shown the flow diagram of the reverse liquid defrosting process of the exemplary case relating to the embodiment of the system described above with reference to FIG. 9 during the operation in parallel flow configuration with high reheating performance corresponding to the function of "in parallel dehumidification heating" of vehicles internal air where thick lines with arrows represent the refrigerant circuit and where the squared letters represent the same relevant sections present in the flow diagram of the reverse liquid defrosting process of FIG. 7.

Figure 14:
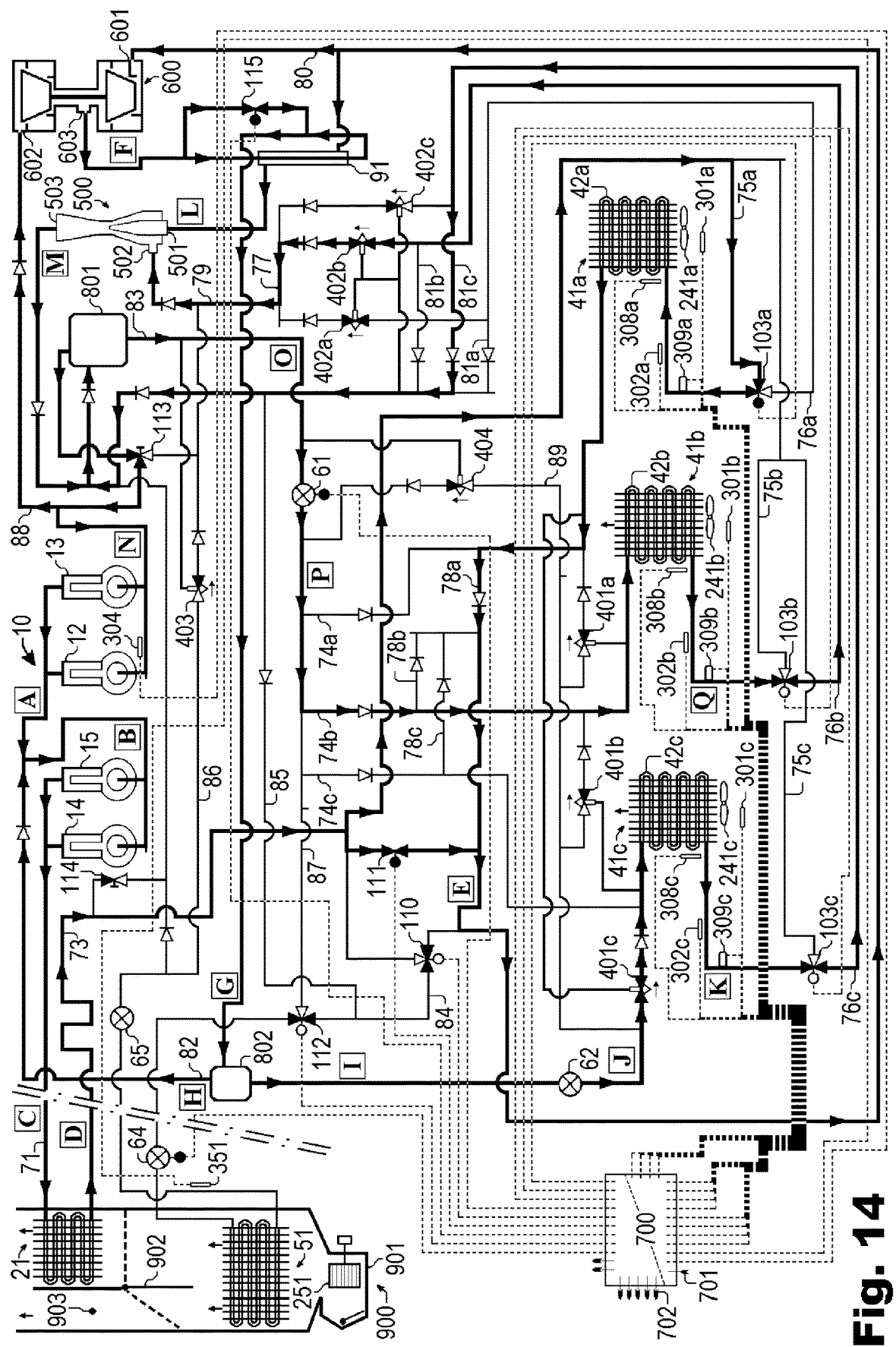
FIG. 14 is the flow diagram of the reverse liquid defrosting process of a coil of a selected evaporator relating to the embodiment of the system described above with reference to FIG. 9 during the operation in the no re-heating configuration corresponding to the function of "heating without dehumidification" of vehicles internal air according to the present invention where thick lines with arrows represent the refrigerant circuit and where the squared letters represent the same relevant sections present in the flow diagram of the reverse liquid defrosting process of FIG. 7.

Refer now to FIG. 14. It is shown the flow diagram of the reverse liquid defrosting process of the exemplary case relating to embodiment of the system described above with reference to FIG. 9 during the operation in the no re-heating configuration corresponding to the function of "heating without dehumidification" of vehicles internal air where thick lines with arrows represent the refrigerant circuit and where the squared letters represent the same relevant sections present in flow diagram of the reverse liquid defrosting process of FIG. 7.

Figure 15:
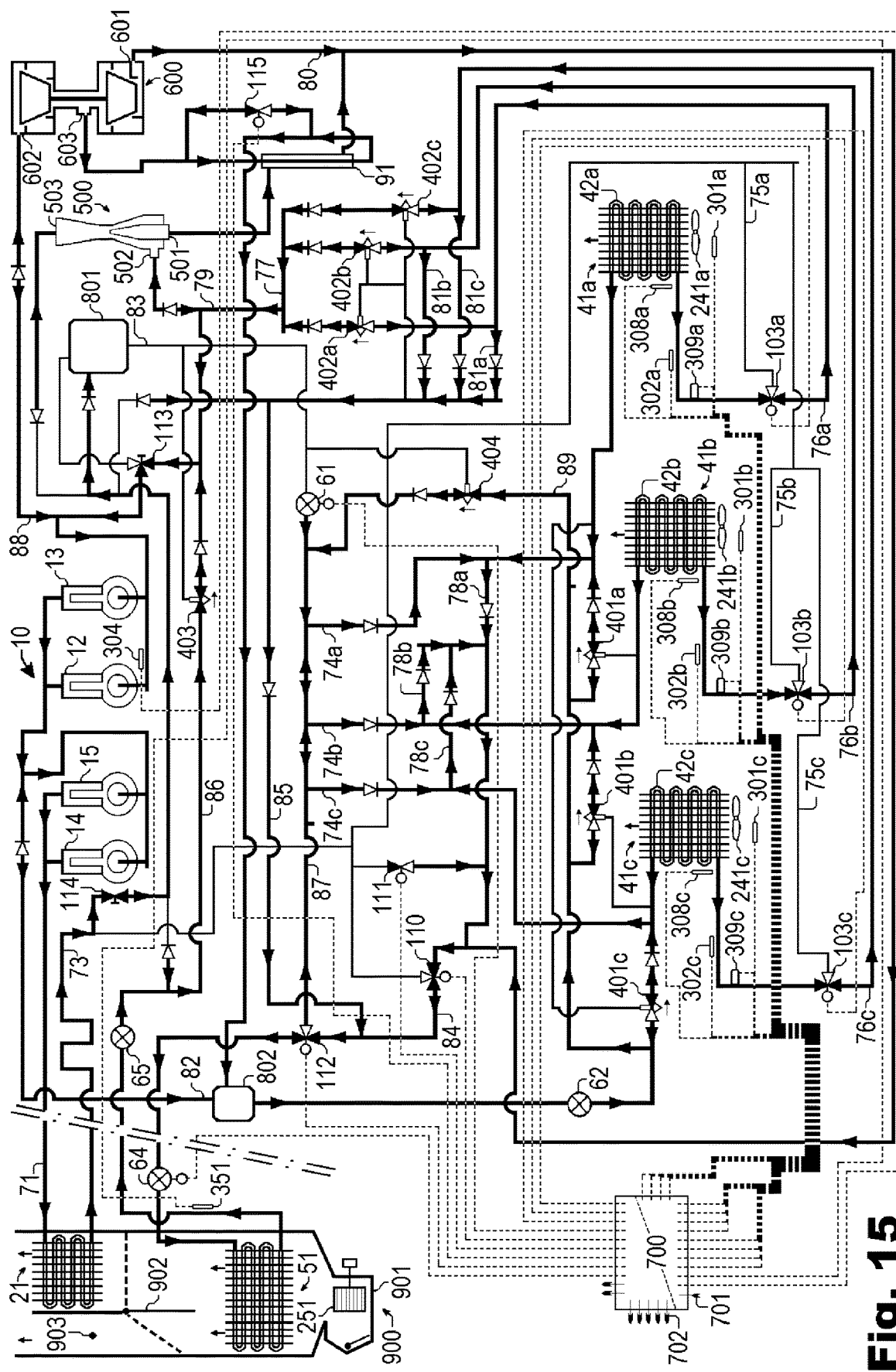
FIG. 15 is the flow diagram relating to the embodiment of the system described above with reference to FIG. 9 during "pump-down" operation to collect the refrigerant in the first vapor-liquid separator—which acts as reservoir—according to the present invention where thick lines with arrows represent the refrigerant circuit.

For the sake of completeness, it is shown in FIG. 15 the flow diagram relating to embodiment of the system described above with reference to FIG. 9 during the "pump-down" operation to collect the refrigerant in the first vapor-liquid separator—which acts as reservoir—where thick lines with arrows represent the refrigerant circuit.

Figure 16:
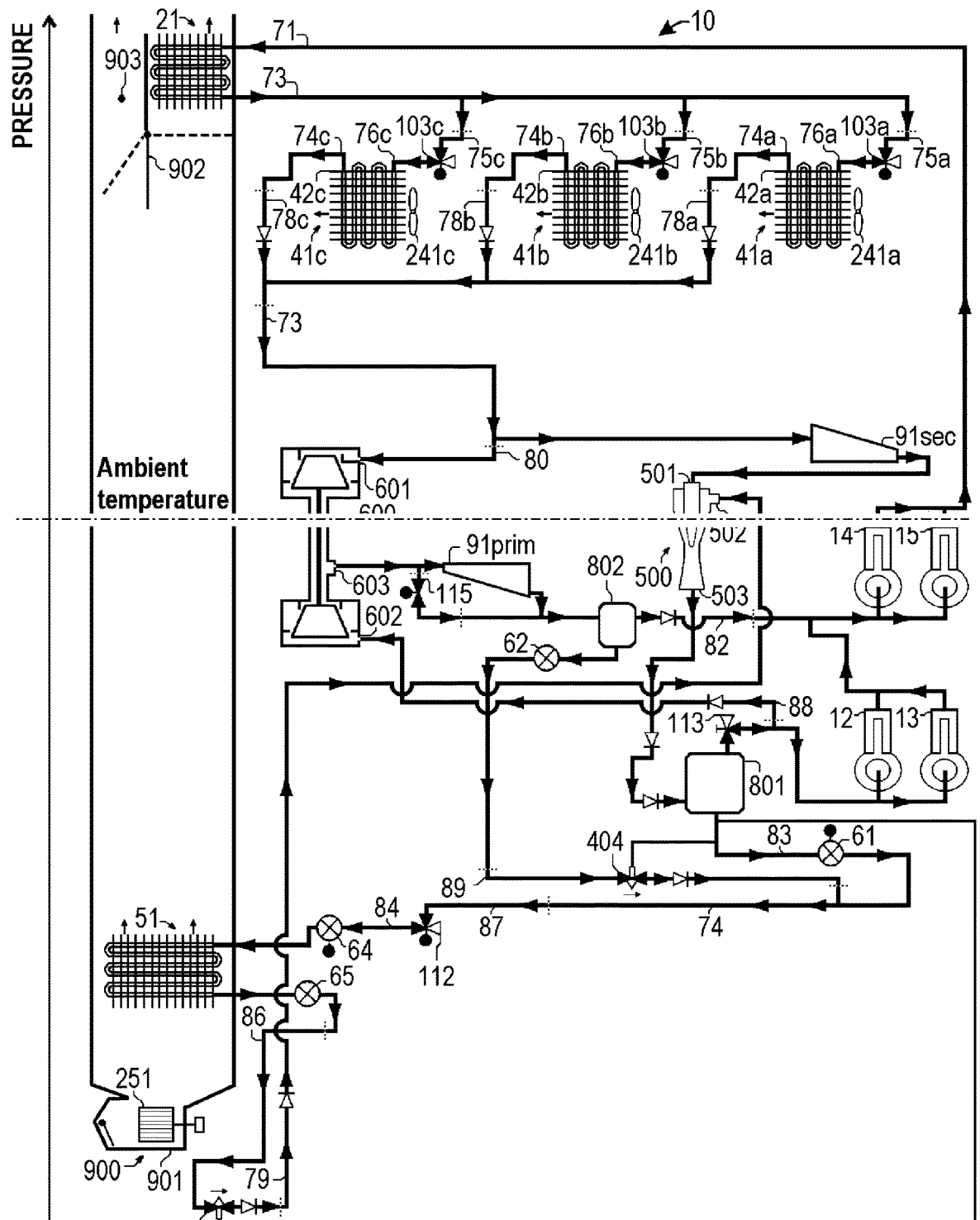
FIG. 16 is a reduced and re-arranged variant of the normal flow diagram already shown in FIG. 10 in which the elements of the system affected by the circulation of the refrigerant are arranged from bottom to top as a function of increasing pressure.

Refer now to FIG. 16. It is shown a reduced and re-arranged variant of the normal flow diagram already shown in FIG. 10 in which the elements of the system affected by circulation of the refrigerant are arranged from bottom to top as a function of increasing pressure. Moreover, compared to the analogous flow diagram of the process already shown in FIG. 10 it has been deliberately not included the controller 700 (and its inputs 701 and its outputs 702) and all the sensors (301a-c, 302a-c, 304, 308a-c, 309a-c, 351) in addition to all the elements of the closed circuit 10 that are not affected by circulation of the refrigerant except for narrow tubes by which the reference pressure is transmitted to the automatic valves of the close on rise of the inlet pressure type 403 and 404. The internal heat exchanger 91 has been divided into its two respective sides: primary and secondary. For the sake of completeness of illustration they have been depicted also the elements 241a-c, 251, 900, 901, 902 and 903.

Figure 17:
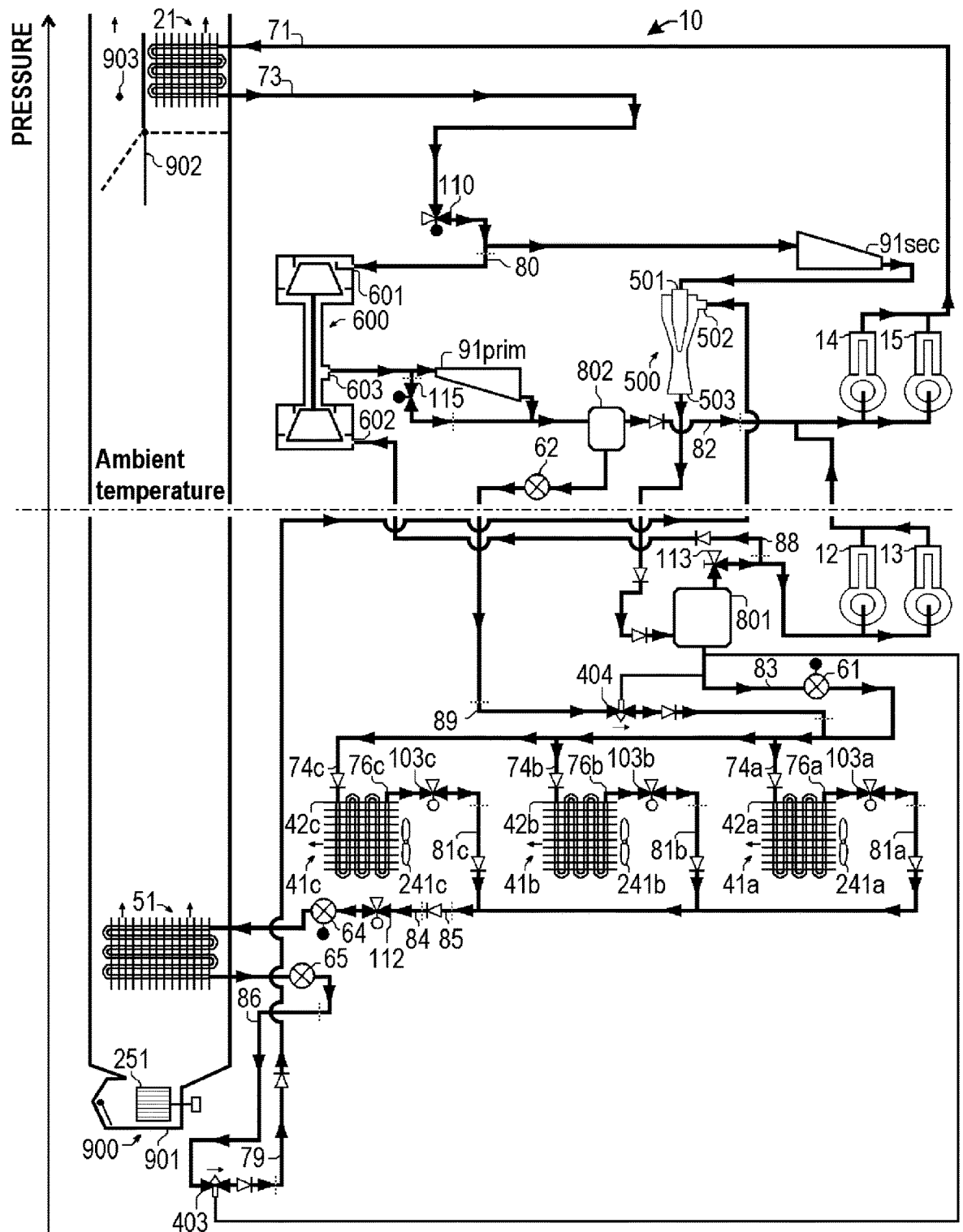
FIG. 17 is a reduced and re-arranged variant of the normal flow diagram already shown in FIG. 11 in which the elements of the system affected by the circulation of the refrigerant are arranged from bottom to top as a function of increasing pressure.

Refer now to FIG. 17. It is shown a reduced and re-arranged variant of the normal flow diagram already shown in FIG. 11 in which the elements of the system affected by circulation of the refrigerant are arranged from bottom to top as a function of increasing pressure. Moreover, compared to the analogous flow diagram of the process already shown in FIG. 11 it has been deliberately not included the controller 700 (and its inputs 701 and its outputs 702) and all the sensors (301a-c, 302a-c, 304, 308a-c, 309a-c, 351) in addition to all the elements of the closed circuit 10 that are not affected by circulation of the refrigerant except for narrow tubes by which the reference pressure is transmitted to the automatic valves of the close on rise of the inlet pressure type 403 and 404. The internal heat exchanger 91 has been divided into its two respective sides: primary and secondary. For the sake of completeness of illustration they have been depicted also the elements 241a-c, 251, 900, 901, 902 and 903.

Figure 18:
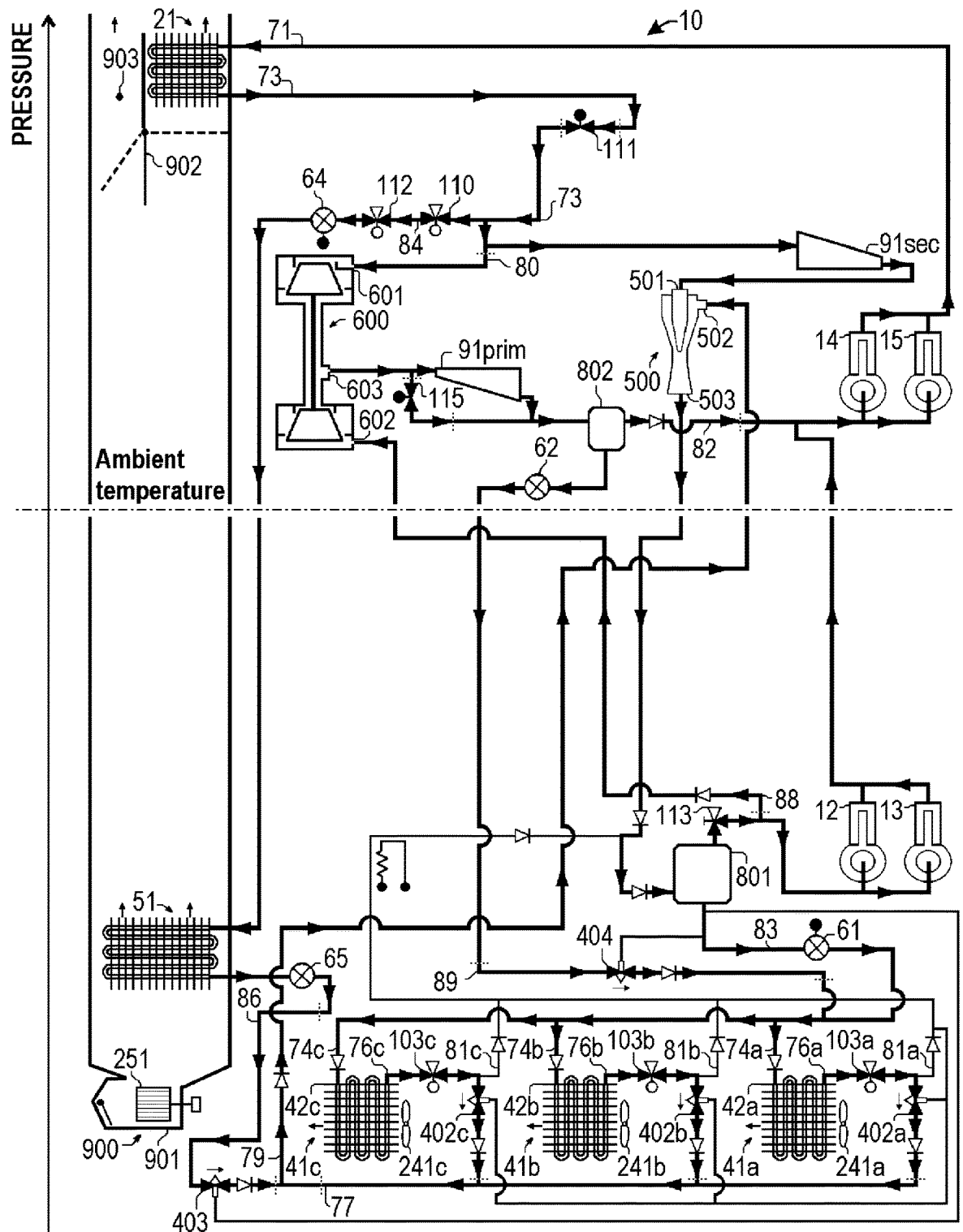
FIG. 18 is a reduced and re-arranged variant of the normal flow diagram already shown in FIG. 12 in which the elements of the system affected by the circulation of the refrigerant are arranged from bottom to top as a function of increasing pressure.

Refer now to FIG. 18. It is shown a reduced and re-arranged variant of the normal flow diagram already shown in FIG. 12 in which the elements of the system affected by circulation of the refrigerant are arranged from bottom to top as a function of increasing pressure. Moreover, compared to the analogous flow diagram of the process already shown in FIG. 12 it has been deliberately not included the controller 700 (and its inputs 701 and its outputs 702) and all the sensors (301a-c, 302a-c, 304, 308a-c, 309a-c, 351) in addition to all the elements of the closed circuit 10 that are not affected by circulation of the refrigerant except for narrow tubes by which the reference pressure is transmitted to the automatic valves of the close on rise of the inlet pressure type 402a-c, 403 and 404 and except for the three auxiliary cold gas flow lines 81a-c and the relative check valves. The internal heat exchanger 91 has been divided into its two respective sides: primary and secondary. For the sake of completeness of illustration they have been depicted also the elements 241a-c, 251, 900, 901, 902 and 903. In FIG. 18 it is moreover shown an electric heater which may become operational in order to maintain high the temperature (and so the pressure) of the refrigerant which is trapped in the common termination of the three auxiliary cold gas flow lines 81a-c.

Figure 19:
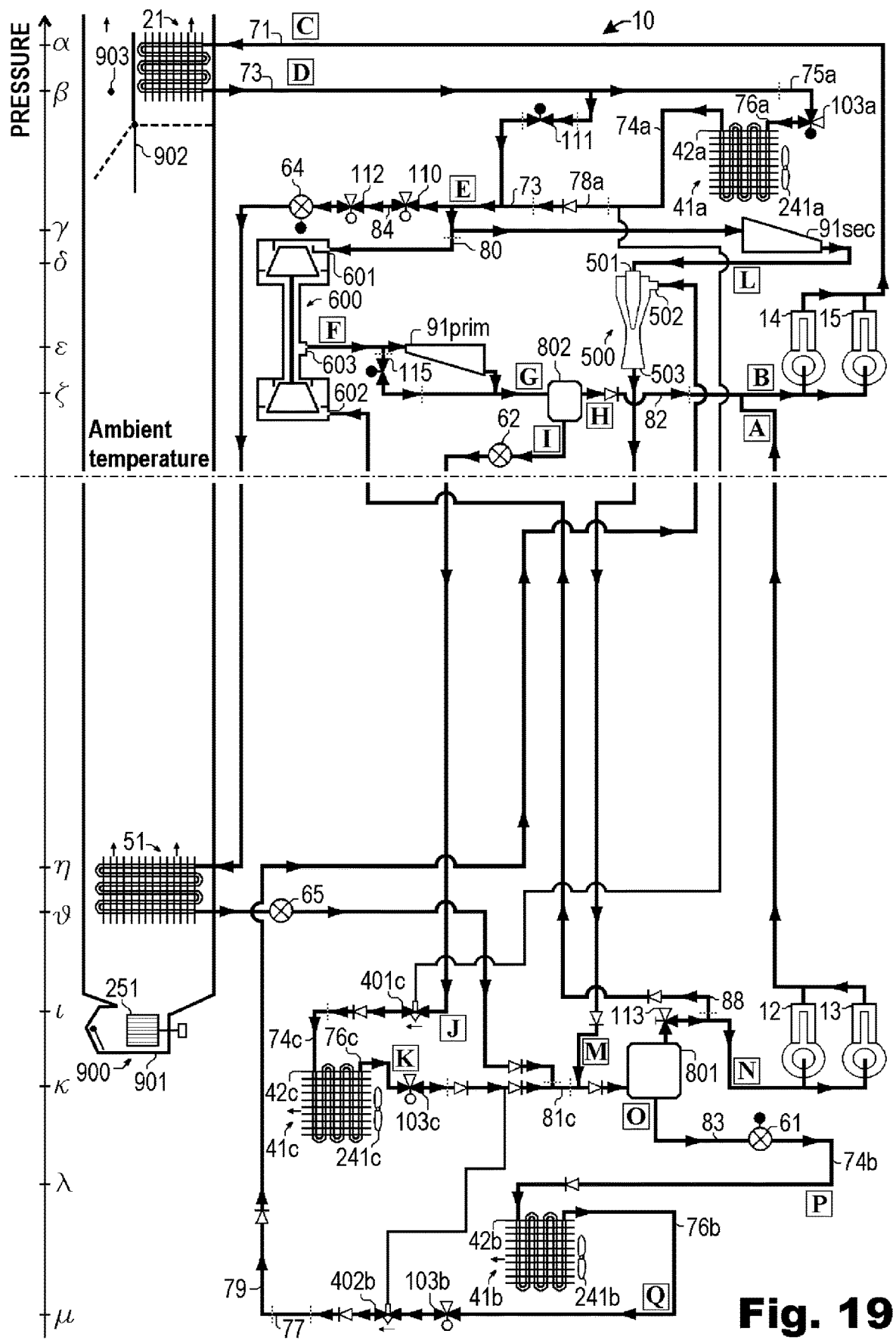
FIG. 19 is a reduced and re-arranged variant of the flow diagram of the reverse liquid defrosting process already shown in FIG. 13 in which the elements of the system affected by the circulation of the refrigerant are arranged from bottom to top as a function of increasing pressure and where the Greek letters represent the same pressure levels as the Mollier diagram of FIG. 8 according to the present invention.

Refer now to FIG. 19. It is shown a reduced and re-arranged variant of the flow diagram of the reverse liquid defrosting process of the exemplary case already shown in FIG. 13 in which the elements of the system affected by circulation of the refrigerant are arranged from bottom to top as a function of increasing pressure. Moreover, always compared to the analogous flow diagram of the process already shown in FIG. 13 it has been deliberately not included the controller 700 (and its inputs 701 and its outputs 702) and all the sensors (301a-c, 302a-c, 304, 308a-c, 309a-c, 351) in addition to all the elements of the closed circuit 10 that are not affected by circulation of the refrigerant except for narrow tubes by which the reference pressure is transmitted to the automatic valves of the close on rise of the inlet pressure type 401c and 402b. The internal heat exchanger 91 has been divided into its two respective sides: primary and secondary. For the sake of completeness of illustration they have been depicted also the elements 241a-c, 251, 900, 901, 902 and 903. Moreover, the Greek letters represent the same pressure levels of the Mollier diagramm of FIG. 8.

Figure 20:
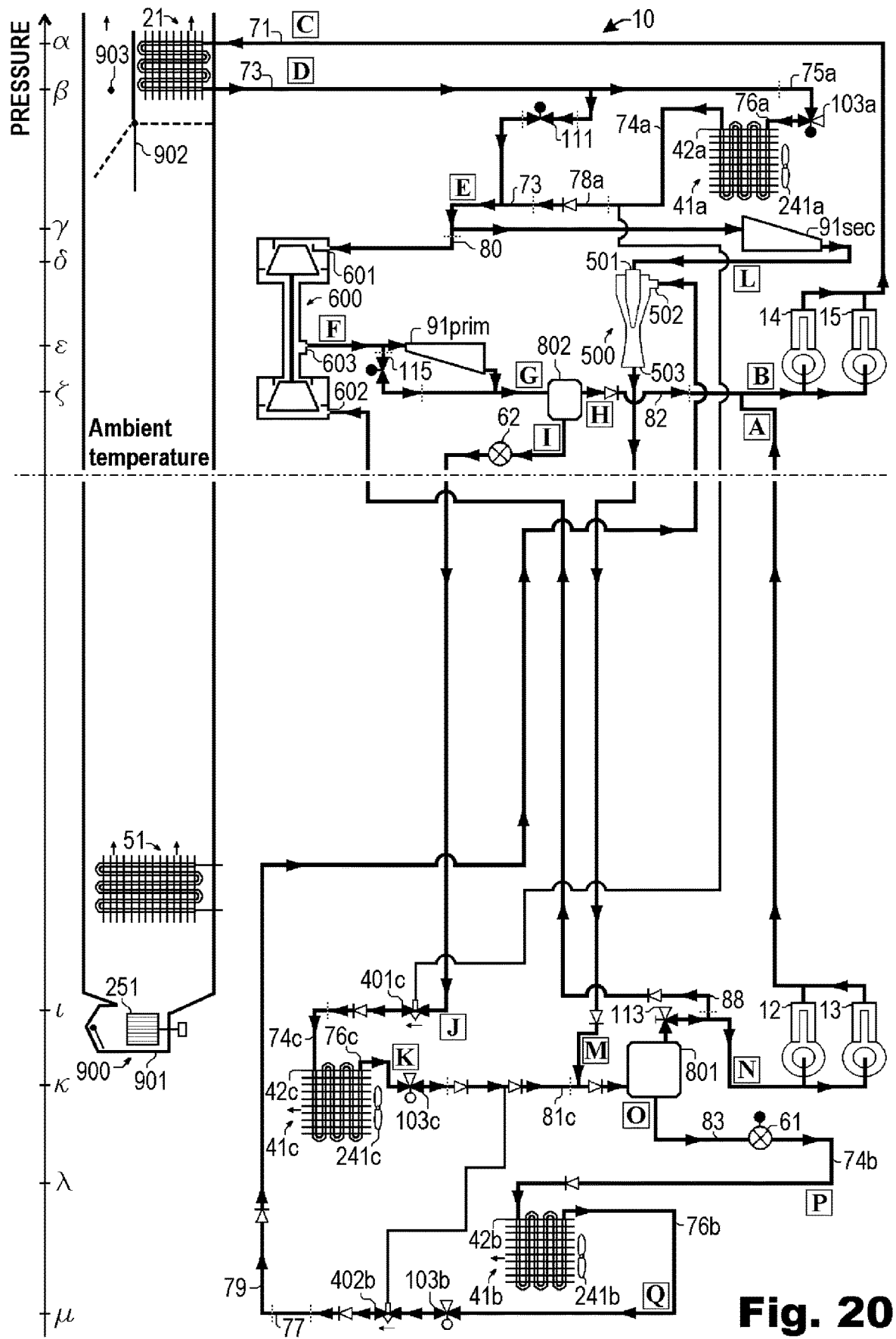
FIG. 20 is a reduced and re-arranged variant of the flow diagram of the reverse liquid defrosting process already shown in FIG. 14 in which the elements of the system affected by the circulation of the refrigerant are arranged from bottom to top as a function of increasing pressure and where the Greek letters represent the same pressure levels as the Mollier diagram of FIG. 8 according to the present invention.

Refer now to FIG. 20. It is shown a reduced and re-arranged variant of the flow diagram of the reverse liquid defrosting process of the exemplary case already shown in FIG. 14 in which the elements of the system affected by circulation of the refrigerant are arranged from bottom to top as a function of increasing pressure. Moreover, always compared to the analogous flow diagram of the process already shown in FIG. 14 it has been deliberately not included the controller 700 (and its inputs 701 and its outputs 702) and all the sensors (301a-c, 302a-c, 304, 308a-c, 309a-c, 351) in addition to all the elements of the closed circuit 10 that are not affected by circulation of the refrigerant except for narrow tubes by which the reference pressure is transmitted to the automatic valves of the close on rise of the inlet pressure type 401c and 402b. The internal heat exchanger 91 has been divided into its two respective sides: primary and secondary. For the sake of completeness of illustration they have been depicted also the elements 241a-c, 251, 900, 901, 902 and 903. Moreover, the Greek letters represent the same pressure levels of the Mollier diagramm of FIG. 8. Finally, although it is not traversed by refrigerant, it is shown in FIG. 20 also the external heat exchanger 51 for appropriate comparison with the previous figures.

Figure 21:
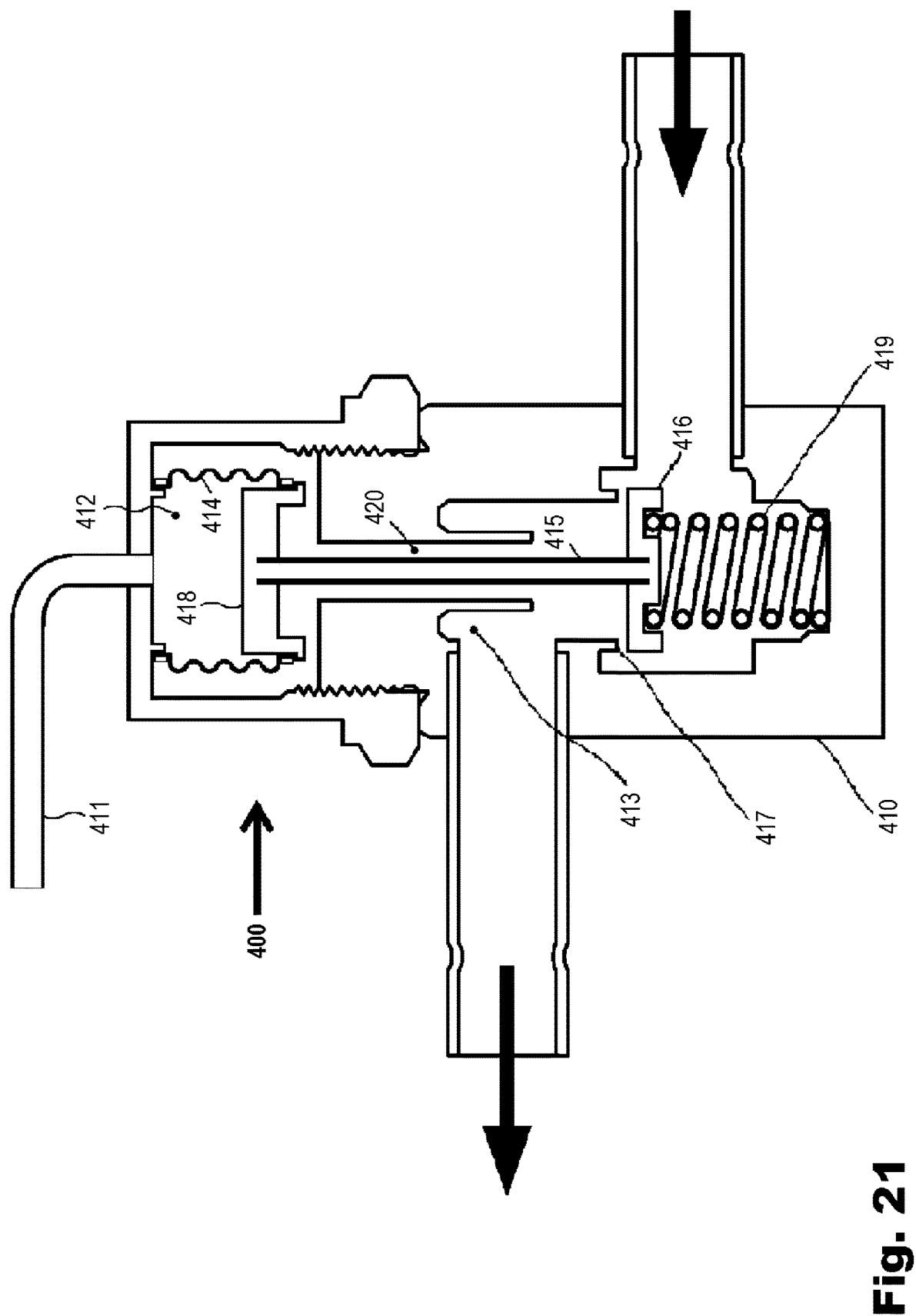
FIG. 21 is a section of an automatic valve of the close on rise of inlet pressure type which opens only when the inlet pressure is somewhat lower than a reference pressure, said reference pressure being the pressure of a convenient section of the closed loop vapor cycle refrigeration system transmitted to said automatic valve by a narrow tube according to the present invention.

Refer now to FIG. 21. It is shown a section of an automatic valve 400 of the close on rise of inlet pressure type which opens only when the inlet pressure is somewhat lower than a reference pressure, said reference pressure being the pressure of a convenient section of the closed loop vapor cycle refrigeration system 10 transmitted to the automatic valve of the close on rise of inlet pressure type 400 by a narrow tube 411 according to the present invention. The description of the automatic valve 400 applies equally to all the automatic valves 401a-c, 402a-c, 403 and 404 described above. The automatic valve of the close on rise of inlet pressure type 400 represented in FIG. 21 is named with the English acronym C.R.I. valve (Close on Rise of Inlet pressure valve). In the automatic valve of the close on rise of inlet pressure type 400 represented in FIG. 21 the narrow tube 411 is connected to an isolated chamber 412 of the automatic valve 400; said isolated chamber 412 being separated from the housing 413 of the automatic valve 400 by an elastic sealing element 414 such as a bellows or a diaphragm or other similar flexible device. Said housing 413 has an inlet, an outlet, a communicating passageway, a valve seat 417 in the passageway defining inlet and outlet cavities of the housing, a valve member 416 (as a sealing disc) disposed in the inlet cavity contacting the valve seat 417 so as to form a leak-tight seal when the valve is shut, a stem 415 extending from the valve member 416 into said outlet cavity up to the elastic sealing element 414, a coil spring 419 in the inlet cavity compressed between the body of the valve 410 and the valve member 416. The valve member 416 and the stem 415 are movable between a closing position against valve seat 417 so as to compress the elastic sealing element 414 and an opening position into the inlet cavity away from the valve seat 417 so as to extend the elastic sealing element 414. The reference pressure exerts a force on the onside of the elastic sealing element 414 which tends to extend the elastic sealing element itself. This force is transmitted through the stem 415 (or rod or spikes or other similar elements) to the sealing disc 416 (or other similar valve member) in order to move away said the sealing disc 416 from the valve seat 417. This force can eventually be transferred from the elastic sealing element 414 to the stem 415 by an interposed transmission element, as a piston 418 integral with both the elastic sealing element 414 and the stem 415. The compressed coil spring 419 exerts a force on the sealing disc 416 in order to push the sealing disc 416 towards the valve seat 417. The outlet pressure—by virtue of the clearance 420 between the stem 415 and the body of the valve 410—acts on the outside of the elastic sealing element 414 and exerts thus a crushing force of the elastic sealing element 414. The outlet pressure acts also on the surface of the sealing disc 416 facing towards the outlet cavity in order to push the sealing disc 416 away from the valve seat 417. Because the external effective area of the elastic sealing element 414 is equal to the area of the surface of the sealing disc 416 (or of other similar valve member) facing towards the outlet cavity, the two forces exerted by the outlet pressure are equal and opposite and cancel each other out so that the outlet pressure is deleted. On the contrary, the inlet pressure acts on the surface of the sealing disc 416 facing towards the inlet cavità in order to push the sealing disc 416 towards the valve seat 417. Thus, the force exerted by the inlet pressure on the surface of the sealing disc 416 facing towards the inlet cavity has the same direction and the same verse of the force of the compressed coil spring and both tend to close the automatic valve 400. These two forces are opposed to the unique opening force of the automatic valve 400 due to the reference pressure. These three forces are the only operational forces of the automatic valve 400. Because the internal effective area of the elastic sealing element 414 is approx the same of the area of the surface of the sealing disc 416 facing towards the inlet cavity, when the inlet pressure is similar to the reference pressure the opening force due to the reference pressure is almost the same and opposite to the closing force due to the inlet pressure and the two forces are practically balanced. Thus, in essence remains only the operative force due to the compressed coil spring 419 that closes the valve. The valve remains closed obviously also if the inlet pressure is somewhat higher of the reference pressure. On the contrary, only when the inlet pressure is somewhat lower than the reference pressure the valve opens. In fact, only in this case the closing force—that is to say the sum of the two operative forces due to the inlet pressure and the compressed coil spring—can be low enough in comparison to the opening force due to the reference pressure.

INDUSTRIAL APPLICATION

Figure 23:
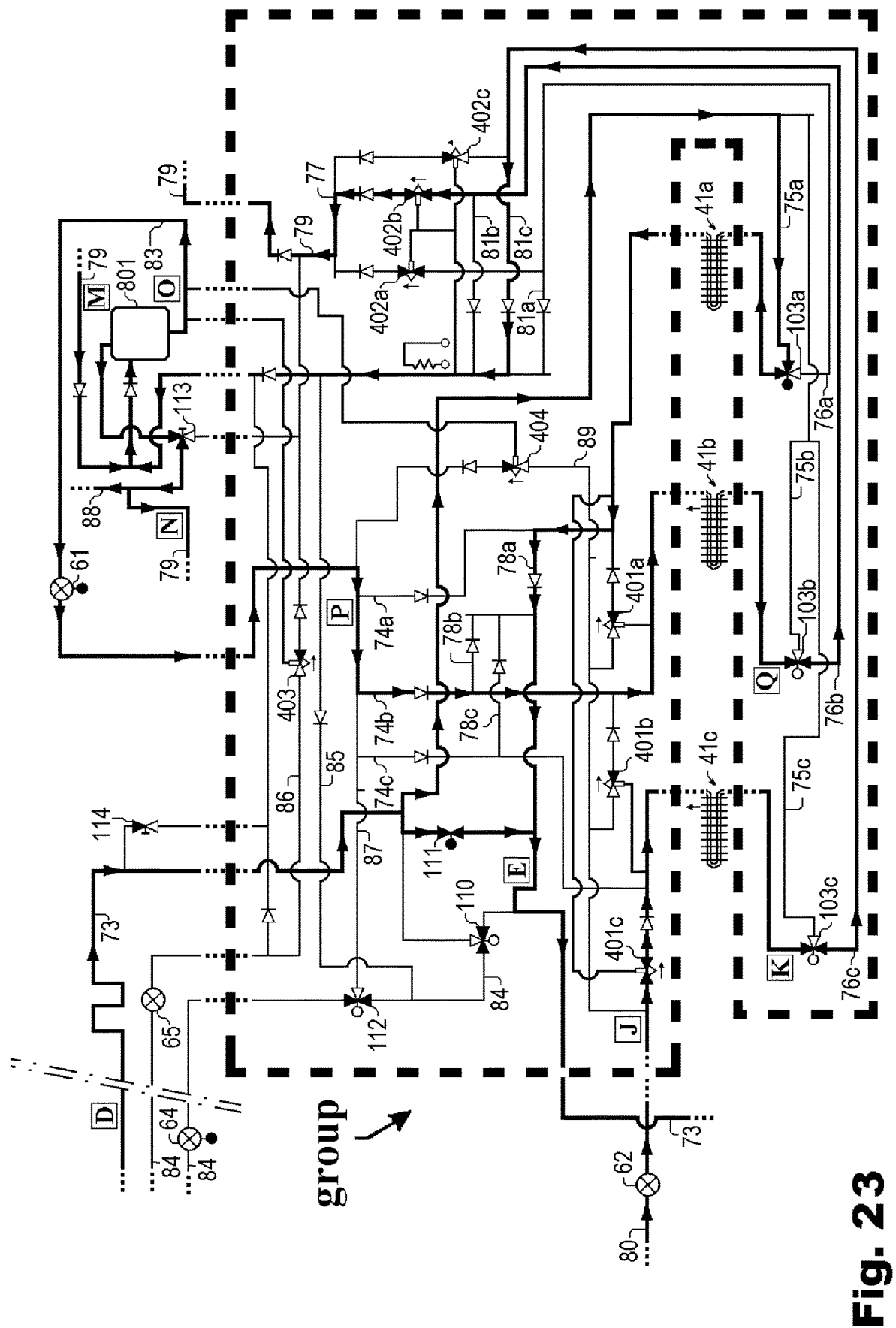
FIG. 23 is a particular of the flow diagram of the reverse liquid defrosting process shown in FIG. 14—relating to the embodiment of the system according to the present invention described above and shown in FIG. 9—in which it is highlighted a group incorporating an appropriate number of valves, relevant sections and flow lines.
Figure 24:
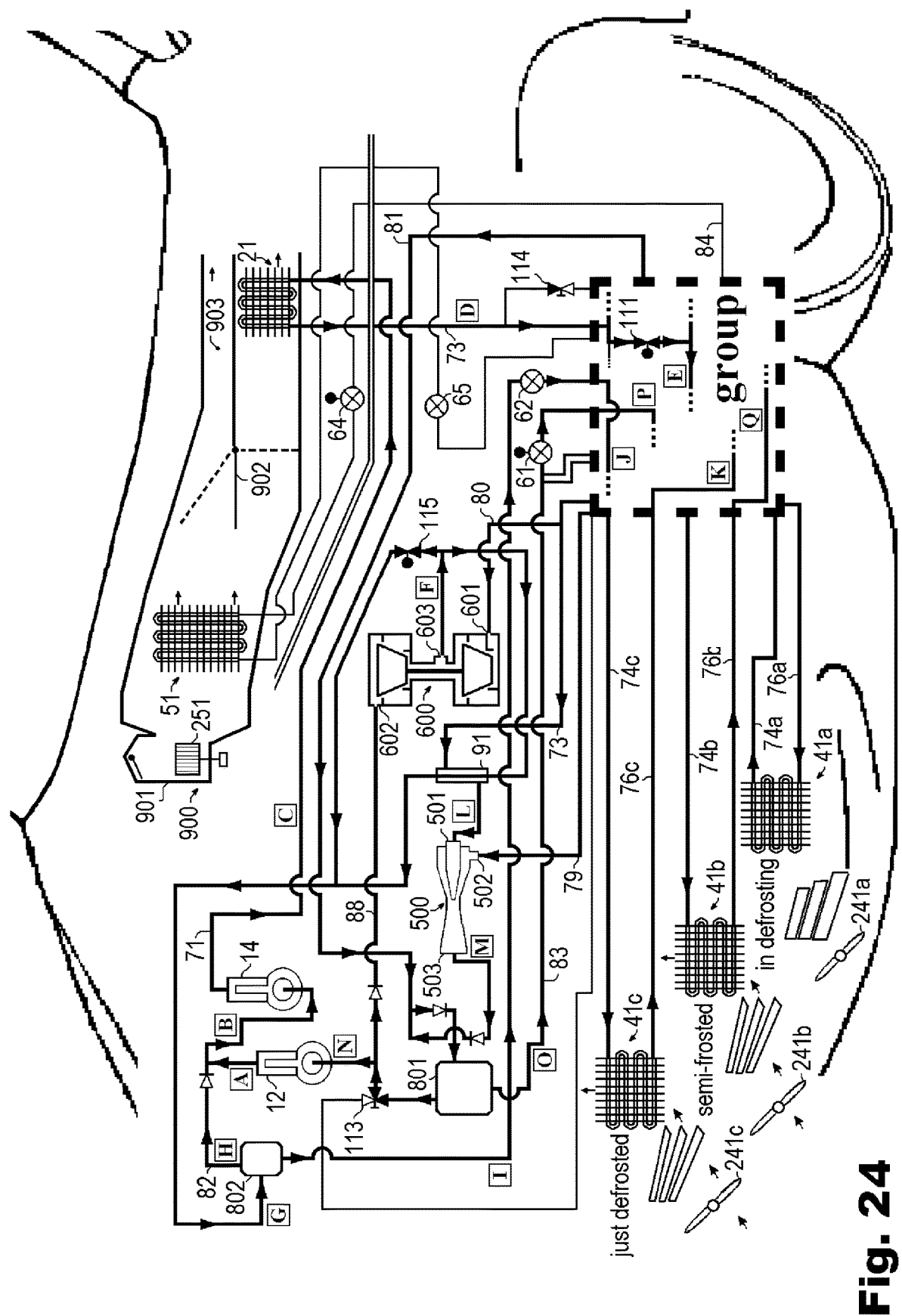
FIG. 24 is the flow diagram of the reverse liquid defrosting process shown in FIG. 14—relating to the embodiment of the system according to the present invention described above and shown in FIG. 9—housed inside the front bonnet of a generic vehicle in which an appropriate number of valves, relevant sections and flow lines are incorporating into the group previously described and shown in FIG. 23.

As already mentioned, the present invention is industrially applicable to any type of closed loop vapor cycle multi-evaporator refrigeration system requiring defrosting cycles to remove the ice formed on the outside of the evaporator coils in any field these types of systems are used. A particular field already described is the one related to vehicles internal air conditioning. In particular, in FIG. 24 it is shown the flow diagram of FIG. 14—relating to the embodiment of the system described above with reference to FIG. 9—inserted inside the front bonnet of a generic vehicle and in which an appropriate number of valves, relevant sections and flow lines have been incorporated into an appropriate group. The FIG. 23 shows in detail the group at issue as particular of the flow diagram of FIG. 14. In FIG. 24, compared to the analogous process flow diagram already shown in FIG. 14 it was deliberately not included the controller 700 (and its inputs 701 and its outputs 702), the compressors 13 and 15 (in order to simplify the visualization) and all the sensors (301a-c, 302a-c, 304, 308a-c, 309a-c, 351).

Figure 25:
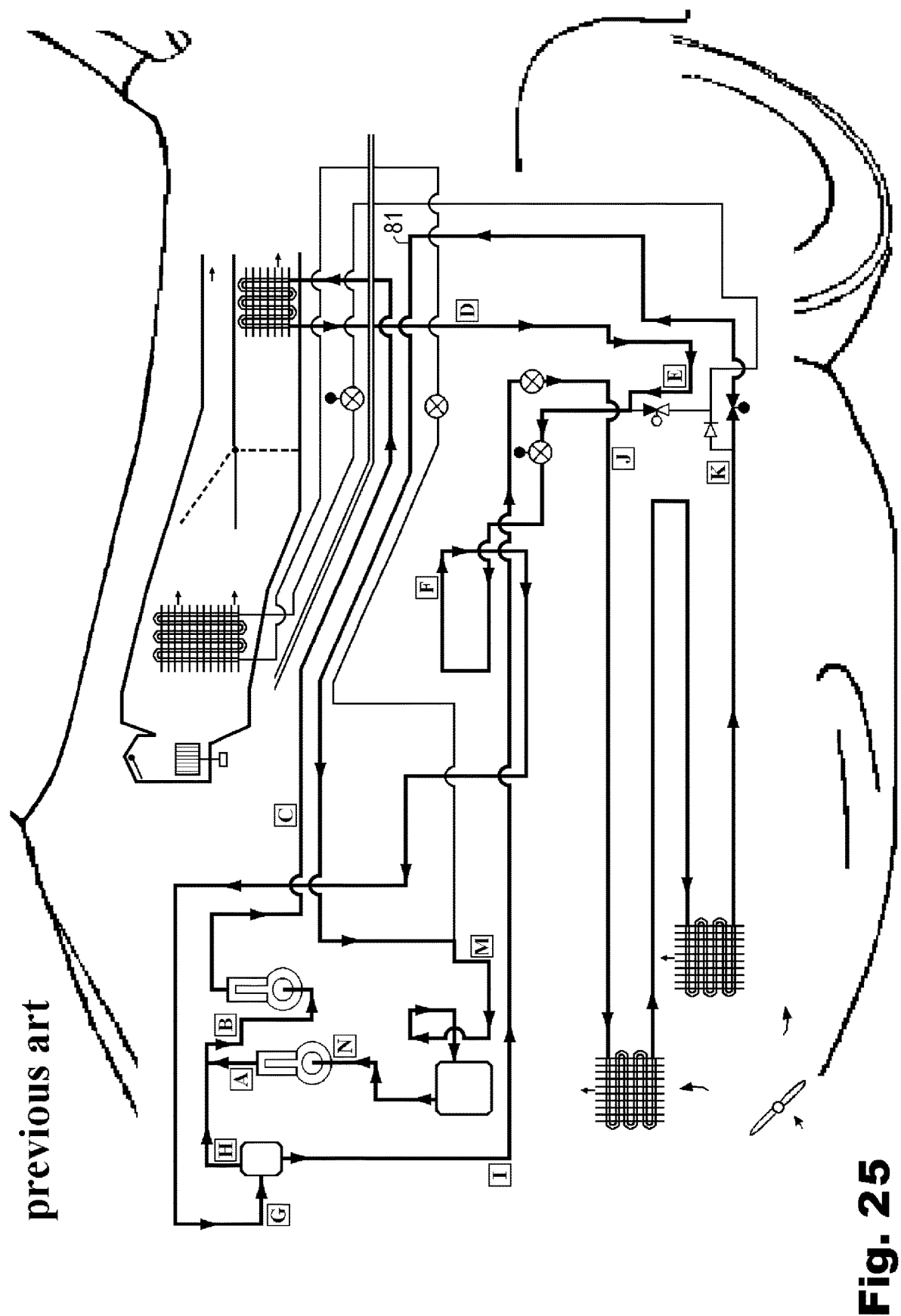
FIG. 25 is the flow diagram relating to a heat pump conventional mobile system with gas injection used for vehicles internal air conditioning as known in the art (state of the art) during the operation in the no re-heating configuration corresponding to the function of "heating without dehumidification" of vehicles internal air housed inside the front bonnet of a generic vehicle where thick lines with arrows represent the refrigerant circuit and where the squared letters represent some relevant sections in analogy to flow diagram of FIG. 24.

For appropriate comparison, it is shown in FIG. 25 the flow diagram relating to a gas injection heat pump conventional mobile system used for vehicles internal air conditioning as known in the art (state of the art) during the operation in the no re-heating configuration corresponding to the function of "heating without dehumidification" of vehicles internal air inserted inside the front bonnet of a generic vehicle and where the squared letters represent some relevant sections in analogy to the flow diagram of FIG. 24. The comparison shows how the total number (four) of expansion devices—of whatever type they are, such as thermostatic expansion valves, electronic expansion valves, pressure regulation valves, capillary tube valves, etc.—of the system according to the present invention is the same as that of the state of the art system. The comparison shows how, moreover, the system according to the present invention presents compared to the state of the art system an exchange surface of the evaporators increased by approximately 50% and divided into 3 identical portions: during the defrosting of the exemplary case two portions are in evaporating operation—those characterized by the open fins of the two Venetian shutters disposed between the fans and the evaporators allowing the external air passage—while a portion—the one characterized by the closed fins of the Venetian shutter disposed between the corresponding fan and the evaporator preventing the external air passage—is in defrosting operation. It can be proved, finally, that with the same refrigerant the thermodynamic cycle relating to the flow diagram of FIG. 25 it is qualitatively the same as that shown in FIG. 8 relating to the flow diagram of FIG. 14 except for the points L, O, P and Q—and the relative transformation lines that join them—that are not there since the relative sections do not exist in the conventional mobile system of the state of the art of FIG. 25. Moreover, points M and N in this particular case coincide with point K; point E coincides with point D; point G coincides with point F.

Variants

Figure 26:
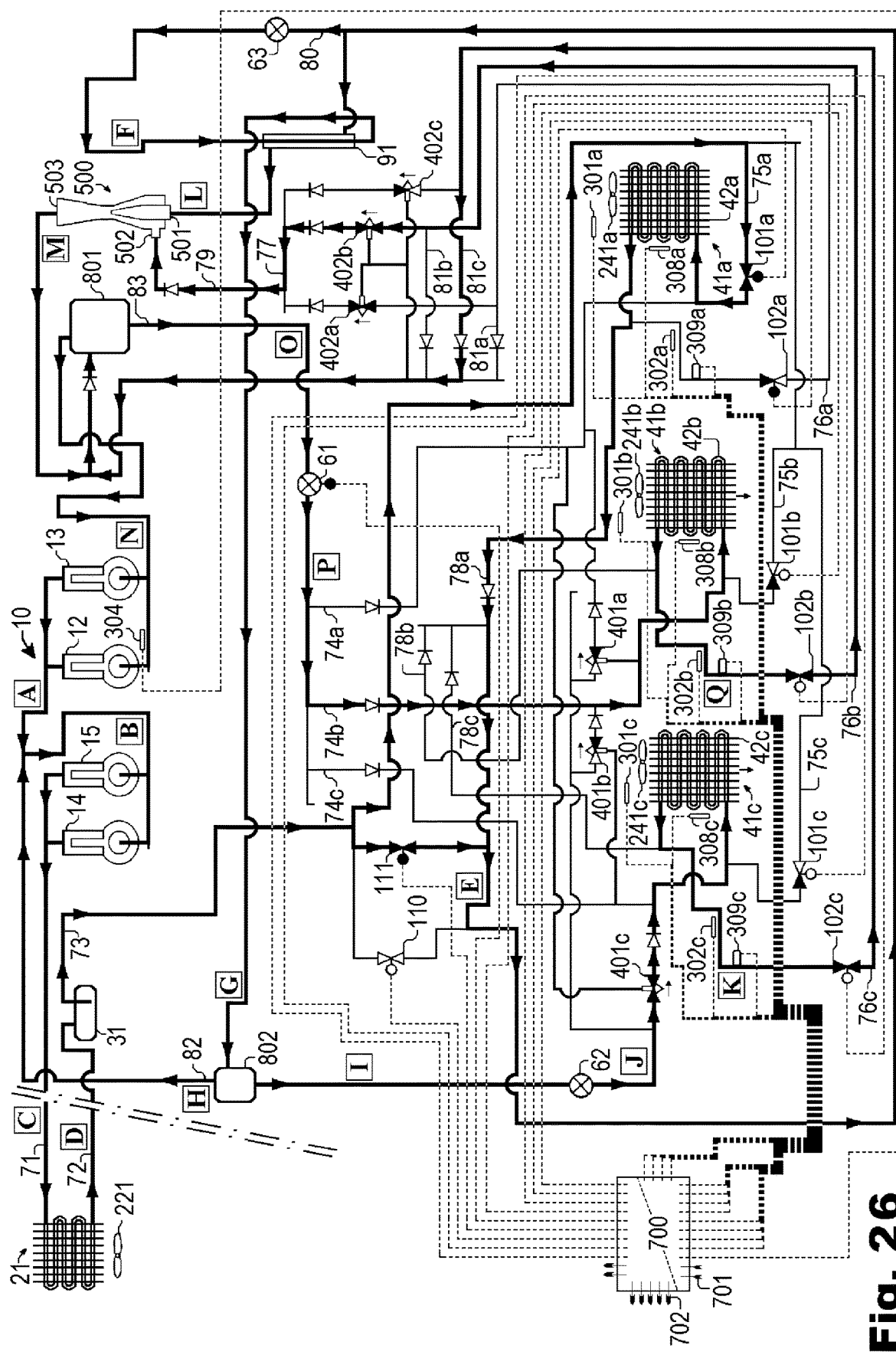
FIG. 26 is the flow diagram of the defrosting process related to an embodiment of a closed loop vapor cycle refrigeration system where the defrosting of a coil of a selected evaporator of a plurality of evaporators is obtained by liquid refrigerant which is circulated through said coil in the same direction as normal flow as known in the art which use all and only the same devices of the embodiment of the discovered invention as described above with reference to FIG. 6 where thick lines with arrows represent the refrigerant circuit and where the squared letters represent the same relevant sections shown in FIG. 7.

Refer now to FIG. 26. It is shown the flow diagram of the defrosting process relating to an embodiment of a closed loop vapor cycle refrigeration system as known in the art where the defrosting of a coil of a selected evaporator of a plurality of evaporators is obtained by liquid refrigerant which is circulated through said coil in the same direction as normal flow which uses all and only the same devices of the embodiment of the discovered invention as described above with reference to FIG. 6 where thick lines with arrows represent the refrigerant circuit and where the squared letters represent the same relevant sections shown in FIG. 7. More in detail, compared to the corresponding flow diagram of the reverse liquid defrosting process of the exemplary case shown in FIG. 7 for the embodiment of the discovered invention as described above with reference to FIG. 6 the flow diagram shown in FIG. 26 comprises the following two changes only: the first change is that flow lines 75a-c—that were reverse liquid flow lines in the previous figures—are now in FIG. 26 liquid forward flow lines which—always having as first termination a portion of the liquid forward flow line 73 upstream of the valve 110—have as second termination a portion of the corresponding flashed refrigerant flow lines 74*a-c* instead of a portion of the corresponding cold gas flow lines 76*a-c*. The second change is that the three flow lines 78*a-c*—that were additional liquid reverse flow lines in the previously figures—are now additional liquid forward flow lines in FIG. 26 which—always having as second termination the low pressure side of the liquid forward flow line valve 110—have as first termination a portion of the corresponding cold gas flow lines 76*a-c* instead of a portion of the corresponding flashed refrigerant flow lines 74*a-c*. It can be easily demonstrated that all devices shown in the embodiment of the FIG. 9 are (or whatever they may be) arranged in the embodiment to which the flow diagram of FIG. 26 refers in the same positions (occupied in the embodiment of the discovered invention previously described above precisely in FIG. 9) and perform the same functions with the only exception of the three-way valves 103. In fact, the disadvantage of this variant is that the valves 101 and 102 are no longer on the same side (the outlet side) of the respective evaporator, but from opposite sides and, to be exact, the valve 101 is in this variant on the inlet side of the evaporator while the valve 102 continues to be on the outlet side of the evaporator. This makes it impossible to replace the two valves 101 and 102 with one suitable three-way valve 103 and so determines a constructive complication. It is explicitly noted, finally, that the Mollier diagramm showing the thermodynamic state of a low-boiling refrigerant circulating in the flow diagram of FIG. 26 at the relevant sections identified with squared letters is the same as that shown in FIG. 8 with reference to embodiment of FIG. 6 in correspondence of the relevant sections shown in the flow diagram of FIG. 7 during defrosting operation of a selected evaporator with the same refrigerant fluid.

Another possible variant of the refrigeration system according to the present invention is achieved providing as reference pressure for the automatic isolation valves 401*a*, 401 *b*, 401*c* the pressure of the outlet respectively of the evaporators 41*b*, 41*c*, 41*a* instead of the pressure of the inlet.

Figure 22:
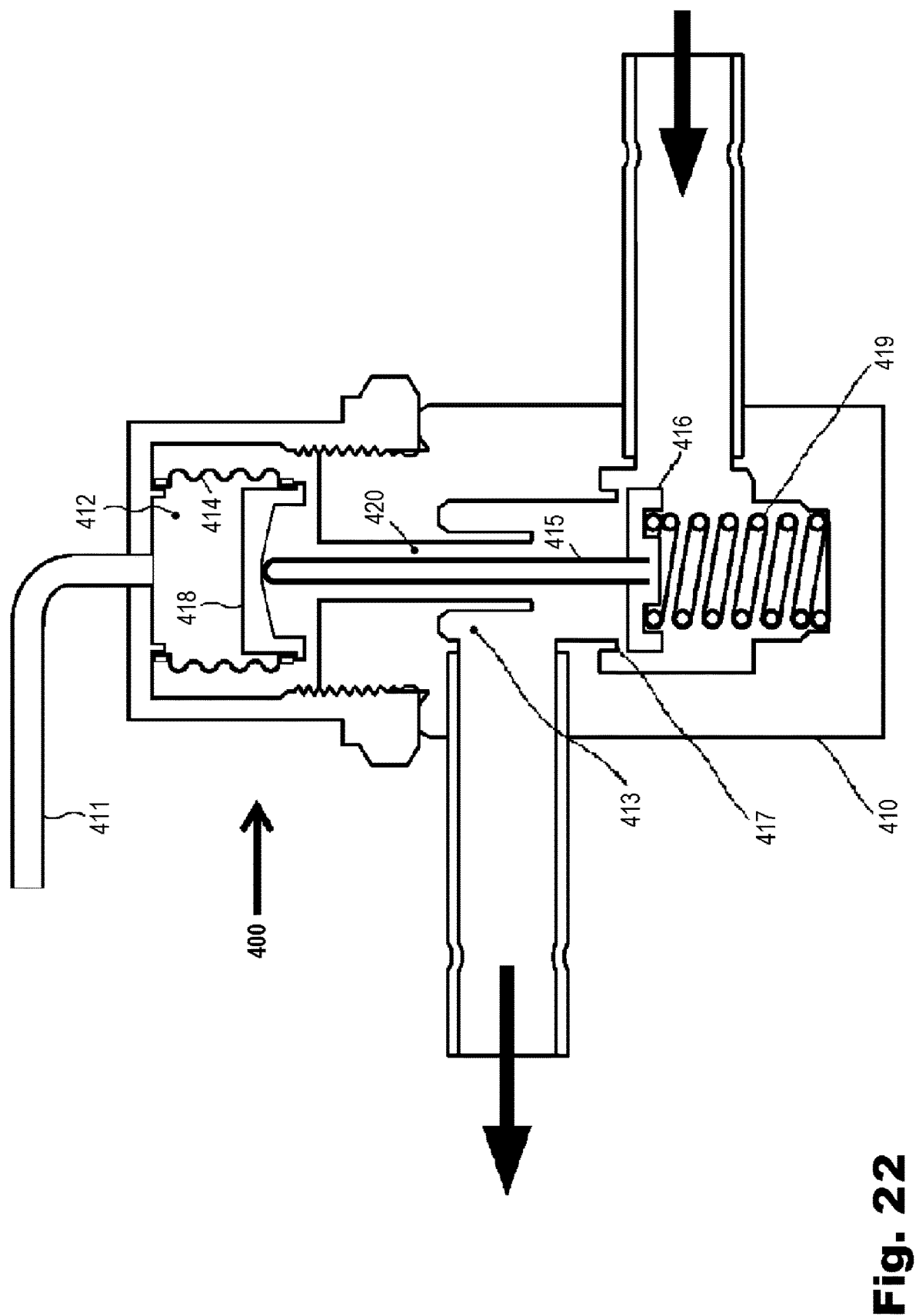
FIG. 22 is a section of a variant of the automatic valve of the close on rise of inlet pressure type which opens only when the inlet pressure is somewhat lower than a reference pressure which differs from the previous valve whose section is shown in FIG. 21 for having the stem simply resting on the piston which is integral with the elastic sealing element.

It is, finally, shown in FIG. 22 a section of a variant of the automatic valve of the close on rise of inlet pressure type which differs from the original one 400 described above and shown in FIG. 21 for having the stem 415 simply resting on the piston 418, being the piston 418 integral with the elastic sealing element 414.

Advantages

The already described improvements achieved according to the present invention lead to numerous advantages. A first advantage compared to Alsenz patent is absolutely evident and is due to the fewer number of expansion devices required in normal flow—which are reduced to one—and consists in the immediate savings both in economic terms for expensive devices that are eliminated and in terms of constructive simplification of the entire system and both in terms of safety and simplicity of operation of the system operated by the control circuit.

A second, more general advantage is due to the use as isolation valves of automatic valves of the close on rise of inlet pressure type and consists of both in the immediate savings in economic terms for the elimination of expensive electric actuators and in the further simplification and of the system which has less electrical wiring and of the control circuit which has to handle fewer actions. These automatic valves of the close on rise of inlet pressure type however, are intrinsically inexpensive because they do not require any calibration.

A third advantage is due to the combined use among other devices of the ejector, of the first vapor-liquid separator and of the first of the described auxiliary expansion devices and consists in the improvement of the global efficiency having a suction pressure which—without eventually pressure drops—is the higher (and not the lower) of two distinct evaporation pressures of two distinct non-selected evaporators.

Figure 27:
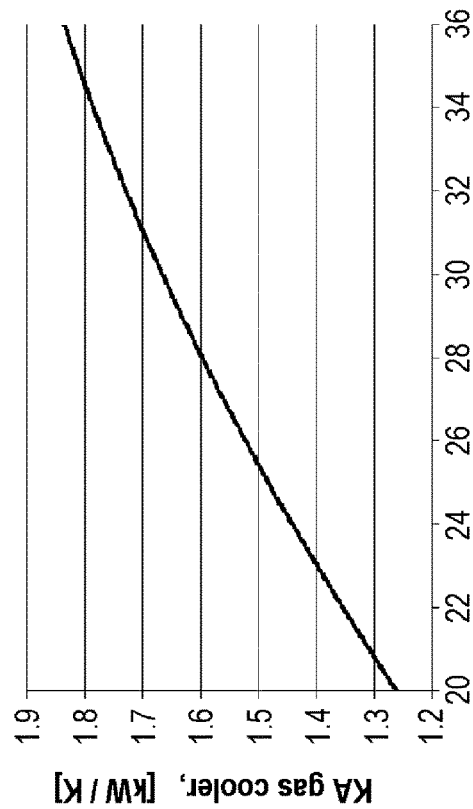
FIG. 27 is the gas-cooler KA curve—of the examined case study for quantification of the improvement of the overall efficiency of the discovered system compared to that related to the state of the art—diagramed as a function of the power exchanged.
Figure 28:
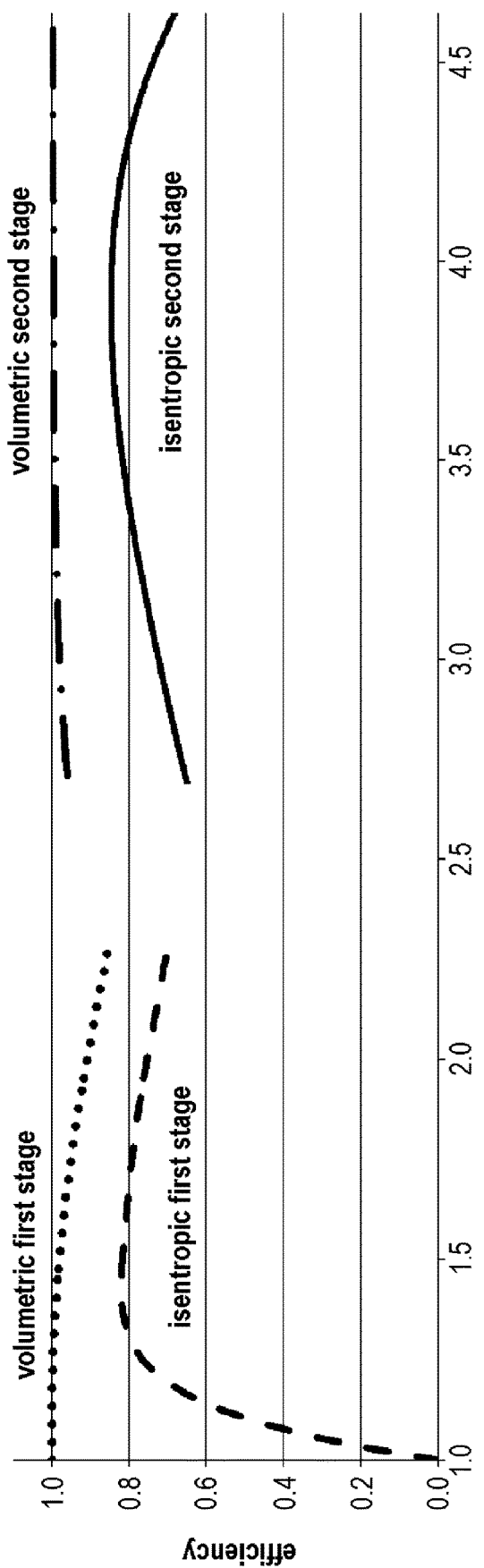
FIG. 28 is the efficiency diagram (isentropic and volumetric) of the first and second compression stage—of the examined case study for quantification of the improvement of the overall efficiency of the discovered system compared to that related to the state of the art—reported as a function of the compression ratio.
Figure 29:
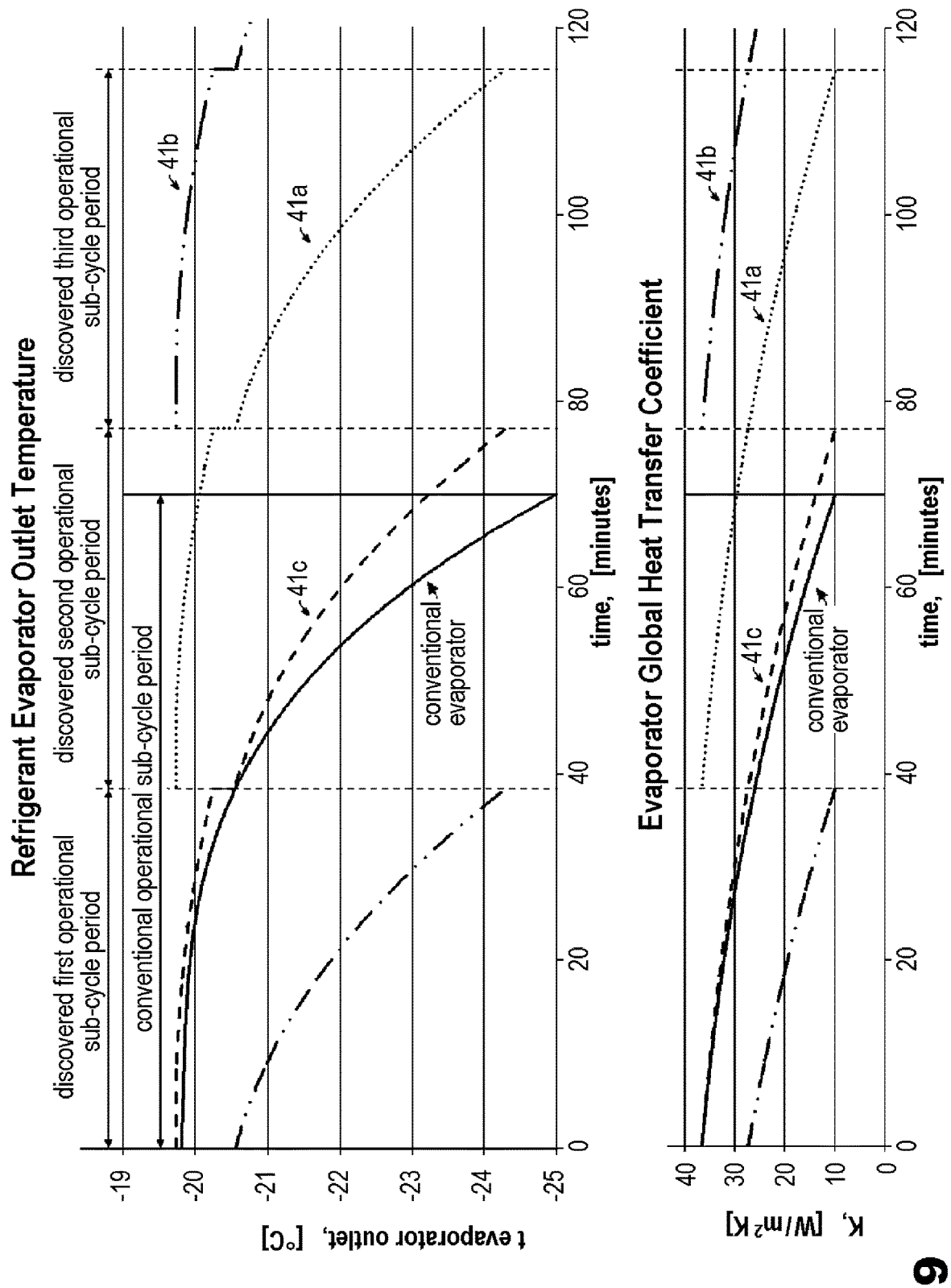
FIG. 29 consists of two graphs—in relation to the examined case study for quantification of the improvement of the overall efficiency of the discovered system compared to that related to the state of the art—which show respectively refrigerant temperatures in the outlet from the various "non in defrosting" evaporators and the global heat exchange coefficient of the various "non in defrosting" evaporators according to the time elapsed from the beginning of a conventional operating sub-cycle for the system taken as a reference basis, initial instant that is made to coincide with the beginning of the first of the three sequential operating sub-cycles for the discovered system.

A fourth advantage is due to the further use compared to the previous case of the second compression stage connected to the second vapor-liquid separator and the further auxiliary expansion device arranged in the auxiliary liquid flow line which determines a more decisive improvement of the global efficiency. In order to quantify such improvement of the global efficiency for the condition just described we examine a case study that considers as reference base the heat pump conventional mobile system with gas injection used for vehicles internal air conditioning as known in the art (state of the art) during a complete cycle consisting of the operating sub-cycle in the no re-heating configuration—corresponding to the function of "heating without dehumidification" of vehicles internal air and whose flow diagram has been already shown in FIG. 25—and of the defrost sub-cycle. Such system taken as a reference basis is compared with the system discovered of FIG. 6: in fact, the embodiment of the discovered invention shown in FIG. 6—as the relative flow diagram of FIG. 7—can very well be understood as referred to a heat pump mobile system where the condenser 21 is inserted inside a treatment unit of vehicles internal air (not shown). More in detail, the flow diagram of FIG. 7 can very well be understood as the flow diagram of the reverse liquid defrosting process of a selected evaporator relating to a heat pump mobile system for vehicles internal air conditioning during the operation in the no re-heating configuration corresponding to the function of "heating without dehumidification" of the vehicles internal air where the condenser 21 is inserted inside a treatment unit of the internal air (not shown). In this case, a complete operation cycle is composed of three analogues and sequential operating defrosting sub-cycles for each of the three evaporators—the evaporator 41*a* for the first operating sub-cycle, the evaporator 41*b* for the second operating sub-cycle, the evaporator 41*c* for the third operating sub-cycle—selected from time to time. Moreover, always with reference to the discovered system of FIG. 6 the automatic valves of the close on rise of inlet pressure type equipped on the outlet side with check valves are sized so that each valve opens only when the inlet pressure is lower than 0.5 bar of the reference pressure. Well then, we report below the reference conditions for the case study under exam sized for an hypothetical electric bus:

a) refrigerant: carbon dioxide;
b) average thermal useful heat: 26.7 kW;
c) second compression stage discharge temperature: 121° C.;
d) superheating: 0K;
e) KA of the gas cooler—which in the case study replaces the condenser having as refrigerant carbon dioxide—plotted as a function of the power exchanged as shown in FIG. 27;
f) efficiency (isentropic and volumetric) of the first and of the second compression stage plotted as a function of the compression ratio as shown in FIG. 28;
g) secondary fluid gas cooler inlet temperature: 30° C.;
h) secondary fluid gas cooler outlet temperature: 70° C.;
i) exchange surface of the conventional evaporator: 180 (2×90) $m^2$;
j) exchange surface of the discovered evaporator: 270 (3×90) $m^2$;

k) external air temperature: −15° C.;

l) external air relative humidity: 72%;

m) auxiliaries consumption: 0.872 kW;

n) displacement of the compression first stage: 6.38 m³/h;

o) displacement of the compression second stage: 5.62 m³/h.

where by average we mean the average value of an entire cycle as defined above and for exchange surface of the evaporator we mean the global external surfaces of the evaporatore in contact with the external air. That said, graphs A and B of FIG. 29 show respectively the refrigerant temperature in the outlet of the various "not in defrosting" evaporators and the global heat exchange coefficient of the various "not in defrosting" evaporators plotted according to the time elapsed both from the beginning of a conventional operating sub-cycle for the system taken as a reference basis and from the beginning of the first of the three sequential operating sub-cycles for the system discovered. The following Table 1 shows the values of the flow rates and of the thermodynamic conditions of the refrigerant in the relevant sections of FIG. 25 in the "start" conditions of the operative sub-cycle of the conventional system taken as a reference basis for the case study under exam. The following Table 2 shows, on the contrary, the values of the flow rates and of thermodynamic conditions of the refrigerant in the relevant sections of FIG. 25 in the "end" conditions of the operative sub-cycle of the conventional system taken as a reference basis for the case study under exam.

TABLE 1

| point | t [° C.] | p [bar] | h [kJ/kg] | s [kJ/kg K] | den [kg/m3] | M [%] | M [kg/s] |
|---|---|---|---|---|---|---|---|
| A | 29.8 | 37.5 | 470.5 | 1.973 | 82.3 | 62.2 | 0.0857 |
| B | 18.3 | 37.5 | 454.8 | 1.920 | 90.0 | 100.0 | 0.1378 |
| C | 121.0 | 112.5 | 526.1 | 1.970 | 192.7 | 100.0 | 0.1378 |
| D | 37.3 | 112.1 | 290.9 | 1.280 | 724.3 | 100.0 | 0.1378 |
| E = D | 37.3 | 112.1 | 290.9 | 1.280 | 724.3 | 100.0 | 0.1378 |
| F | 2.7 | 37.5 | 290.9 | 1.329 | 236.3 | 100.0 | 0.1378 |
| G = F | 2.7 | 37.5 | 290.9 | 1.329 | 236.3 | 100.0 | 0.1378 |
| H | 2.7 | 37.5 | 429.2 | 1.830 | 106.6 | 37.8 | 0.0521 |
| I | 2.7 | 37.5 | 206.8 | 1.024 | 910.6 | 62.2 | 0.0857 |
| J | −19.2 | 20.2 | 206.8 | 1.039 | 238.9 | 62.2 | 0.0857 |
| K | −19.8 | 19.8 | 436.9 | 1.948 | 52.0 | 62.2 | 0.0857 |
| L | — | — | — | — | — | — | — |
| M = K | −19.8 | 19.8 | 436.9 | 1.948 | 52.0 | 62.2 | 0.0857 |
| N = M | −19.8 | 19.8 | 436.9 | 1.948 | 52.0 | 62.2 | 0.0857 |
| O | — | — | — | — | — | — | — |
| P | — | — | — | — | — | — | — |
| Q | — | — | — | — | — | — | — |

TABLE 2

| point | t [° C.] | p [bar] | h [kJ/kg] | s [kJ/kg K] | den [kg/m3] | M [%] | M [kg/s] |
|---|---|---|---|---|---|---|---|
| A | 29.1 | 33.5 | 474.8 | 2.004 | 71.7 | 57.9 | 0.0708 |
| B | 14.9 | 33.5 | 456.7 | 1.943 | 79.3 | 100.0 | 0.1222 |
| C | 121.0 | 106.5 | 530.0 | 1.989 | 179.9 | 100.0 | 0.1222 |
| D | 37.5 | 106.1 | 295.4 | 1.297 | 701.6 | 100.0 | 0.1222 |
| E = D | 37.5 | 106.1 | 295.4 | 1.297 | 701.6 | 100.0 | 0.1222 |
| F | −1.5 | 33.5 | 295.4 | 1.352 | 194.7 | 100.0 | 0.1222 |
| G = F | −1.5 | 33.5 | 295.4 | 1.352 | 194.7 | 100.0 | 0.1222 |
| H | −1.5 | 33.5 | 431.7 | 1.854 | 93.2 | 42.1 | 0.0514 |
| I | −1.5 | 33.5 | 196.4 | 0.987 | 936.2 | 57.9 | 0.0708 |
| J | −24.3 | 17.2 | 196.4 | 1.003 | 213.8 | 57.9 | 0.0708 |
| K | −25.0 | 16.8 | 437.1 | 1.973 | 43.9 | 57.9 | 0.0708 |
| L | — | — | — | — | — | — | — |
| M = K | −25.0 | 16.8 | 437.1 | 1.973 | 43.9 | 57.9 | 0.0708 |
| N = M | −25.0 | 16.8 | 437.1 | 1.973 | 43.9 | 57.9 | 0.0708 |
| O | — | — | — | — | — | — | — |
| P | — | — | — | — | — | — | — |
| Q | — | — | — | — | — | — | — |

In the following Table 3 they are shown the values of the flow rates and of thermodynamic conditions of the refrigerant in the relevant sections of FIG. 7 in the "start" conditions of each of the three sequential operating sub-cycles of the discovered system for the case study under exam. In the following Table 4 they are shown the values of the flow rates and of thermodynamic conditions of the refrigerant in the relevant sections of FIG. 7 in the "end" conditions of each of the three sequential operating sub-cycles of the discovered system for the case study under exam.

TABLE 3

| point | t [° C.] | p [bar] | h [kJ/kg] | s [kJ/kg K] | den [kg/m3] | M [%] | M [kg/s] |
|---|---|---|---|---|---|---|---|
| A | 6.5 | 28.4 | 454.2 | 1.959 | 67.8 | 84.9 | 0.0912 |
| B | 4.2 | 28.4 | 451.2 | 1.948 | 69.0 | 100.0 | 0.1073 |
| C | 121.0 | 109.6 | 528.0 | 1.979 | 186.5 | 100.0 | 0.1073 |
| D | 35.5 | 109.2 | 286.1 | 1.265 | 736.2 | 100.0 | 0.1073 |
| E | 26.1 | 108.8 | 257.4 | 1.171 | 822.4 | 100.0 | 0.1073 |
| F | −7.5 | 28.4 | 257.4 | 1.220 | 217.4 | 50.5 | 0.0541 |
| G = F | −7.5 | 28.4 | 257.4 | 1.220 | 217.4 | 50.5 | 0.0541 |
| H | −7.5 | 28.4 | 434.4 | 1.886 | 77.0 | 15.1 | 0.0162 |
| I | −7.5 | 28.4 | 182.2 | 0.936 | 970.0 | 35.4 | 0.0380 |
| J | −19.1 | 20.3 | 182.2 | 0.942 | 383.3 | 35.4 | 0.0380 |
| K | −19.7 | 19.9 | 436.9 | 1.947 | 52.1 | 35.4 | 0.0380 |
| L | 26.1 | 108.8 | 257.4 | 1.171 | 822.4 | 49.5 | 0.0532 |
| M | −19.7 | 19.9 | 327.2 | 1.515 | 82.7 | 81.1 | 0.0870 |
| N | −19.7 | 19.9 | 436.9 | 1.947 | 52.1 | 84.9 | 0.0912 |
| O | −19.7 | 19.9 | 155.0 | 0.835 | 1030.5 | 31.6 | 0.0339 |
| P | −19.9 | 19.8 | 155.0 | 0.835 | 1007.4 | 31.6 | 0.0339 |
| Q | −20.6 | 19.4 | 436.9 | 1.951 | 50.8 | 31.6 | 0.0339 |

TABLE 4

| point | t [° C.] | p [bar] | h [kJ/kg] | s [kJ/kg K] | den [kg/m3] | M [%] | M [kg/s] |
|---|---|---|---|---|---|---|---|
| A | 12.3 | 30.3 | 458.5 | 1.964 | 70.7 | 78.3 | 0.0887 |
| B | 8.1 | 30.3 | 453.0 | 1.945 | 73.0 | 100.0 | 0.1134 |
| C | 121.0 | 109.9 | 527.8 | 1.978 | 187.0 | 100.0 | 0.1134 |
| D | 35.9 | 109.5 | 287.5 | 1.270 | 732.1 | 100.0 | 0.1134 |
| E | 35.9 | 109.1 | 287.5 | 1.270 | 731.6 | 100.0 | 0.1134 |
| F | −5.2 | 30.3 | 287.5 | 1.329 | 181.1 | 53.5 | 0.0607 |
| G = F | −5.2 | 30.3 | 287.5 | 1.329 | 181.1 | 53.5 | 0.0607 |
| H | −5.2 | 30.3 | 433.5 | 1.874 | 82.9 | 21.7 | 0.0247 |
| I | −5.2 | 30.3 | 187.6 | 0.956 | 957.3 | 31.8 | 0.0360 |
| J | −19.6 | 19.9 | 187.6 | 0.963 | 328.1 | 31.8 | 0.0360 |
| K | −20.3 | 19.5 | 436.9 | 1.950 | 51.3 | 31.8 | 0.0360 |
| L | 35.9 | 109.1 | 287.5 | 1.270 | 731.6 | 46.5 | 0.0527 |
| M | −20.3 | 19.5 | 339.2 | 1.563 | 76.3 | 71.0 | 0.0805 |
| N | −20.3 | 19.5 | 436.9 | 1.950 | 51.3 | 78.3 | 0.0887 |
| O | −20.3 | 19.5 | 153.9 | 0.831 | 1032.8 | 24.5 | 0.0278 |
| P | −23.6 | 17.6 | 153.9 | 0.832 | 683.2 | 24.5 | 0.0278 |
| Q | −24.3 | 17.2 | 437.1 | 1.970 | 44.9 | 24.5 | 0.0278 |

Figure 30:
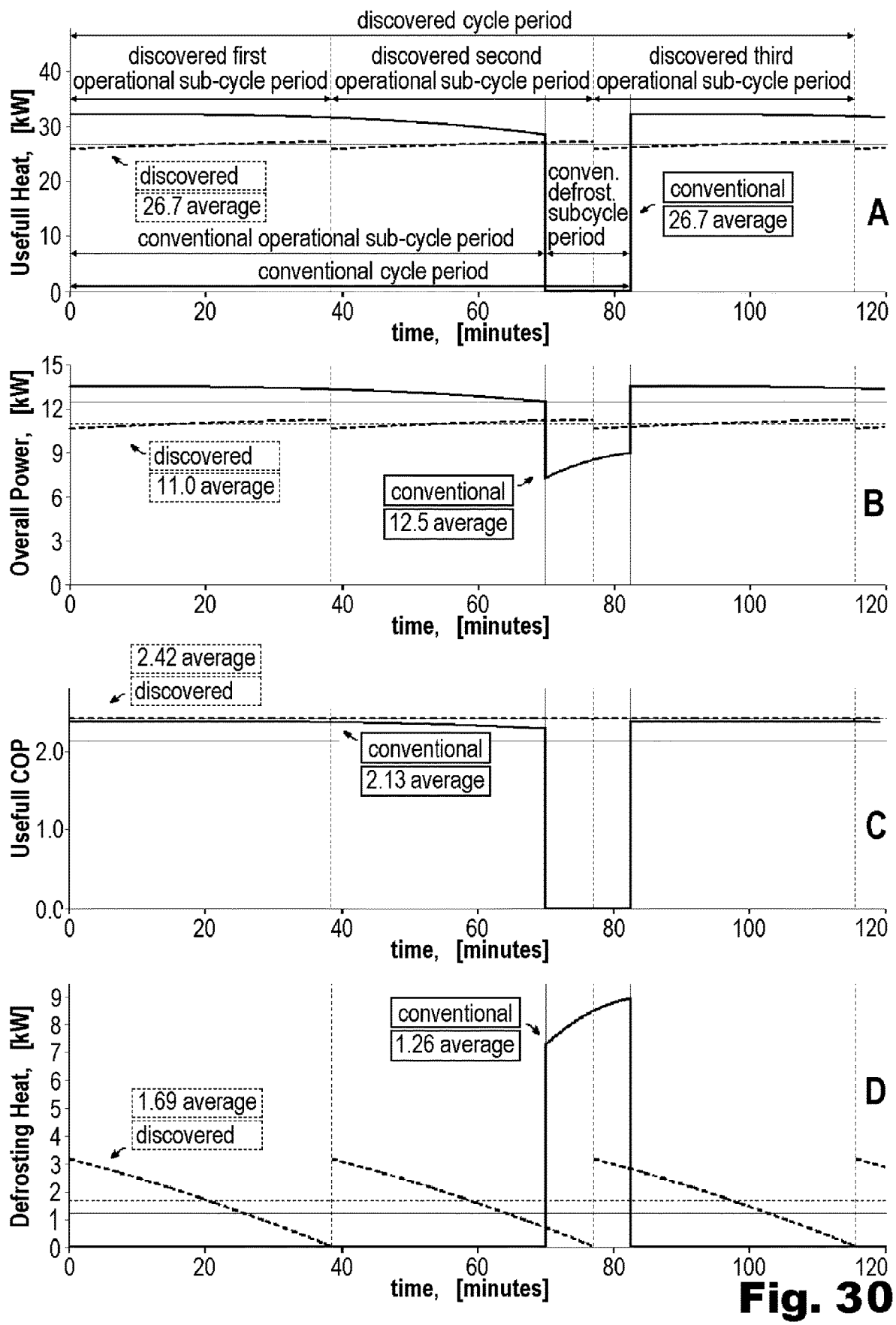
FIG. 30 consists of four diagrams—in relation to the examined case study for quantification of the improvement of the overall efficiency of the discovered system compared to that related of the state of the art—which show respectively the trend of the useful thermal power ("heat"), overall power consumption (that is including auxiliaries), the useful COP and the defrost heating power according to the time elapsed from the beginning of a complete operation cycle both for the state of the art and the discovered system and where the squared values represent the respective average values of each cycle.

Graphs A, B, C and D of FIG. 30 show the results of the quantification of the improvement of the global efficiency of the discovered system are compared to that of the state of the art for the examined case study. More in detail, the results are expressed by four diagrams that—according to the time elapsed from the beginning of a complete operation cycle both for the state of the art and for the discovered system—show respectively the temporal trend of the useful thermal power, the total power consumption (including the auxiliaries), the Useful COP and the defrost heating power. The squared values represent the respective average values of each cycle. Because the quantification process of the improvement of the global efficiency was carried out starting from the condition of constancy of the average useful thermal power (26.7 kW as specificated in the point b of the reference conditions) it is noted an improvement of the average useful COP of the 13.6% passing from 2.13 for the conventional system to 2.42 for the discovered system.

A fifth advantage is due to the additional use in the discovered system of the expander-compressor group—in place of the further auxiliary expansion device arranged in the auxiliary liquid flow line—and of the internal heat exchanger and consists in a further improvement of the global efficiency. In order to quantify the further improvement of the global efficiency due to the introduction in the discovered system of the components just described we examine a variant of the case study previously esaminated which considers again as reference base the heat pump conventional mobile system with gas injection used for vehicles internal air conditioning as known in the art (state of the art) during a complete cycle consisting of the operating sub-cycle in the no re-heating configuration—corresponding to the function of "heating without dehumidification" of vehicles internal air and whose flow diagram has been already shown in FIG. 25—and of the defrosting sub-cycle. Such system taken again as reference base has been compared with the discovered system shown in FIG. 9—and the relative flow diagrams of FIG. 14, FIG. 20 and FIG. 24 with reference to FIG. 23 as regards the group of valves—during the operation in the no re-heating configuration corresponding to the function of "heating without dehumidification" of vehicles internal air during a complete cycle consisting of the three sequential operating defrosting sub-cycles for each of the three evaporators—the evaporator 41a for the first operating sub-cycle, the evaporator 41b for the second operating sub-cycle, the evaporator 41c for the third operating sub-cycle—selected from time to time. Moreover, always with reference to the discovered system of FIG. 9—and the relative flow diagrams of FIG. 14, FIG. 20 and FIG. 24 with reference to FIG. 23 as regards the group of valves—the automatic valves of the close on rise of inlet pressure type equipped on the outlet side with check valves are sized so that each valve opens only when the inlet pressure is lower than 0.5 bar of the reference pressure. The reference conditions (valide for an hypothetical electric bus) are the same already described for the case study previously examined with the exception of the displacement of the first and of the second compression stage which become respectively 4.61 m³/h and 5.36 m³/h in the discovered system while continue to be 6.38 m³/h and 5.62 m³/h for the conventional system taken as a reference basis. Moreover, the expansion isentropic efficiency of the expander of the expander-compressor group is fixed at 0.68 while the compression isentropic efficiency of the compressor of the expander-compressor group is fixed at 0.70.

The values of the flow rates and of thermodynamic conditions of the refrigerant in the relevant sections of FIG. 25 in the "start" conditions and in the "end" conditions of the operative sub-cycle of the conventional system taken again as reference base also for such variant of the case study under exam are the same already shown in the previous Tables 1 and 2 respectively. On the contrary, in the following Table 5 they are shown the values of the flow rates and of thermodynamic conditions of the refrigerant in the relevant sections of FIG. 14, FIG. 20, FIG. 23 and FIG. 24 in the "start" conditions of each of the three sequential operating sub-cycles of the discovered system for the variant of the case study under exam.

TABLE 5

| point | t [° C.] | p [bar] | h [kJ/kg] | s [kJ/kg K] | den [kg/m3] | M [%] | M [kg/s] |
|---|---|---|---|---|---|---|---|
| A | 7.3 | 28.6 | 454.8 | 1.960 | 68.0 | 61.8 | 0.0655 |
| B | 1.4 | 28.6 | 447.0 | 1.932 | 71.4 | 100.0 | 0.1059 |
| C | 121.0 | 115.5 | 524.1 | 1.962 | 199.2 | 100.0 | 0.1059 |
| D | 34.1 | 115.1 | 279.0 | 1.240 | 764.8 | 100.0 | 0.1059 |
| E | 23.2 | 114.7 | 248.5 | 1.139 | 851.8 | 100.0 | 0.1059 |
| F | −6.9 | 28.9 | 301.0 | 1.383 | 153.4 | 75.3 | 0.0798 |
| G | −7.3 | 28.6 | 310.2 | 1.418 | 142.0 | 75.3 | 0.0798 |
| H | −7.3 | 28.6 | 434.3 | 1.884 | 77.6 | 38.2 | 0.0404 |
| I | −7.3 | 28.6 | 182.8 | 0.938 | 968.6 | 37.1 | 0.0393 |
| J | −19.3 | 20.1 | 182.8 | 0.944 | 373.5 | 37.1 | 0.0393 |
| K | −19.9 | 19.7 | 436.9 | 1.948 | 51.8 | 37.1 | 0.0393 |
| L | 17.0 | 114.3 | 233.2 | 1.087 | 891.1 | 45.7 | 0.0484 |
| M | −19.9 | 19.7 | 318.6 | 1.481 | 86.1 | 78.6 | 0.0833 |
| N | −19.9 | 19.7 | 436.9 | 1.948 | 51.8 | 61.8 | 0.0655 |
| O | −19.9 | 19.7 | 154.6 | 0.833 | 1031.3 | 32.9 | 0.0349 |
| P | −20.1 | 19.6 | 154.6 | 0.833 | 1002.5 | 32.9 | 0.0349 |
| Q | −20.8 | 19.2 | 437.0 | 1.953 | 50.4 | 32.9 | 0.0349 |

Finally, in the following Table 6 they are shown the values of the flow rates and of thermodynamic conditions of the refrigerant in the relevant sections of FIG. 14, FIG. 20, FIG. 23 and FIG. 24 in the "end" conditions of each of the three sequential operating sub-cycles of the discovered system for the variant of the case study under exam.

TABLE 6

| pont | t [° C.] | p [bar] | h [kJ/kg] | s [kJ/kg K] | den [kg/m3] | M [%] | M [kg/s] |
|---|---|---|---|---|---|---|---|
| A | 12.6 | 30.3 | 458.8 | 1.965 | 70.6 | 57.3 | 0.0639 |
| B | 4.4 | 30.3 | 448.0 | 1.927 | 75.3 | 100.0 | 0.1116 |
| C | 121.0 | 117.0 | 523.2 | 1.957 | 202.4 | 100.0 | 0.1116 |
| D | 34.3 | 116.6 | 279.1 | 1.239 | 766.3 | 100.0 | 0.1116 |
| E | 34.3 | 116.2 | 279.1 | 1.239 | 766.0 | 100.0 | 0.1116 |
| F | −5.0 | 30.5 | 325.5 | 1.470 | 139.5 | 76.2 | 0.0850 |
| G | −5.2 | 30.3 | 325.5 | 1.471 | 138.3 | 76.2 | 0.0850 |
| H | −5.2 | 30.3 | 433.5 | 1.874 | 82.9 | 42.7 | 0.0477 |
| I | −5.2 | 30.3 | 187.6 | 0.956 | 957.3 | 33.4 | 0.0373 |
| J | −19.8 | 19.8 | 187.6 | 0.964 | 324.3 | 33.4 | 0.0373 |
| K | −20.4 | 19.4 | 436.9 | 1.951 | 51.0 | 33.4 | 0.0373 |
| L | 34.2 | 116.0 | 279.1 | 1.239 | 766.0 | 46.3 | 0.0516 |
| M | −20.4 | 19.4 | 335.6 | 1.550 | 77.2 | 72.0 | 0.0804 |
| N | −20.4 | 19.4 | 436.9 | 1.951 | 51.0 | 57.3 | 0.0639 |
| O | −20.4 | 19.4 | 153.5 | 0.829 | 1033.7 | 25.7 | 0.0287 |
| P | −23.9 | 17.4 | 153.5 | 0.830 | 674.8 | 25.7 | 0.0287 |
| Q | −24.6 | 17.0 | 437.1 | 1.971 | 44.5 | 25.7 | 0.0287 |

Figure 31:
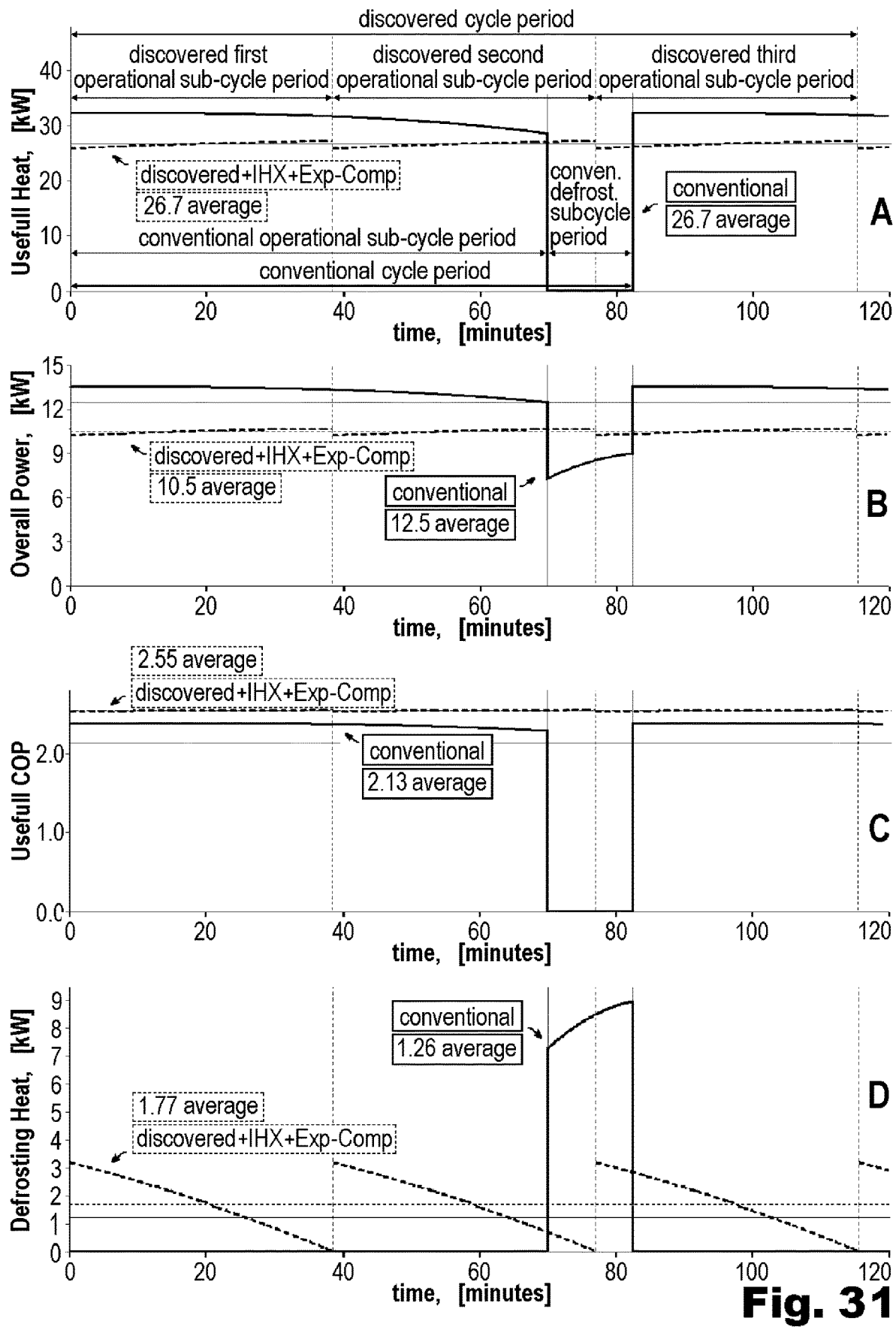
FIG. 31 consists of four diagrams—relative to the variant of the examined case study for quantification of the further improvement of the overall efficiency of the discovered system compared to that related to the state of the art—which show respectively the trend of the useful thermal power ("heat"), overall power consumption (that is including auxiliaries), the useful COP and the defrost heating power according to the time elapsed from the beginning of a complete operation cycle both for the state of the art and the discovered system and where the squared values represent the respective average values of each cycle.

In the graphs A, B, C and D of FIG. 31 the results of the quantification of the further improvement of the global efficiency of the discovered system are shown compared to the state of the art for the variant of the examined case study. More in detail, the results are expressed by means of four diagrams that—according to the time elapsed from the beginning of a complete operation cycle both for the state of the art and for the discovered system—show respectively the temporal trend of the useful thermal power, the total power consumption (including the auxiliaries), the Useful COP and the defrost heating power. The squared values represent the respective average values of each cycle. It is observed in particular as the diagramm A of the useful thermal power of FIG. 31 is identical to the diagramm A of the useful thermal power of FIG. 30. Because also for this variant of the case study under exam the quantification process of the further improvement of the global efficiency was carried out starting from the condition of constancy of the average useful thermal power (26.7 kW) it is noted an improvement of the average useful COP of the 19.7% passing from 2.13 for the conventional system to 2.55 for the system discovered.

The foregoing descriptions are directed to particular embodiments of the present invention for the purpose of illustration and explanation. It will be apparent, however, to one skilled in the art that many modifications and changes to the embodiments set forth above are possible without departing from the scope and the spirit of the invention. It is intended that the following claims can be interpreted to embrace all such changes and modifications.

The invention claimed is:

1. A closed loop vapor cycle refrigeration system, comprising at least:
    a plurality of evaporators, each evaporator having an outlet and an inlet for normal flow;
    a condenser having an outlet and an inlet;
    a compressor having an outlet and an inlet and a compressed hot gas flow line connecting the outlet of the compressor to the inlet of the condenser;
    an expansion device having an outlet and an inlet;
    a liquid forward flow line connecting the outlet of the condenser to the inlet of the expansion device, the liquid forward flow line having a liquid forward flow line valve therein;
    flashed refrigerant flow lines, each flashed refrigerant flow line connecting the outlet of the expansion device to the inlet of an evaporator and having a check valve therein;
    a suction manifold having one outlet and as many inlets as there are evaporators; cold gas flow lines, each cold gas flow line connecting the outlet of one evaporator to one inlet of the suction manifold and vice versa, each cold gas flow line having a cold gas flow line valve therein;
    a suction line connecting the outlet of the suction manifold to the inlet of the compressor;
    a liquid reverse flow line connecting the outlet of the condenser to the outlet of a selected evaporator of the plurality of evaporators, the liquid reverse flow line having a liquid reverse flow line valve therein; and
    further comprising an additional liquid reverse flow line connecting the inlet of the selected evaporator to a low pressure side of the liquid forward flow line valve, said additional liquid reverse flow line having a check valve therein.

2. The system of claim 1 whereby the liquid forward flow line has an ejector and a vapor-liquid separator therein and whereby the suction line starting from the outlet of the suction manifold passes through a suction port of the ejector and then through a discharge port of the ejector and then through the inlet of the vapor-liquid separator and then through an outlet of the vapor-liquid separator before ending in a compressor inlet and whereby each cold gas flow line has in addition an isolation valve therein; and
    the system further comprising auxiliary cold gas flow lines each of which connecting a portion of a cold gas flow line disposed between the corresponding cold gas flow line valve and the corresponding isolation valve to a portion of the suction line disposed between the discharge port of the ejector and the inlet of the vapor-liquid separator, each auxiliary cold gas flow line having a check valve therein.

3. The system of claim 2 further comprising:
    an auxiliary expansion device having an outlet and an inlet;
    an auxiliary liquid flow line branched off from the liquid forward flow line and connecting the low pressure side of the liquid forward flow line valve to the inlet of the auxiliary expansion device; and
    auxiliary flashed refrigerant flow lines each of which connecting the outlet of the auxiliary expansion device to the inlet of an evaporator, each auxiliary flashed refrigerant flow line having an isolation valve therein.

4. The system of claim 3 further comprising a second auxiliary expansion device and a second vapor-liquid separator arranged in the auxiliary liquid flow line and whereby the compressor has an extra inlet at an intermediate pressure between the high pressure of the compressor outlet and the low pressure of the compressor main inlet and whereby a supplementary flow line connects an outlet of the second vapor-liquid separator to the extra inlet of the compressor at said intermediate pressure.

5. The system of claim 3 further comprising an expander and a second vapor-liquid separator arranged in the auxiliary liquid flow line and whereby the compressor has an extra inlet at an intermediate pressure between the high pressure of the compressor outlet and the low pressure of the compressor main inlet and whereby a supplementary flow line connects an outlet of the second vapor-liquid separator to the extra inlet of the compressor at said intermediate pressure.

6. The system of claim 5 further comprising:
    a second compressor arranged together with the previously said expander to form an expander-compressor group in such a way that the outlet of the expander-compressor group corresponds both to the outlet port of the expander and to the outlet port of said second compressor;
    a further supplementary flow line branched off from the suction line and connecting a portion of the suction line disposed between an outlet of the first vapor-liquid separator and the main inlet of the first compressor to the inlet of said second compressor;
    an internal heat exchanger disposed between the liquid forward flow line and the auxiliary liquid flow line;
    a by-pass line of the auxiliary liquid flow line around said internal heat exchanger; and
    a valve arranged in said bypass line around said internal heat exchanger.

7. The system of claim 6 whereby the shaft of the second compressor arranged together with the previously said expander to form an expander-compressor group is connected to the shaft of the expander of the same expander-compressor group.

8. The system of claim 4 further comprising a further auxiliary expansion device and an external heat exchanger arranged in a further supplementary flow line branched off from the liquid forward flow line and connecting the low pressure side of the liquid forward flow line valve to a portion of the suction line disposed between the discharge port of the ejector and the inlet of the first vapor-liquid separator.

9. The system of claim 2 further comprising a by-pass line of the liquid forward flow line around the liquid forward flow line valve and a valve arranged in said by-pass line around the liquid forward flow line valve.

10. A method for defrosting an evaporator in a closed loop vapor cycle refrigeration system, said closed loop vapor cycle refrigeration system comprising at least a plurality of evaporators, each evaporator having an outlet and an inlet for normal flow; a condenser having an outlet and an inlet; a compressor having an outlet and an inlet and a compressed hot gas flow line connecting the outlet of the compressor to the inlet of the condenser; an expansion device having an outlet and an inlet; a liquid forward flow line connecting the outlet of the condenser to the inlet of the expansion device, the liquid forward flow line having a liquid forward flow line valve therein so as to allow the normal flow of liquid refrigerant leaving the condenser through said open liquid forward flow line valve before entering the expansion device; flashed refrigerant flow lines, each flashed refrigerant flow line connecting the outlet of the expansion device to the inlet of an evaporator and having a check valve therein so as to allow first the normal flow of flashed liquid refrigerant leaving the expansion device through said check valves before entering the evaporators and second the evaporation of flashed liquid refrigerant while it flows through the evaporators so that the refrigerant passes from the flashed liquid state to the evaporated cold gas state; a suction manifold having one outlet and as many inlets as there are evaporators; cold gas flow lines, each cold gas flow line connecting the outlet of one evaporator to one inlet of the suction manifold and vice versa, each cold gas flow line having a cold gas flow line valve therein so as to allow the normal flow of evaporated cold gas refrigerant leaving each evaporator through the corresponding open cold gas flow line valve before entering the suction manifold; a suction line connecting the outlet of the suction manifold to the inlet of the compressor so as to allow the normal flow of evaporated cold gas refrigerant leaving the suction manifold through the compressor before entering once compressed the condenser;

said method comprising the steps of:
providing a liquid reverse flow line connecting the outlet of the condenser to the outlet of a selected evaporator of the plurality of evaporators,
providing a liquid reverse flow line valve arranged in said liquid reverse flow line,
providing an additional liquid reverse flow line connecting the inlet of the selected evaporator to a low pressure side of the liquid forward flow line valve,
providing a check valve arranged in said additional liquid reverse flow line,
closing the cold gas flow line valve arranged in the cold gas flow line connecting the outlet of the selected evaporator to the corresponding inlet of the suction manifold,
opening the liquid reverse flow line valve,
closing the liquid forward flow line valve allowing the flow of liquid refrigerant leaving the condenser through the open liquid reverse flow line valve and then through the selected evaporator in reverse direction to normal flow so as to cause the subcooling of the liquid refrigerant flowing through the selected evaporator and the defrosting of the selected evaporator and allowing the flow of subcooled liquid refrigerant leaving the selected evaporator in reverse direction to normal flow through the check valve of the additional liquid reverse flow line and then through the low pressure side of the liquid forward flow line valve and then through the expansion device and allowing the flashing of the subcooled liquid refrigerant flowing through the expansion device and allowing the flow of flashed subcooled liquid refrigerant leaving the expansion device through the check valve of the flashed refrigerant flow line of a non-selected evaporator of the plurality of evaporators and then through the non-selected evaporator and allowing the evaporation of the flashed subcooled liquid refrigerant flowing through the non-selected evaporator so that the refrigerant passes from flashed subcooled liquid state to evaporated cold gas state and allowing the flow of evaporated cold gas refrigerant leaving the non-selected evaporator through the corresponding open cold gas flow line valve and then through the suction manifold and then through the compressor before entering once compressed the condenser, flowing liquid refrigerant leaving the condenser through the open liquid reverse flow line valve and then through the selected evaporator in reverse direction to normal flow so as to cause the subcooling of the liquid refrigerant flowing through the selected evaporator and the de-frosting of the selected evaporator, flowing subcooled liquid refrigerant leaving the selected evaporator in reverse direction to normal flow through the check valve of the additional liquid reverse flow line and then through the low pressure side of the liquid forward flow line valve, flowing subcooled liquid refrigerant leaving the low pressure side of the liquid forward flow line valve through the expansion device, flashing the subcooled liquid refrigerant flowing through the expansion device, flowing flashed subcooled liquid refrigerant leaving the expansion device through the check valve of the flashed refrigerant flow line of the non-selected evaporator and then through the non-selected evaporator, evaporating the flashed subcooled liquid refrigerant flowing through the non-selected evaporator so that the refrigerant passes from the flashed subcooled liquid state to the evaporated cold gas state and flowing evaporated cold gas refrigerant leaving the non-selected evaporator through the corresponding open cold gas flow line valve and then through the suction manifold and then through the compressor before entering once compressed the condenser until the selected evaporator is defrosted.

11. The method of claim 10, whereby the closed loop vapor cycle refrigeration system further comprises an ejector and a vapor-liquid separator arranged in the liquid forward flow line so as to allow both the normal flow of liquid refrigerant leaving the open liquid forward flow line valve through the motive port of the ejector and then through the discharge port of the ejector and then through the inlet of the vapor-liquid separator and then through an outlet of the vapor-liquid separator before entering the expansion device and the flow of subcooled liquid refrigerant leaving the low pressure side of the liquid forward flow line valve through the motive port of the ejector and then through the discharge port of the ejector and then through the inlet of the vapor-liquid separator and then through an outlet of the vapor-liquid separator before entering the expansion device until the selected evaporator is defrosted and whereby the suction line starting from the outlet of the suction manifold passes through the suction port of the ejector and then through the discharge port of the ejector and then through the inlet of the vapor-liquid separator and then through an outlet of the vapor-liquid separator before ending into the inlet of the compressor so as to allow first both the normal flow of evaporated cold gas refrigerant leaving the suction manifold through the suction port of the ejector and then through the discharge port of the ejector and then through the inlet of the vapor-liquid separator and then through an outlet of the vapor-liquid separator before entering the compressor and the flow of evaporated refrigerant cold gas leaving the suction manifold through the suction port of the ejector and then through the discharge port of the ejector and then through the inlet of the vapor-liquid separator and then through an outlet of the vapor-liquid separator before entering the compressor until the selected evaporator is defrosted and second both the conveyance of a fraction of the liquid refrigerant normal flow entering the vapor-liquid separator into the normal flow of evaporated cold gas refrigerant leaving the vapor-liquid separator before entering the compressor and the conveyance of a fraction of the subcooled liquid refrigerant flow entering the vapor-liquid separator into the flow of evaporated cold gas refrigerant leaving the vapor-liquid separator before entering the compressor until the selected evaporator is defrosted, and whereby the defrosting method further comprises the steps of:

flowing subcooled liquid refrigerant leaving the low pressure side of the liquid forward flow line valve through the motive port of the ejector and then through the discharge port of the ejector and then through the inlet of the vapor-liquid separator and then through an outlet of the vapor-liquid separator before entering the expansion device, flowing evaporated cold gas refrigerant leaving the suction manifold through the suction port of the ejector and then through the discharge port of the ejector and then through the inlet of the vapor-liquid separator and then through an outlet of the vapor-liquid separator before entering the compressor and conveying a fraction of the subcooled liquid refrigerant flow entering the vapor-liquid separator into the flow of evaporated cold gas refrigerant leaving the vapor-liquid separator before entering the compressor until the selected evaporator is defrosted.

12. The method of claim 11, whereby the closed loop vapor cycle refrigeration system further comprises an isolation valve arranged in each cold gas flow line so as to allow both the normal flow of evaporated cold gas refrigerant leaving each open cold gas flow line valve through the corresponding open isolation valve before entering the suction manifold and the flow of evaporated cold gas refrigerant leaving the open cold gas flow line valve of the non-selected evaporator through the corresponding open isolation valve before entering the suction manifold until the selected evaporator is defrosted and whereby the defrosting method further comprises the steps of:

opening the isolation valve arranged in the cold gas flow line connecting the outlet of the non-selected evaporator to the corresponding inlet of the suction manifold and flowing evaporated cold gas refrigerant leaving the open cold gas flow line valve of the non-selected evaporator through the corresponding open isolation valve before entering the suction manifold until the selected evaporator is defrosted.

13. The method of claim 12, whereby the plurality of evaporators consists of at least three evaporators and whereby the defrosting method further comprises the steps of:

providing an auxiliary expansion device having an outlet and an inlet, providing an auxiliary liquid flow line branched off from the liquid forward flow line and connecting the low pressure side of the liquid forward flow line valve to the inlet of the auxiliary expansion device so as to allow first the flow of a subcooled liquid refrigerant part leaving the low pressure side of the liquid forward flow line valve through the auxiliary expansion device and second the flashing of said subcooled liquid refrigerant part while if flows through the auxiliary expansion device, providing an auxiliary flashed refrigerant flow line connecting the outlet of the auxiliary expansion device to the inlet of a second non-selected evaporator of the plurality of evaporators so as to allow first the flow of said flashed subcooled liquid refrigerant part leaving the auxiliary expansion device through the second non-selected evaporator and second the evaporation of said flashed subcooled liquid refrigerant part while if flows through the second non-selected evaporator so that said refrigerant part passes from the flashed subcooled liquid state to the evaporated cold gas state, providing an isolation valve arranged in the auxiliary flashed refrigerant flow line so as to allow the flow of said flashed subcooled liquid refrigerant part leaving the auxiliary expansion device through said open isolation valve before entering the second non-selected evaporator, providing an auxiliary cold gas flow line having the first endpoint at a portion of the cold gas flow line connecting the outlet of the second non-selected evaporator to the corresponding inlet of the suction manifold disposed between the corresponding valve of the cold gas flow line and the corresponding isolation valve and having the second endpoint at a portion of the suction line disposed between the discharge port of the ejector and the inlet of the vapor-liquid separator so as to allow first the flow of said evaporated cold gas refrigerant—originated from said subcooled liquid refrigerant part—leaving the second non-selected evaporator through the corresponding open cold gas flow line valve and second the conveyance of said evaporated cold gas refrigerant flow—originated from said subcooled liquid refrigerant part—leaving the open cold gas flow line valve of the second non-selected evaporator into the flow of evaporated cold gas refrigerant leaving the ejector before entering the vapor-liquid separator so that the flow of said evaporated cold gas refrigerant—originated from said subcooled liquid refrigerant part—leaving the open cold gas flow line valve of the second non-selected evaporator bypasses both the suction manifold and the ejector before entering the vapor-liquid separator, providing a check valve arranged in said auxiliary cold gas flow line so as to allow the flow of said evaporated cold gas refrigerant—originated from said subcooled liquid refrigerant part—leaving the open cold gas flow line valve of the second non-selected evaporator through said check valve of said auxiliary cold gas flow line before the conveyance of said evaporated cold gas refrigerant flow—originated from said subcooled liquid refrigerant part—leaving the open cold gas flow line valve of the second non-selected evaporator into the flow of evaporated cold gas refrigerant leaving the ejector before entering the vapor-liquid separator until the selected evaporator is defrosted.

14. The method of claim 13, whereby the defrosting method further comprises the steps of:

providing a second auxiliary expansion device and a second vapor-liquid separator arranged in the auxiliary liquid flow line so as to allow first the flow of the previously said subcooled liquid refrigerant part leaving the low pressure side of the liquid forward flow line valve through the second auxiliary expansion device and second the flashing of the previously said subcooled liquid refrigerant part while it flows through the second auxiliary expansion device and third the flow of the previously said flashed subcooled liquid refrigerant part leaving the second auxiliary expansion device through the second vapor-liquid separator before entering the first auxiliary expansion device, providing an extra inlet of the compressor at an intermediate pressure between the high pressure of the outlet and the low pressure of the main inlet, providing a supplementary flow line connecting an outlet of the second vapor-liquid separator to the extra inlet of the compressor so as to allow the flow of a fraction of the previously said flashed subcooled liquid refrigerant part entering the second vapor-liquid separator through said outlet of the second vapor-liquid separator and then through the extra inlet of the compressor at said intermediate pressure, flowing the previously said subcooled liquid refrigerant part leaving the low pressure side of the liquid forward flow line valve through the second auxiliary expansion device, flashing the previously said subcooled liquid refrigerant part while it flows through the second auxiliary expansion device, flowing the previously said flashed subcooled liquid refrigerant part leaving the second auxiliary expansion device through the second vapor-liquid separator before entering the first auxiliary expansion device and flowing a fraction of the previously said flashed subcooled liquid refrigerant part entering the second vapor-liquid separator through said outlet of the second vapor-liquid separator and then through the extra inlet of the compressor at said intermediate pressure until the selected evaporator is defrosted.

15. The method of claim 13, whereby the defrosting method further comprises the steps of: providing an expander and a second vapor-liquid separator arranged in the auxiliary liquid flow line so as to allow first the flow of the previously said subcooled liquid refrigerant part leaving the low pressure side of the liquid forward flow line valve through the expander and second the expansion of the previously said subcooled liquid refrigerant part while it flows through the expander and third the flow of the previously said expanded subcooled liquid refrigerant part leaving the expander through the second vapor-liquid separator before entering the first auxiliary expansion device, providing an extra inlet of the compressor at an intermediate pressure between the high pressure of the compressor outlet and the low pressure of the compressor main inlet, providing a supplementary flow line connecting an outlet of the second vapor-liquid separator to the extra inlet of the compressor so as to allow the flow of a fraction of the previously said expanded subcooled liquid refrigerant part entering the second vapor-liquid separator through said outlet of the second vapor-liquid separator and then through the extra inlet of the compressor at said intermediate pressure, flowing the previously said subcooled liquid refrigerant part leaving the low pressure side of the liquid forward flow line valve through the expander, expanding the previously said subcooled liquid refrigerant part while it flows through the expander, flowing the previously said expanded subcooled liquid refrigerant part leaving the expander through the second vapor-liquid separator before entering the first auxiliary expansion device and flowing a fraction of the previously said expanded subcooled liquid refrigerant part entering the second vapor-liquid separator through said outlet of the second vapor-liquid separator and then through the extra inlet of the compressor at said intermediate pressure until the selected evaporator is defrosted.

16. The method of claim 15, whereby the defrosting method further comprises the steps of:

providing a second compressor arranged together with the previously said expander to form an expander-compressor group in such a way that the outlet of the expander-compressor group corresponds both to the outlet port of the expander and to the outlet port of said second compressor, providing a further supplementary flow line branched off from the suction line and connecting a portion of the suction line disposed between an outlet of the first vapor-liquid separator and the main inlet of the first compressor to the inlet of said second compressor so as to allow first the flow of a fraction of evaporated cold gas refrigerant leaving the first vapor-liquid separator through the inlet of said second compressor and second the compression of said fraction of evaporated cold gas refrigerant while it flows through said second compressor and third the conveying of the flow of said fraction of compressed evaporated cold gas refrigerant leaving said second compressor into the flow of the previously said expanded subcooled liquid refrigerant part leaving the expander of the expander-compressor group, providing an internal heat exchanger disposed between the liquid forward flow line and the auxiliary liquid flow line so as to allow the further cooling of the subcooled liquid refrigerant leaving the low pressure side of the liquid forward flow line valve before entering the ejector and the heating of the previously said expanded subcooled liquid refrigerant part leaving the expander-compressor group before entering the second vapor-liquid separator, providing a by-pass line of the auxiliary liquid flow line around said internal heat exchanger so as to allow the flow of a fraction of the previously said expanded subcooled liquid refrigerant part leaving the expander-compressor group through the second vapor-liquid separator bypassing said internal heat exchanger, providing a valve arranged in said bypass line of the auxiliary liquid flow line around said internal heat exchanger so as to allow the flow of said fraction of the previously said expanded subcooled liquid refrigerant part leaving the expander-compressor group through said open valve arranged in said bypass line of the auxiliary liquid flow line around said internal heat exchanger before entering the second vapor-liquid separator bypassing said internal heat exchanger, flowing said fraction of evaporated cold gas refrigerant leaving the first vapor-liquid separator through said second compressor, compressing said fraction of evaporated cold gas refrigerant while it flows through said second compressor, conveying the flow of said fraction of compressed evaporated cold gas refrigerant leaving said second compressor into the flow of the previously said expanded subcooled liquid refrigerant part leaving the expander of the expander-compressor group, opening the valve arranged in said bypass line of the auxiliary liquid flow line around said internal heat exchanger and flowing a fraction of the previously said expanded subcooled liquid refrigerant part leaving the expander-compressor group through said open valve arranged in said bypass line of the auxiliary liquid flow line around said internal heat exchanger before entering the second vapor-liquid separator bypassing said internal heat exchanger until the selected evaporator is defrosted.

17. The method of claim 16, whereby the shaft of the second compressor arranged together with the previously said expander to form an expander-compressor group is connected to the shaft of the expander of the same expander-compressor group.

18. The method of claim 14, whereby the defrosting method further comprising the steps of:
providing a further auxiliary expansion device and an external heat exchanger arranged in a further supplementary flow line branched off from the liquid forward flow line and connecting the low pressure side of the liquid forward flow line valve to a portion of the suction line disposed between the discharge port of the ejector and the inlet of the first vapor-liquid separator so as to allow first the flow of a further subcooled liquid refrigerant part leaving the low pressure side of the liquid forward flow line valve through said further auxiliary expansion device and second the flashing of said further subcooled liquid refrigerant part while it flows through said further auxiliary expansion device and third the flow of said further flashed subcooled liquid refrigerant part leaving said further auxiliary expansion device through the external heat exchanger and fourth the evaporation of said further flashed subcooled liquid refrigerant part while it flows through the external heat exchanger so that said further refrigerant part passes from the flashed subcooled liquid state to the evaporated cold gas state and fifth the conveying of the flow of said evaporated cold gas refrigerant originated from said further subcooled liquid refrigerant part-leaving the external heat exchanger into the flow of evaporated cold gas refrigerant leaving the ejector before entering the first vapor-liquid separator,
flowing said further subcooled liquid refrigerant part leaving the low pressure side of the liquid forward flow line valve through said further auxiliary expansion device, flashing said further subcooled liquid refrigerant part while it flows through said further auxiliary expansion device,
flowing said further flashed subcooled liquid refrigerant part leaving said further auxiliary expansion device through the external heat exchanger,
evaporating said further flashed subcooled liquid refrigerant part while it flows through the external heat exchanger so that said further refrigerant part passes from the flashed subcooled liquid state to the evaporated cold gas state and
conveying the flow of said evaporated cold gas refrigerant—originated from said further subcooled liquid refrigerant part—leaving the external heat exchanger into the flow of evaporated cold gas refrigerant leaving the ejector before entering the first vapor-liquid separator until the selected evaporator is defrosted.

19. The method of claim 12, whereby the defrosting method further comprises the steps of:
providing a bypass line of the liquid forward flow line around the closed valve of the liquid forward flow line so as to allow first the flow of a fraction of liquid refrigerant leaving the condenser through the low pressure side of the liquid forward flow line valve bypassing both the open liquid reverse flow line valve and the selected evaporator and the check valve of the additional liquid reverse flow line and second the conveying of the flow of said fraction of liquid refrigerant leaving the condenser bypassing both the open liquid reverse flow line valve and the selected evaporator and the check valve of the additional liquid reverse flow line into the flow of subcooled liquid refrigerant leaving the check valve of the additional liquid reverse flow line,
providing a valve arranged in the bypass line of the liquid forward flow line around the closed liquid forward flow line valve so as to allow the flow of said fraction of liquid refrigerant leaving the condenser bypassing both the open liquid reverse flow line valve and the selected evaporator and the check valve of the additional liquid reverse flow line through said open valve arranged in the bypass line of the liquid forward flow line around the closed liquid forward flow line valve before entering the low pressure side of the liquid forward flow line valve,
opening the valve arranged in the bypass line of the liquid forward flow line around the closed liquid forward flow line valve, flowing a fraction on liquid refrigerant leaving the condenser through said open valve arranged in the bypass line of the liquid forward flow line around the closed liquid forward flow line valve and then through the low pressure side of the liquid forward flow line valve bypassing both the open liquid reverse flow line valve and the selected evaporator and the check valve of the additional liquid reverse flow line and
conveying the flow of said fraction of liquid refrigerant leaving the condenser bypassing both the open liquid reverse flow line valve and the selected evaporator and the check valve of the additional liquid reverse flow line into the flow of subcooled liquid refrigerant leaving the check valve of the additional liquid reverse flow line until the selected evaporator is defrosted.

20. The system of claim 2, whereby at least an isolation valve comprises a check valve arranged in the outlet side.

21. The system of claim 2, whereby the selected evaporator is in turn each evaporator of the plurality of evaporators.

22. The system of claim 2, whereby the refrigerant of the closed loop vapor cycle refrigeration system is carbon dioxide.

* * * * *